United States Patent
Okada et al.

(10) Patent No.: US 11,269,229 B2
(45) Date of Patent: Mar. 8, 2022

(54) ELECTROCHROMIC DISPLAY DEVICE AND PRODUCTION METHOD OF ELECTROCHROMIC DISPLAY DEVICE

(71) Applicant: Ricoh Company, Ltd., Tokyo (JP)

(72) Inventors: Yoshinori Okada, Kanagawa (JP); Keigo Takauji, Kanagawa (JP); Satoshi Yamamoto, Kanagawa (JP); Daisuke Goto, Kanagawa (JP); Toshiya Sagisaka, Kanagawa (JP); Masato Shinoda, Kanagawa (JP); Kazuaki Tsuji, Kanagawa (JP); Fuminari Kaneko, Kanagawa (JP); Tohru Yashiro, Kanagawa (JP); Mamiko Inoue, Kanagawa (JP); Yuto Matsuoka, Tokyo (JP); Naoki Ura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 83 days.

(21) Appl. No.: 16/484,713

(22) PCT Filed: Feb. 13, 2018

(86) PCT No.: PCT/JP2018/004876
§ 371 (c)(1),
(2) Date: Aug. 8, 2019

(87) PCT Pub. No.: WO2018/155255
PCT Pub. Date: Aug. 30, 2018

(65) Prior Publication Data
US 2020/0103718 A1    Apr. 2, 2020

(30) Foreign Application Priority Data

Feb. 23, 2017  (JP) .............................. JP2017-031679

(51) Int. Cl.
*G02F 1/1516*  (2019.01)
*G02F 1/1523*  (2019.01)
*G02F 1/155*   (2006.01)

(52) U.S. Cl.
CPC .......... *G02F 1/15165* (2019.01); *G02F 1/155* (2013.01); *G02F 1/1525* (2013.01); *G02F 2203/34* (2013.01)

(58) Field of Classification Search
CPC .... G02F 1/15165; G02F 1/1525; G02F 1/155; G02F 2203/34
See application file for complete search history.

(56) References Cited

U.S. PATENT DOCUMENTS 8,743,048 B2  6/2014  Takahashi et al.
8,902,151 B2  12/2014  Yashiro et al.
(Continued)

FOREIGN PATENT DOCUMENTS

CN  102694001 A   9/2012
JP  58-78125 A    5/1983
(Continued)

OTHER PUBLICATIONS

Korean Office Action dated Sep. 18, 2020 in corresponding Korean Patent Application No. 10-2019-7027528 (with English Translation), 14 pages.
(Continued)

Primary Examiner — Tuyen Tra
(74) Attorney, Agent, or Firm — Xsensus LLP

(57) ABSTRACT

Provided is an electrochromic display device including a pair of supporting substrates facing each other, a pair of electrodes each disposed on the supporting substrate and facing each other, an electrochromic display layer disposed in contact with at least one of the pair of the electrodes, and an electrolyte layer disposed between the pair of the elec-
(Continued)

trode, wherein the electrochromic display layer includes a plurality of electrochromic layers exhibiting mutually different coloring colors, and the plurality of the electrochromic layers are laminated on the electrode at least in a partial area of the electrode.

16 Claims, 24 Drawing Sheets
(1 of 24 Drawing Sheet(s) Filed in Color)

(56) References Cited

U.S. PATENT DOCUMENTS

| | | | |
|---|---|---|---|
| 2002/0181068 | A1 | 12/2002 | Bonhote et al. |
| 2004/0252099 | A1 | 12/2004 | Walder et al. |
| 2005/0270619 | A1 | 12/2005 | Johnson et al. |
| 2006/0066933 | A1 | 3/2006 | Jagt et al. |
| 2010/0142027 | A1 | 6/2010 | Tatsuura et al. |
| 2012/0033286 | A1 | 2/2012 | Yashiro et al. |
| 2012/0050838 | A1 | 3/2012 | Hirano et al. |
| 2012/0139824 | A1 | 6/2012 | Takahashi et al. |
| 2012/0139825 | A1 | 6/2012 | Yashiro et al. |
| 2012/0242218 | A1 | 9/2012 | Yoshinaga et al. |
| 2014/0307302 | A1 | 10/2014 | Andersson Ersman et al. |
| 2015/0378234 | A1 | 12/2015 | Konkin et al. |

FOREIGN PATENT DOCUMENTS

| | | |
|---|---|---|
| JP | 4-6948 A | 1/1992 |
| JP | 6-205220 A | 7/1994 |
| JP | 2006-106669 A | 4/2006 |
| JP | 4128139 | 5/2008 |
| JP | 2010-033016 | 2/2010 |
| JP | 2010-134308 | 6/2010 |
| JP | 2010-160370 | 7/2010 |
| JP | 2011-017873 | 1/2011 |
| JP | 2011-227248 | 11/2011 |
| JP | 2012-047955 | 3/2012 |
| JP | 2012-053446 | 3/2012 |
| JP | 2012-137736 | 7/2012 |
| JP | 2012-137737 | 7/2012 |
| JP | 2012-155017 | 8/2012 |
| JP | 2014-021398 | 2/2014 |
| JP | 2016-038572 | 3/2016 |
| JP | 2016-45404 A | 4/2016 |
| JP | 2016-045464 A | 4/2016 |
| KR | 10-2012-0017417 A | 2/2012 |
| KR | 10-2014-0089416 A | 7/2014 |

OTHER PUBLICATIONS

Office Action dated Dec. 8, 2020 in corresponding Japanese Patent Application No. 2017-031679, 5 pages.
Jeffrey L. Boehme et al., "Electrochromic Properties of Laminate Devices Fabricated from Polyaniline, Poly(ethylenedioxythiophene), and Poly(N-methylpyrrole)", Chem. Mater., American Chemical Society, 2001, 13, Sep. 11, 2001, pp. 4469-4472.
International Search Report dated Apr. 30, 2018 for counterpart International Patent Application No. PCT/JP2018/004876 filed Feb. 13, 2018.
Written Opinion dated Apr. 30, 2018 for counterpart International Patent Application No. PCT/JP2018/004876 filed Feb. 13, 2018.
Written Opinion of the International Preliminary Examining Authority dated Jan. 24, 2019 for counterpart International Patent Application No. PCT/JP2018/004876 filed Feb. 13, 2018.
B.-H. Chen et. al., "Inkjet Printed Multi-color Thin Films for High-Contrast Electrochromic Devices" International Display Workshop 2015 Proceedings EP 2-1.
B.-H. Chen et. al., "Printed Multicolor High-Contrast Electrochromic Devices", ACS Appl. Mater. Interfaces 2015, 7, 25069-25076.
International Preliminary Report on Patentability dated Apr. 16, 2019 in PCT/JP2018/004876, 11 pages.
Office Action dated Jul. 30, 2021 in Chinese Patent Application No. 201880013021.3, 24 pages.
Office Action dated Nov. 17, 2021 in Chinese Patent Application No. 201880013021.3, 24 pages.

[Fig. 1]
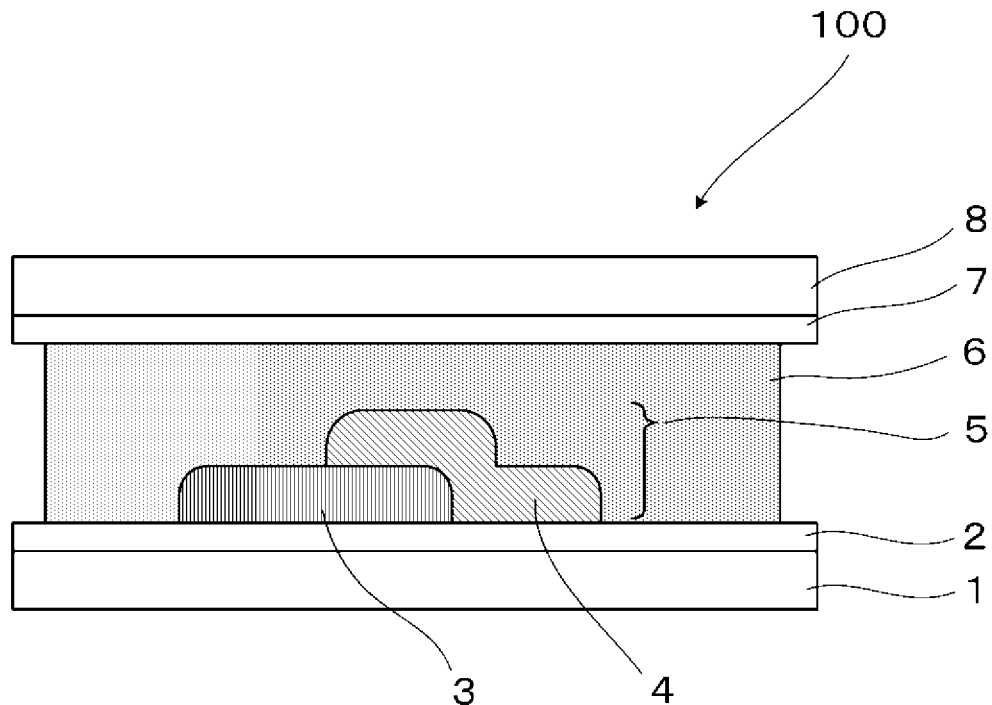
[Fig. 2]
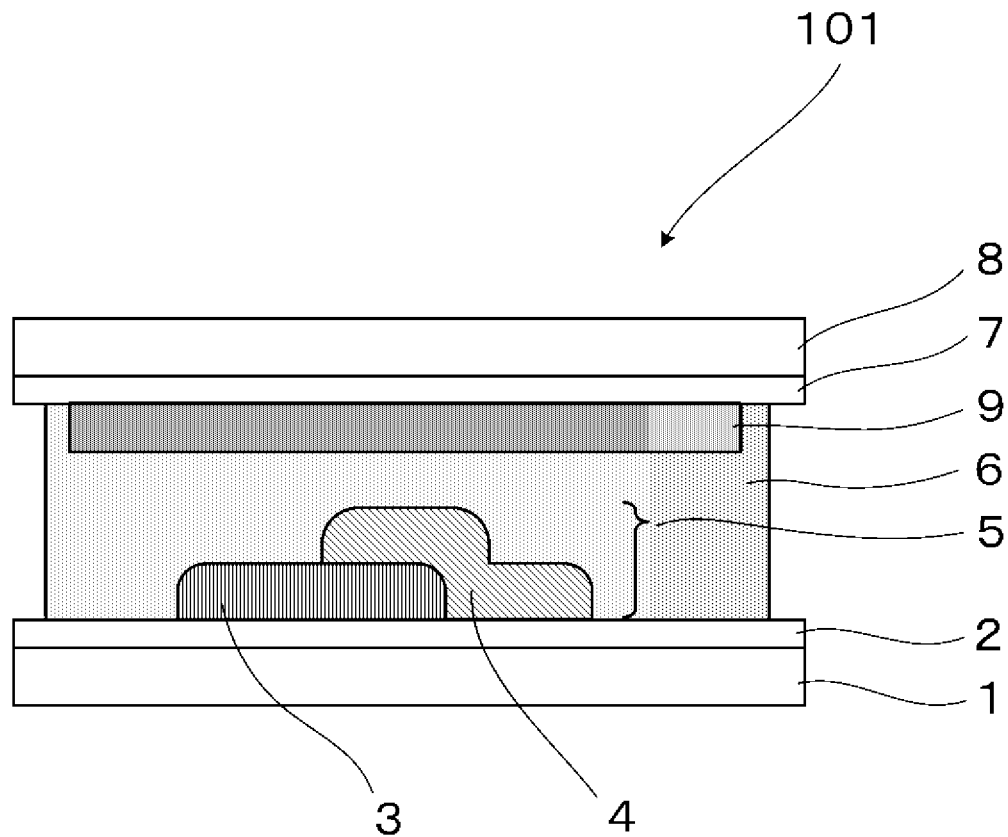

[Fig. 3]
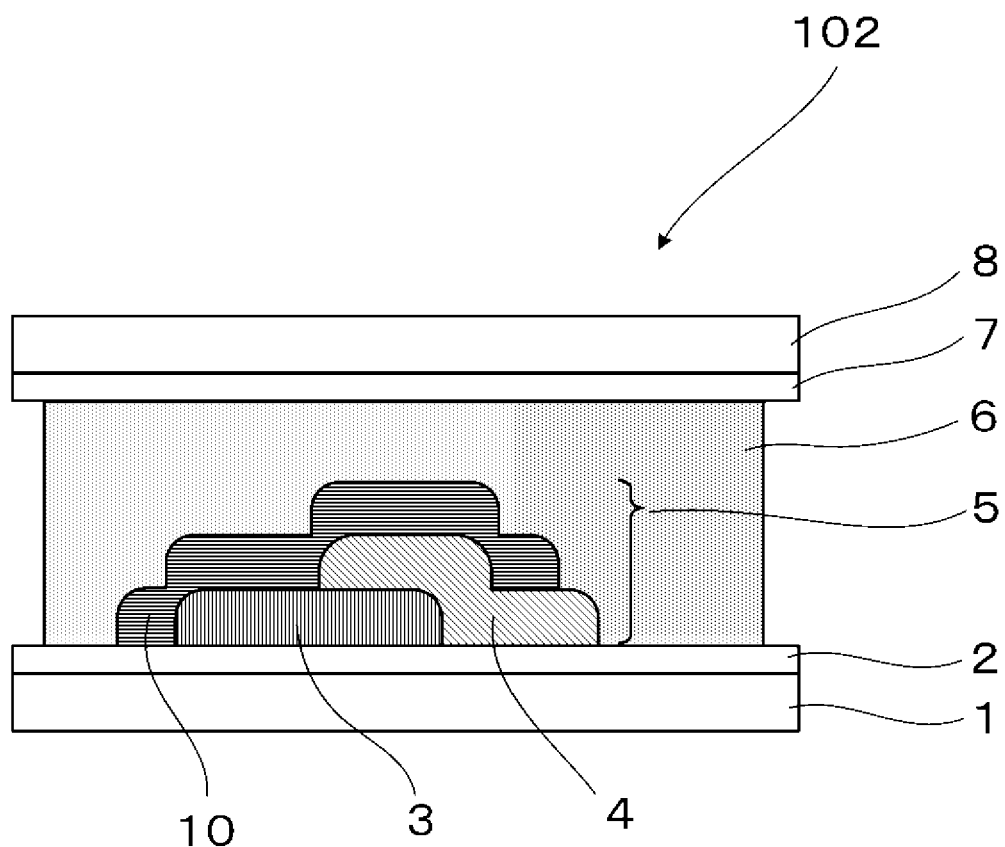

[Fig. 4A]
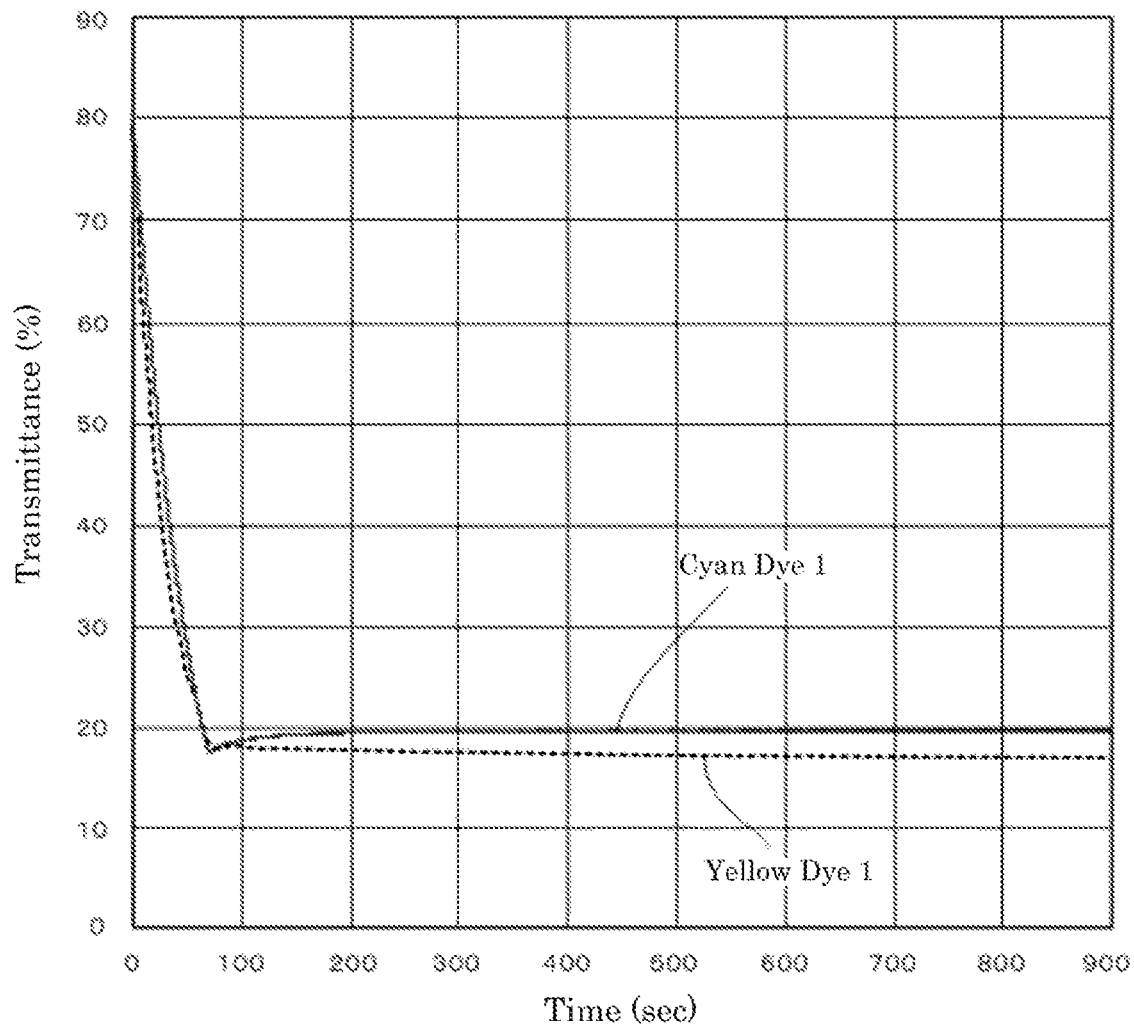

[Fig. 4B]
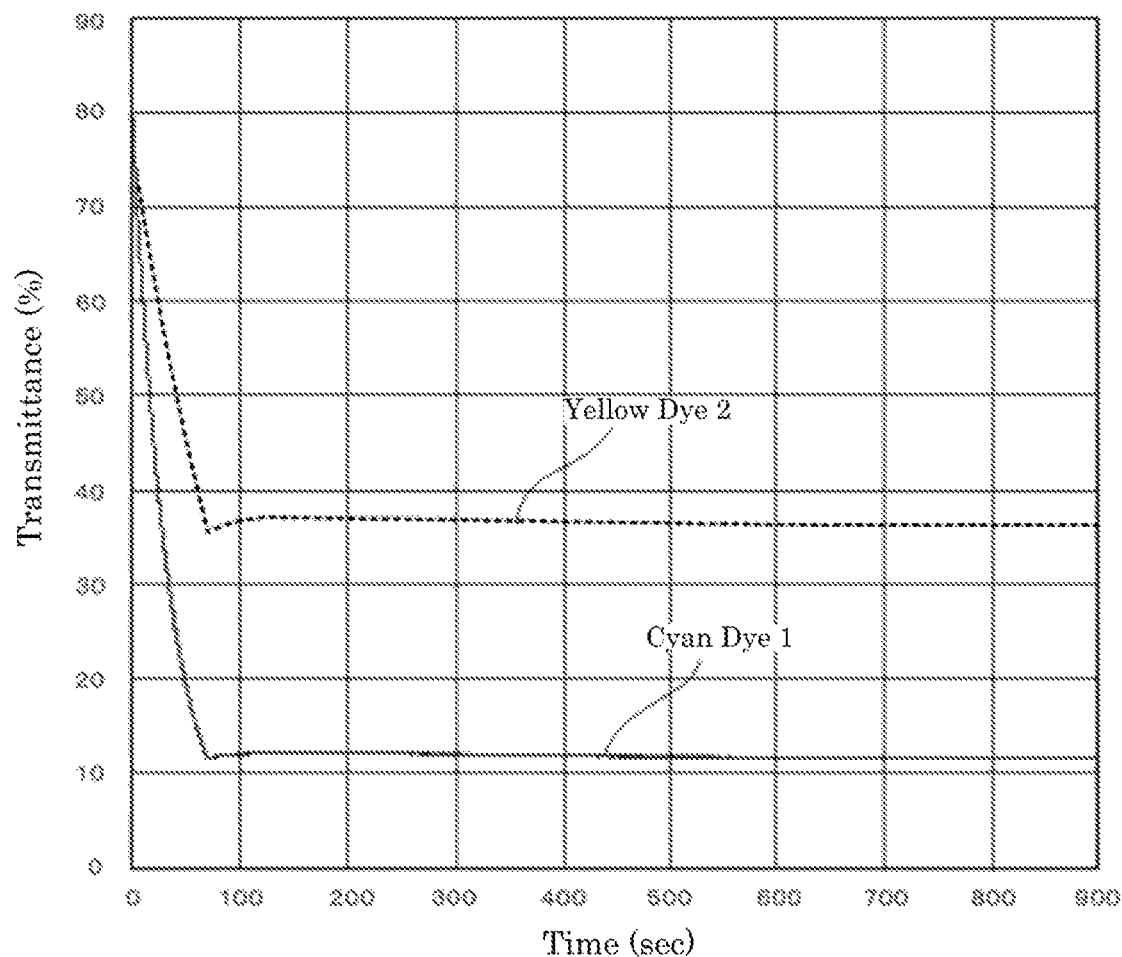

[Fig. 4C]
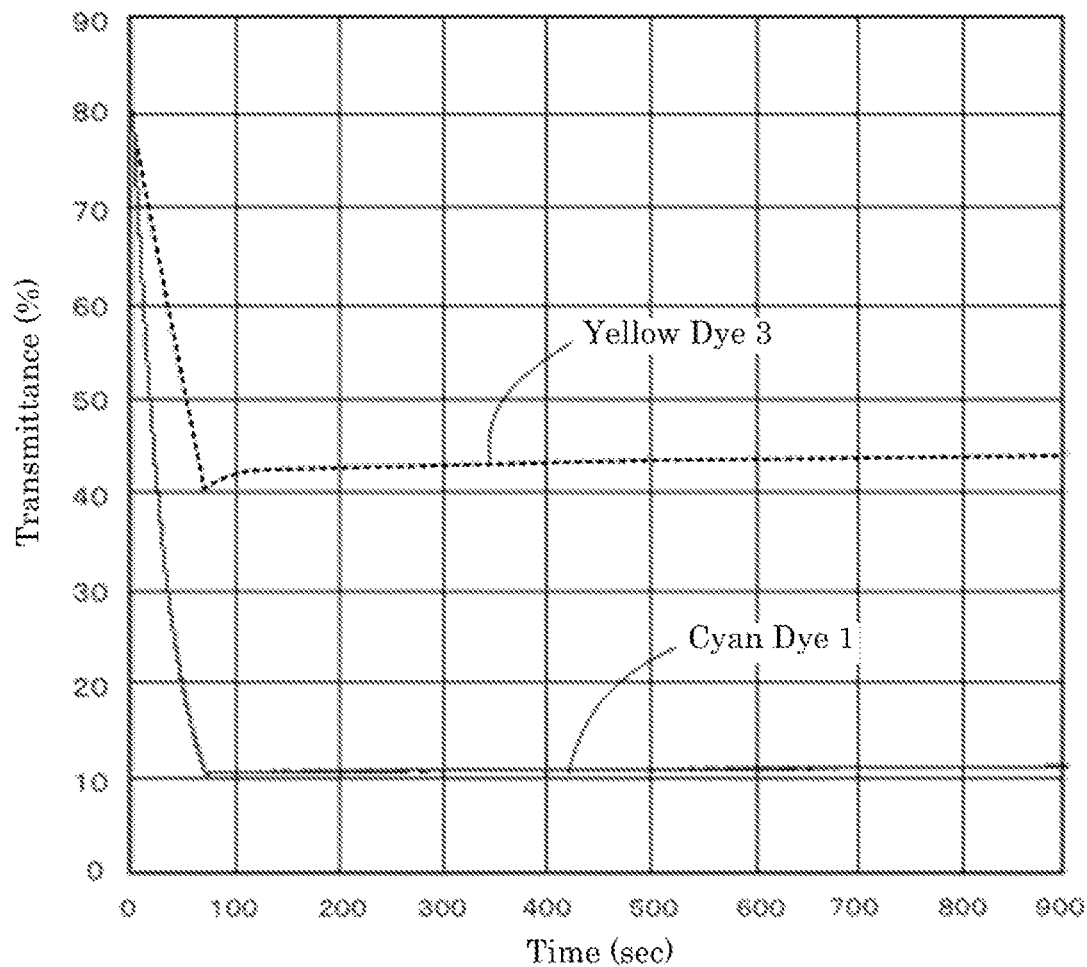

[Fig. 4D]
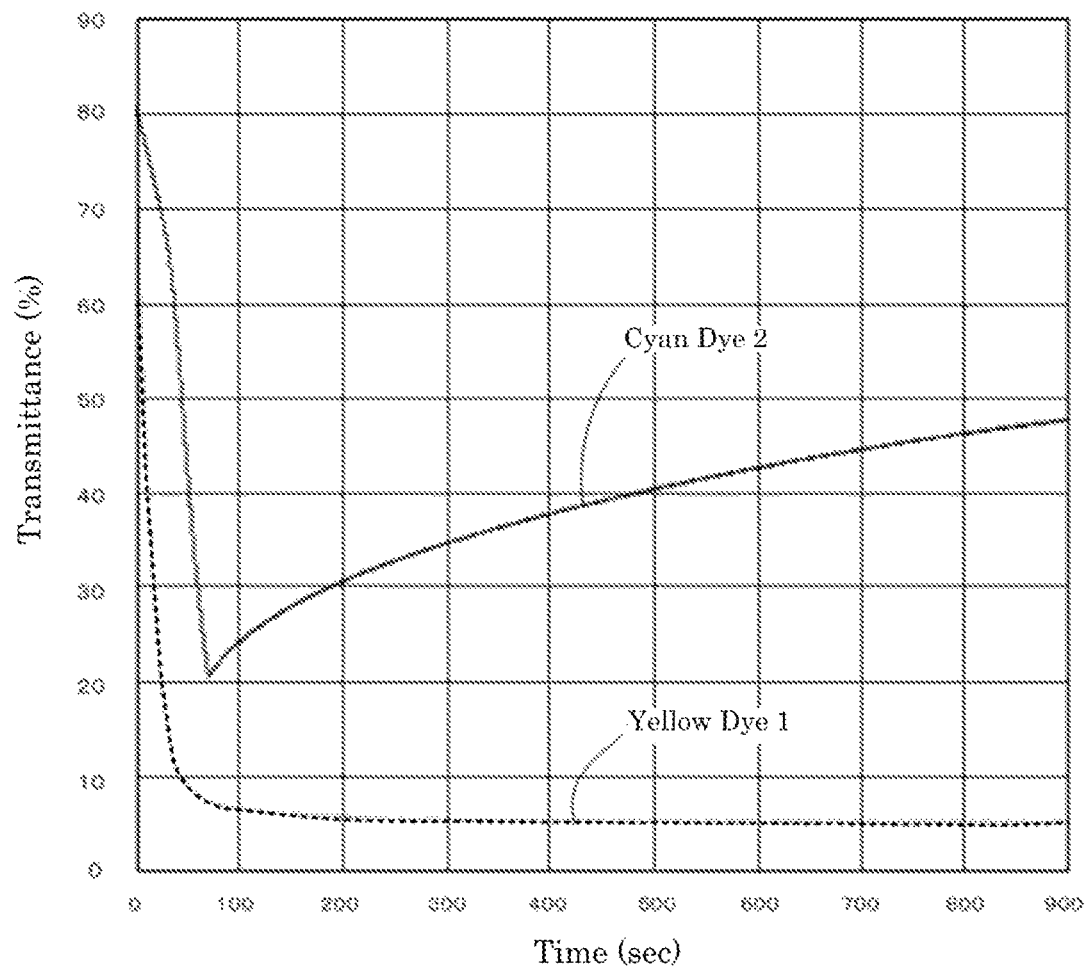

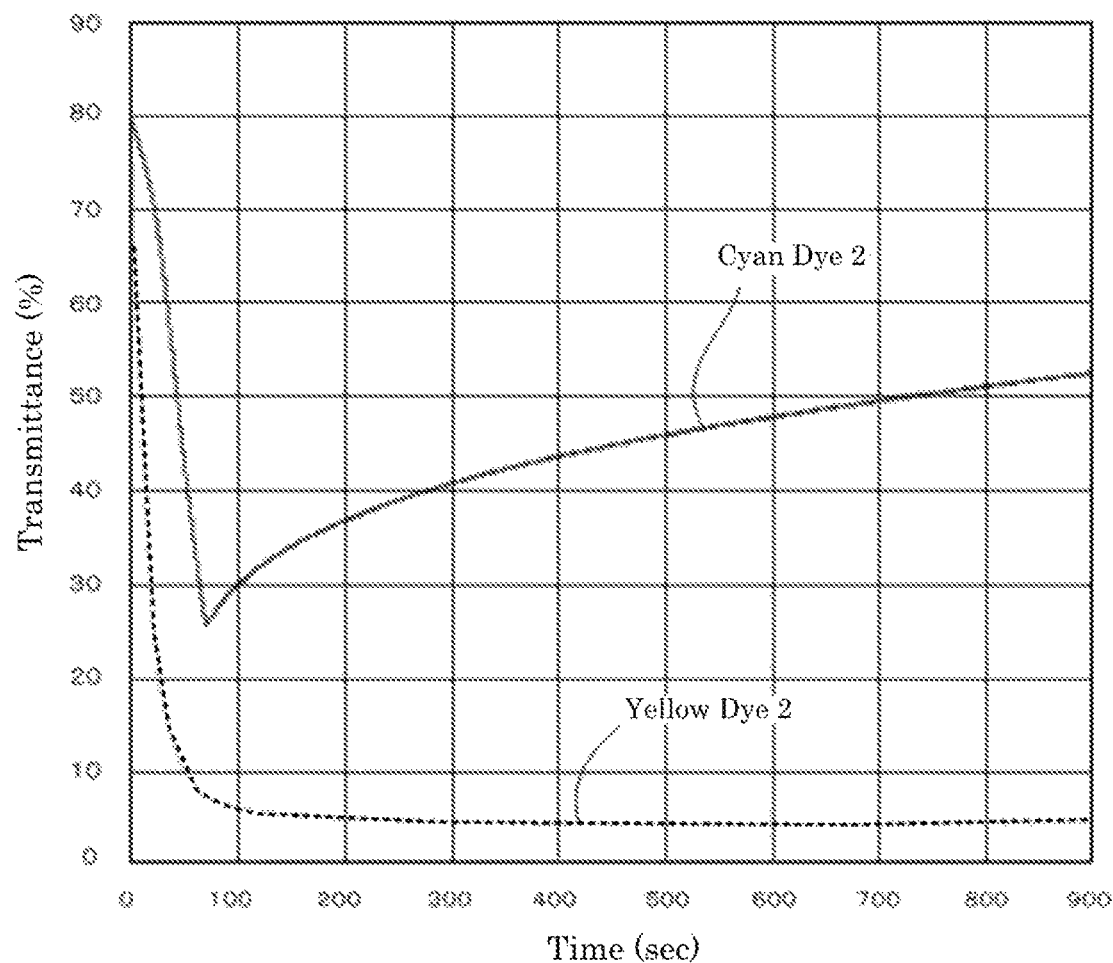
[Fig. 4E]

[Fig. 4F]
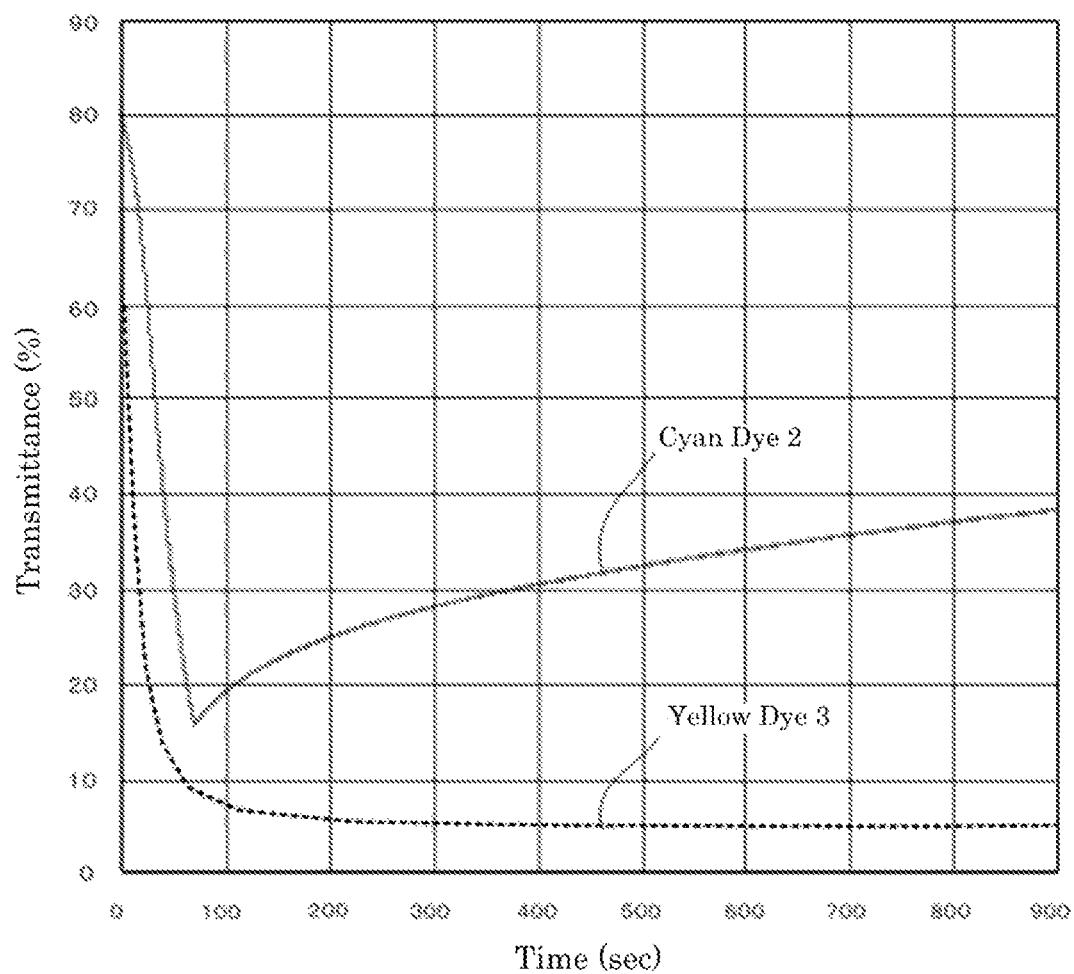

[Fig. 5A]
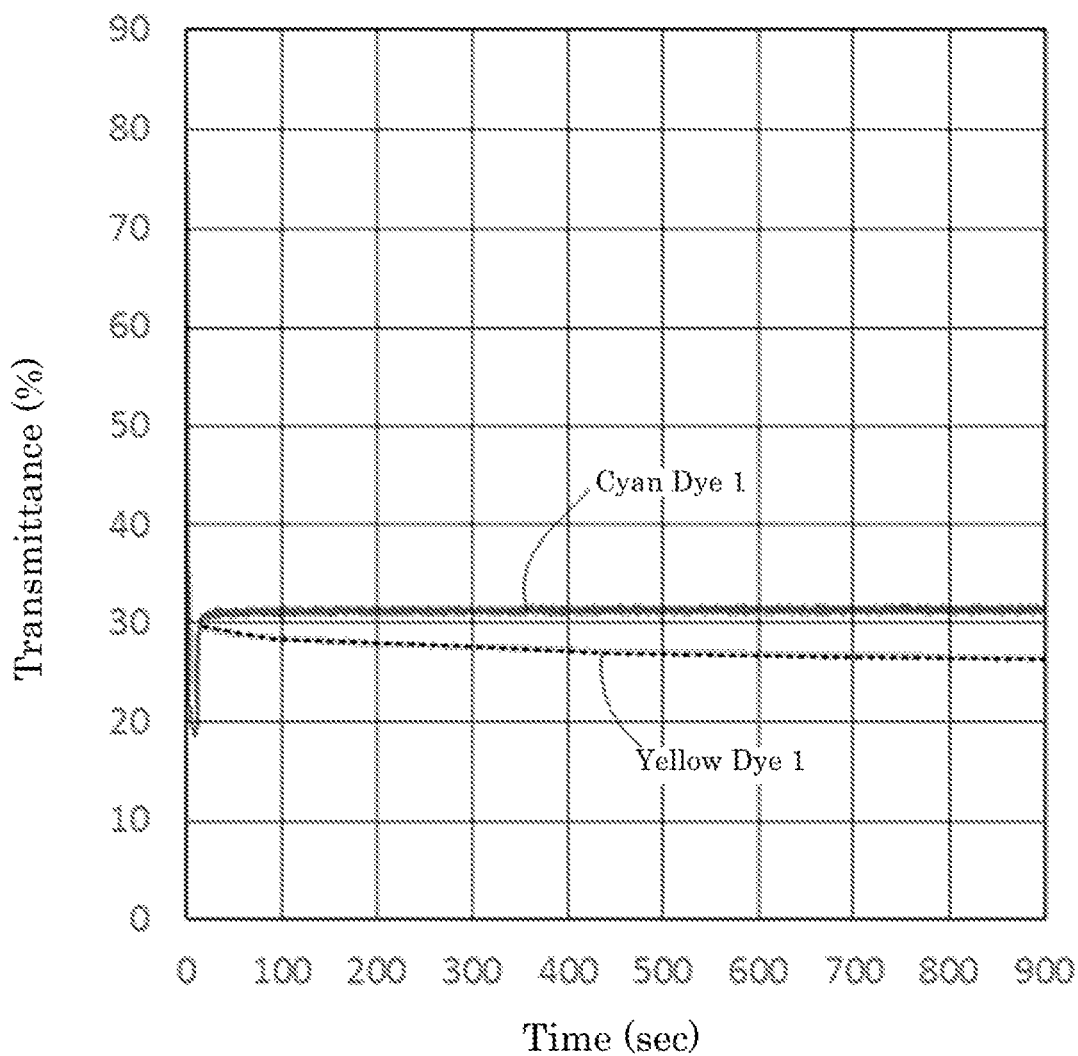

[Fig. 5B]
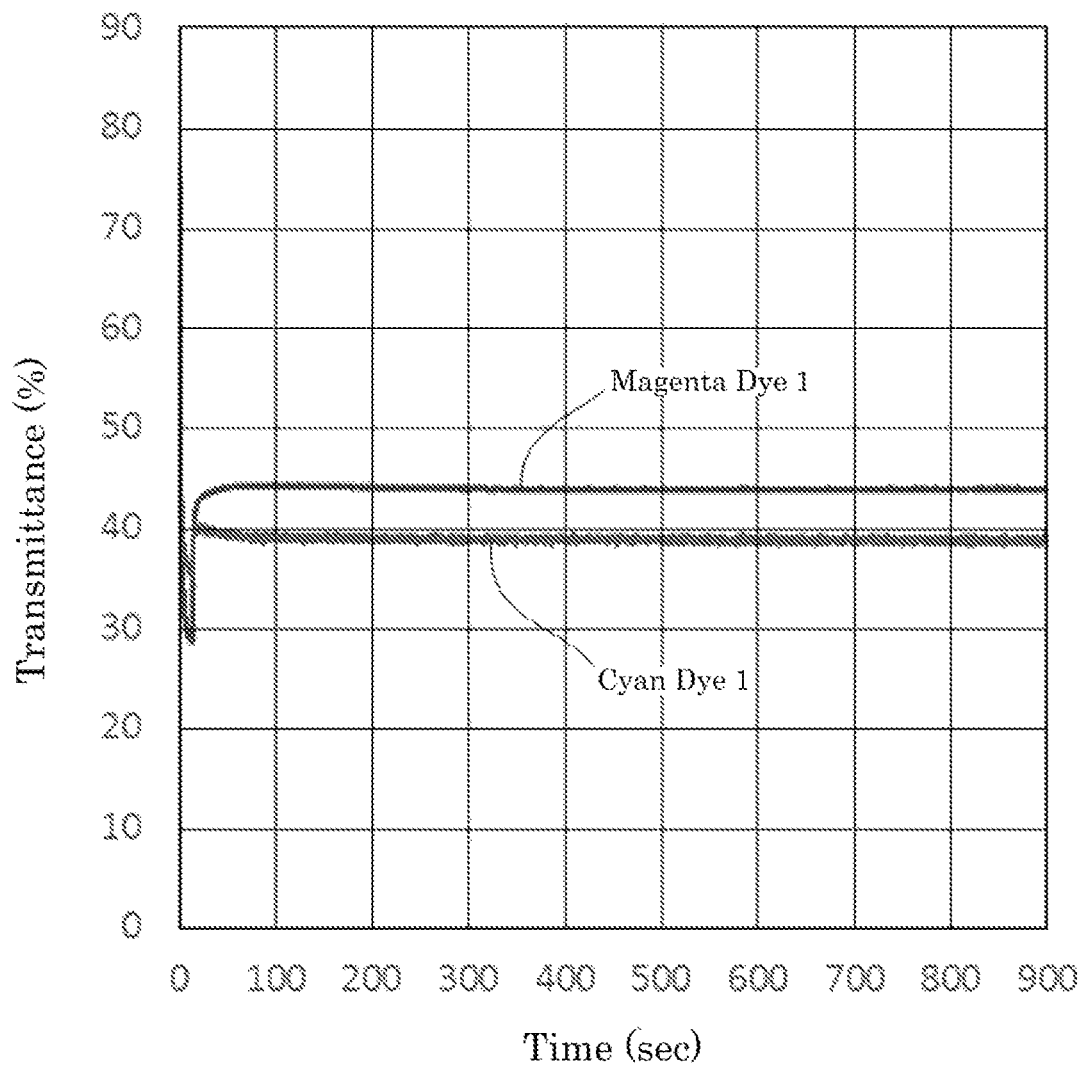

[Fig. 5C]
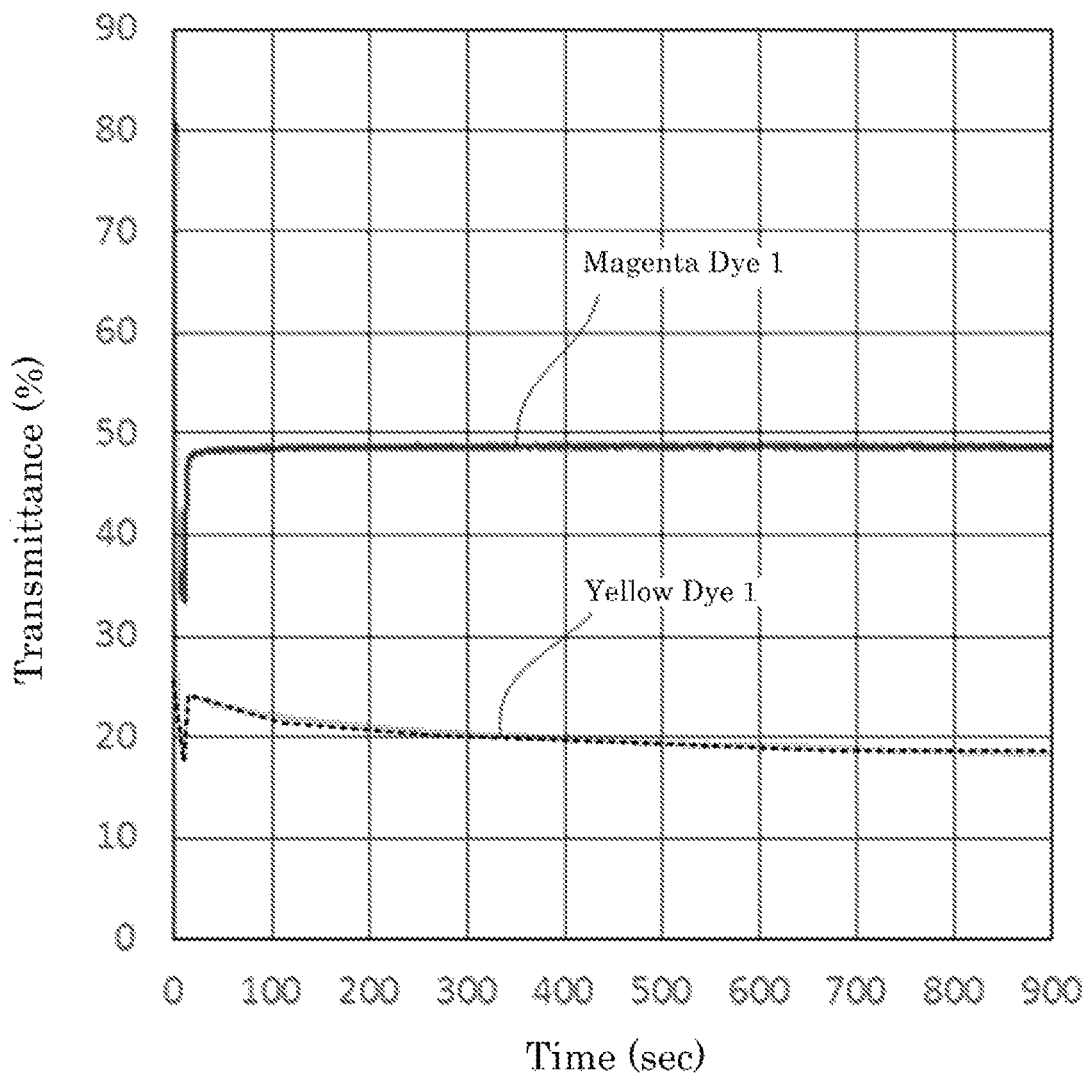

[Fig. 6A]
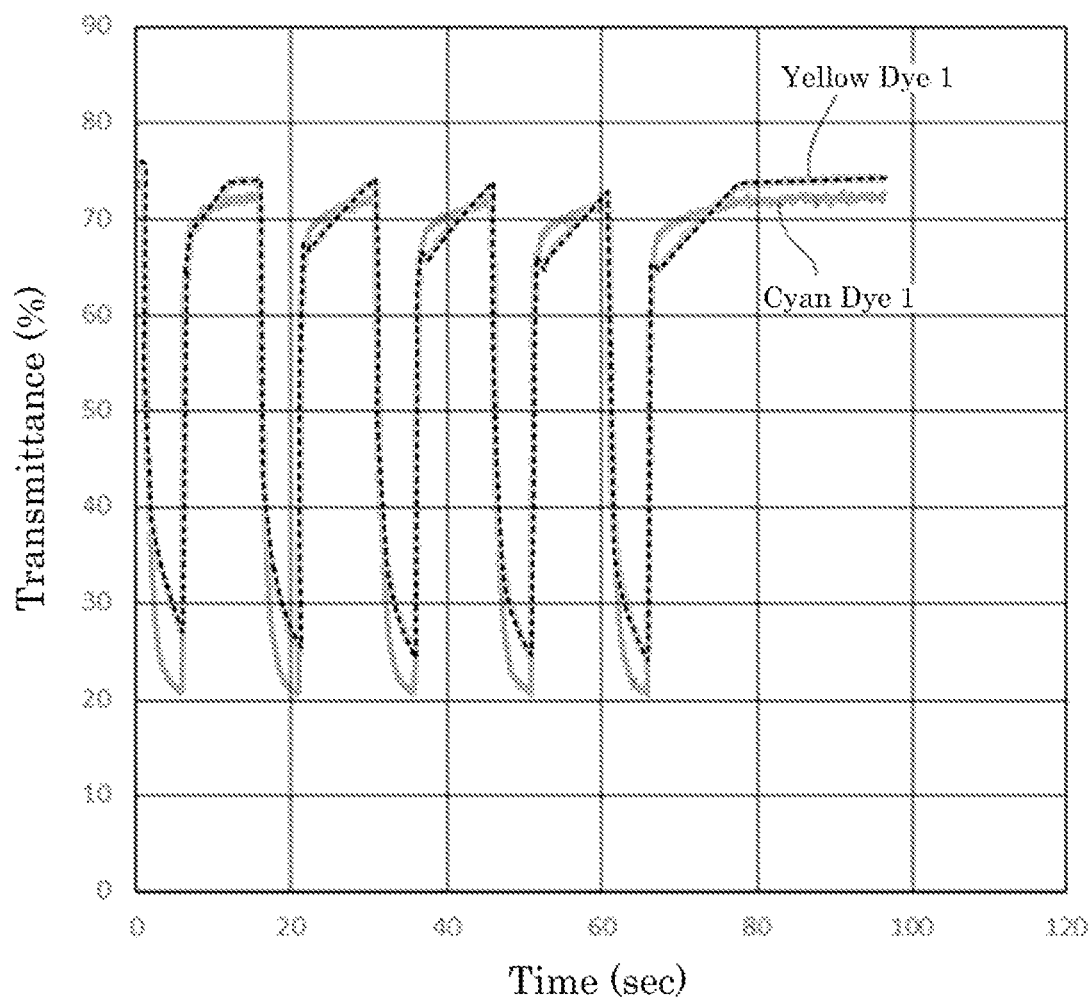

[Fig. 6B]
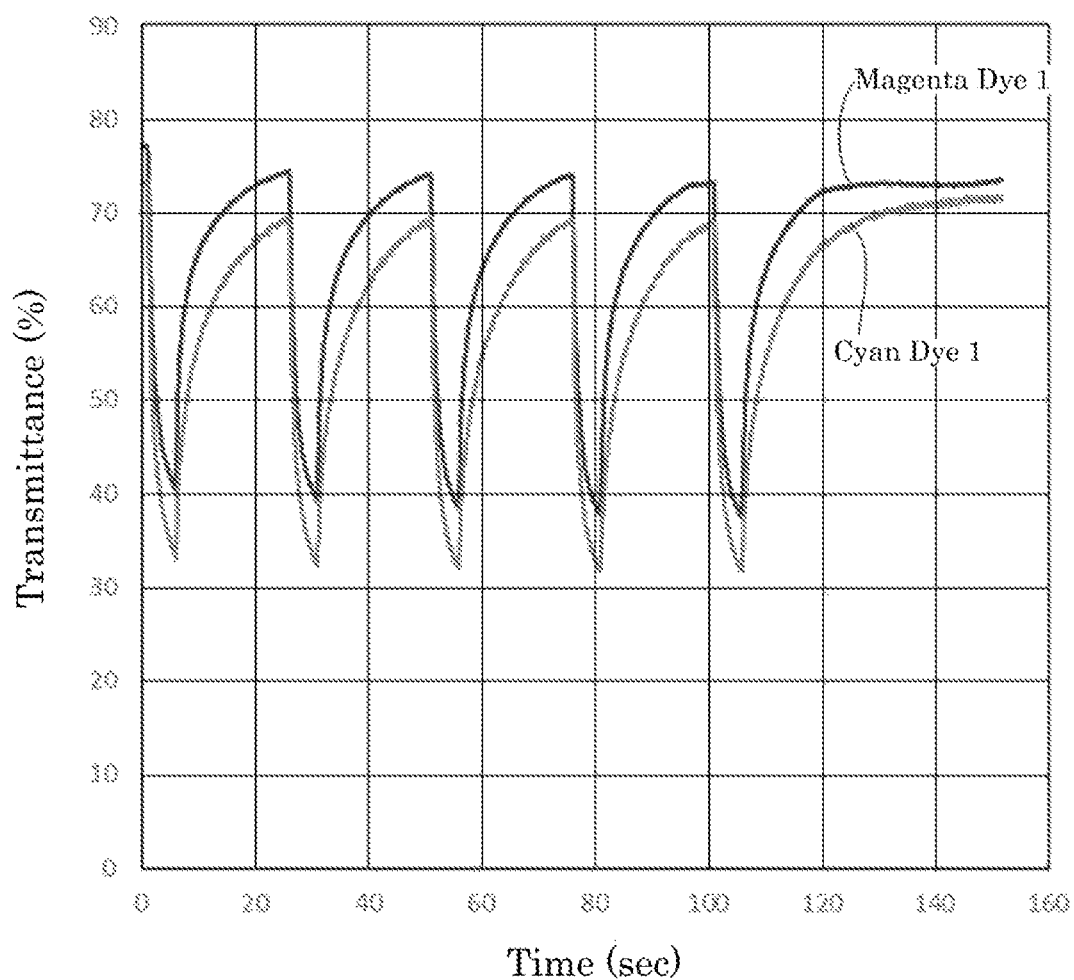

[Fig. 6C]
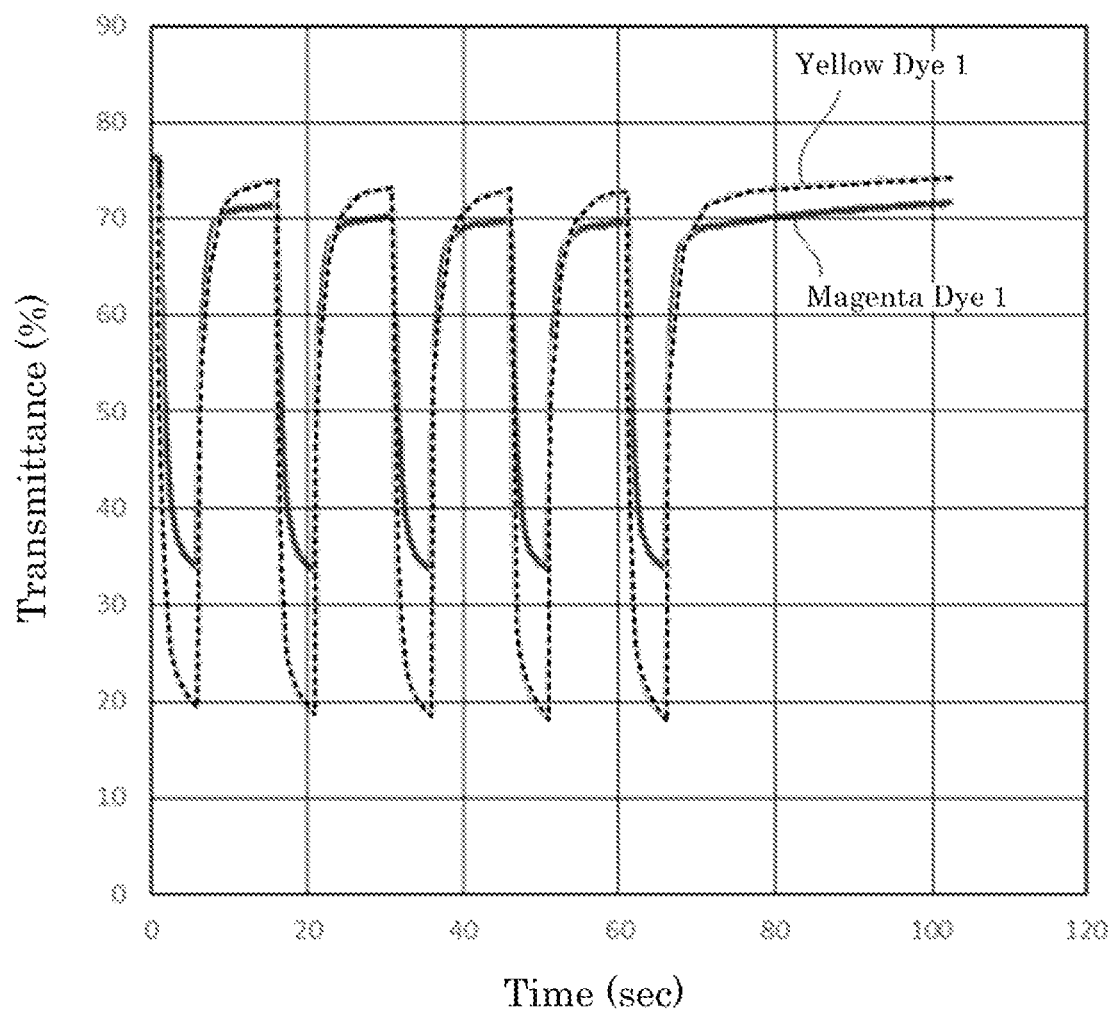

[Fig. 6D]
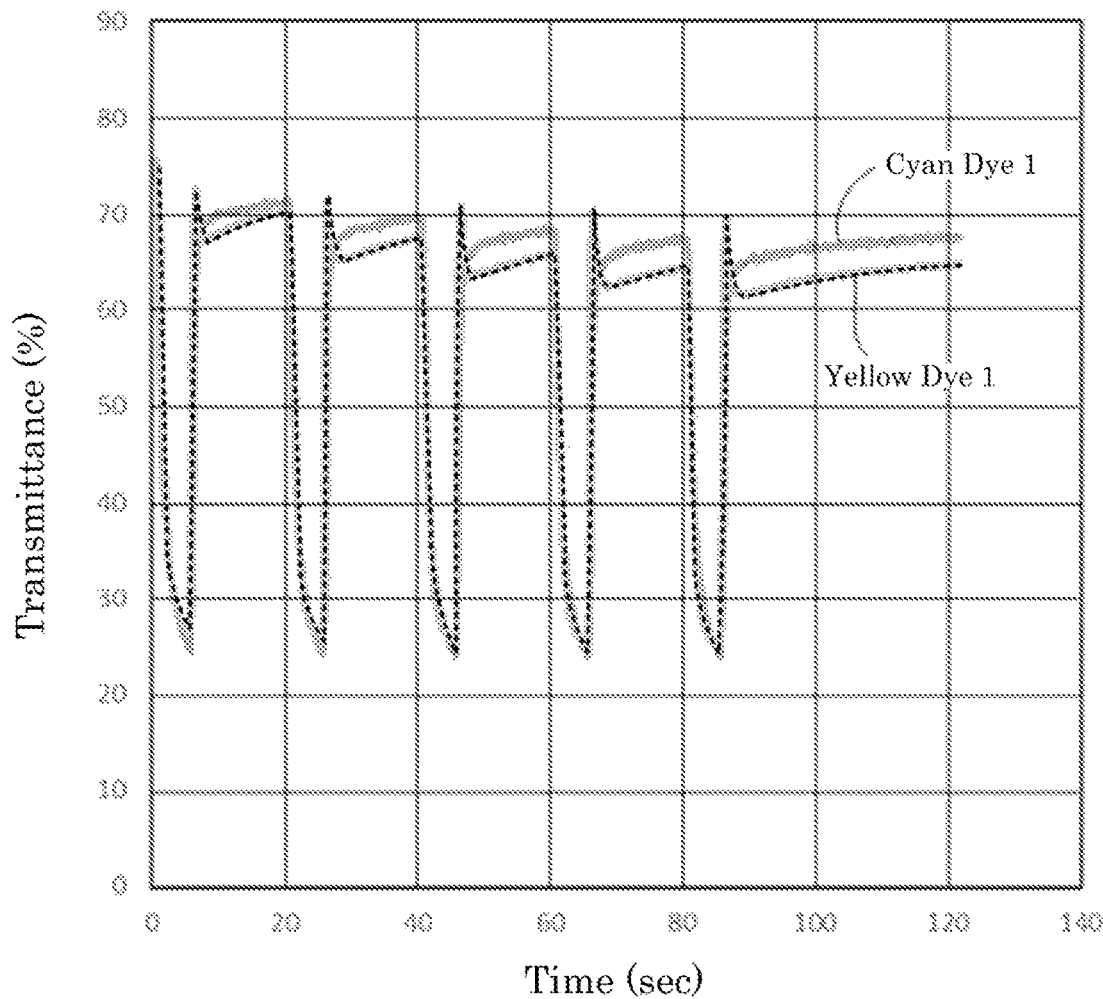

[Fig. 6E]
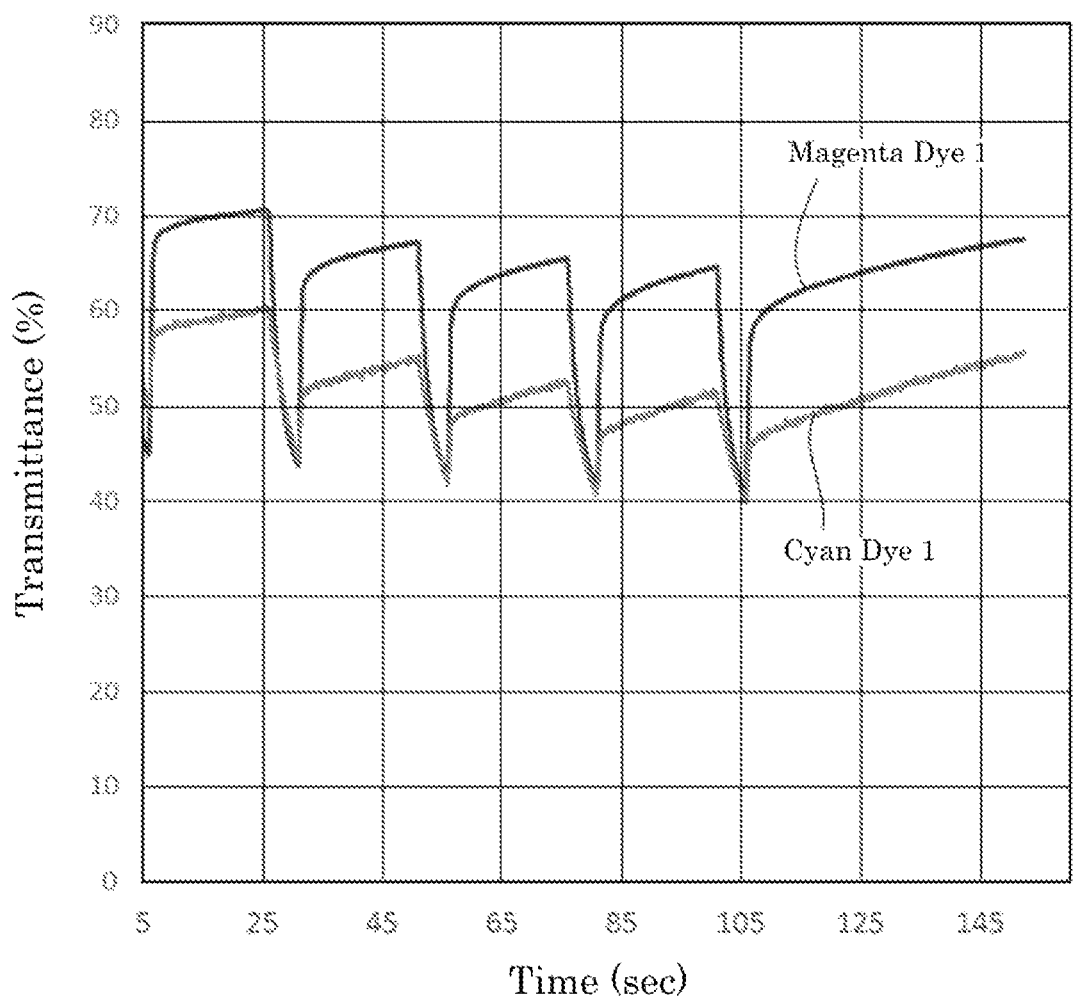

[Fig. 6F]
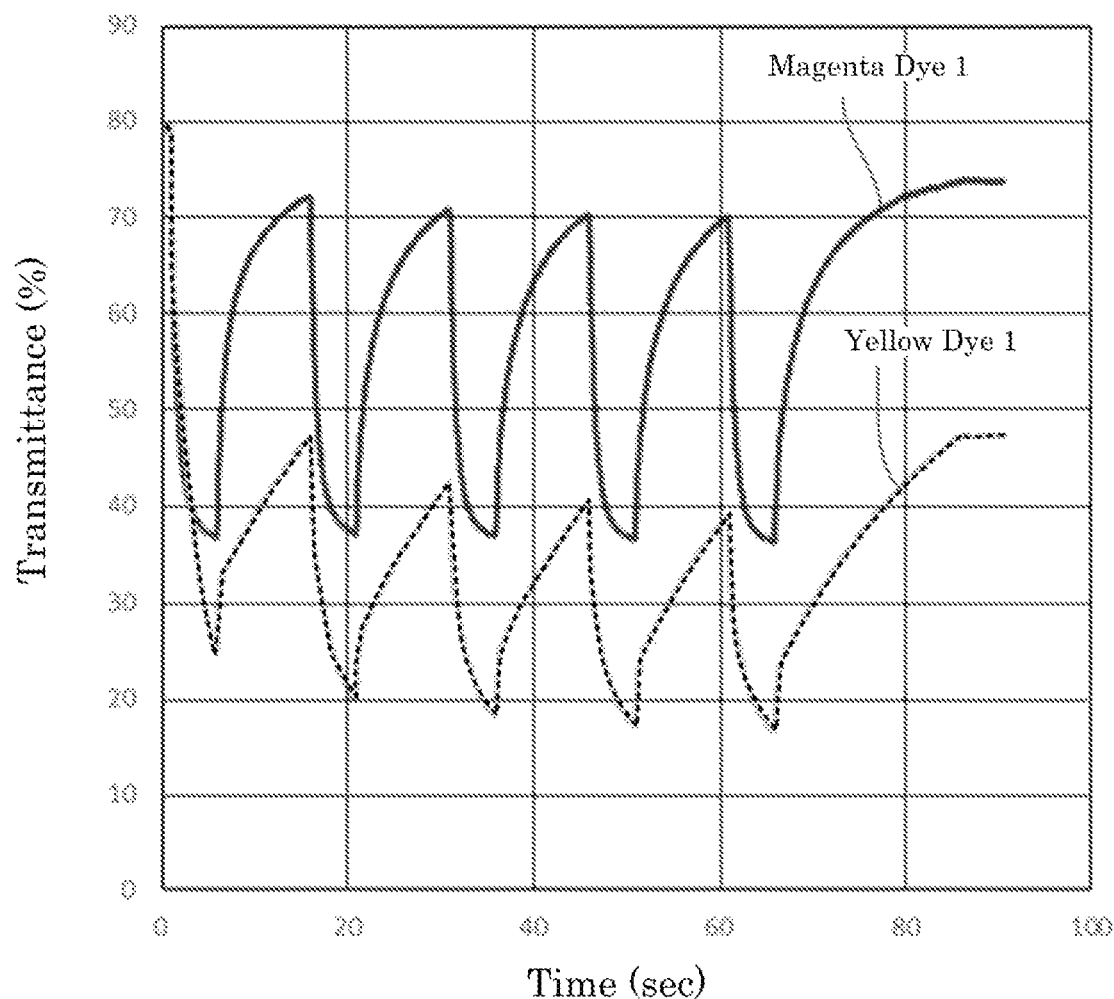

[Fig. 7]
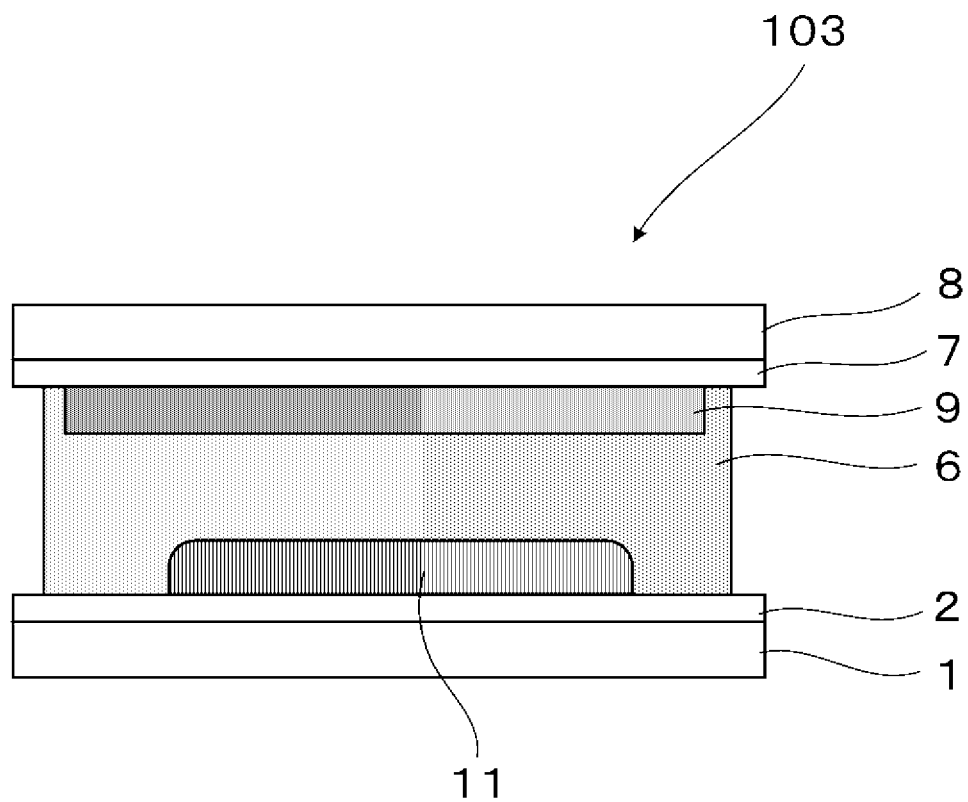

[Fig. 8]
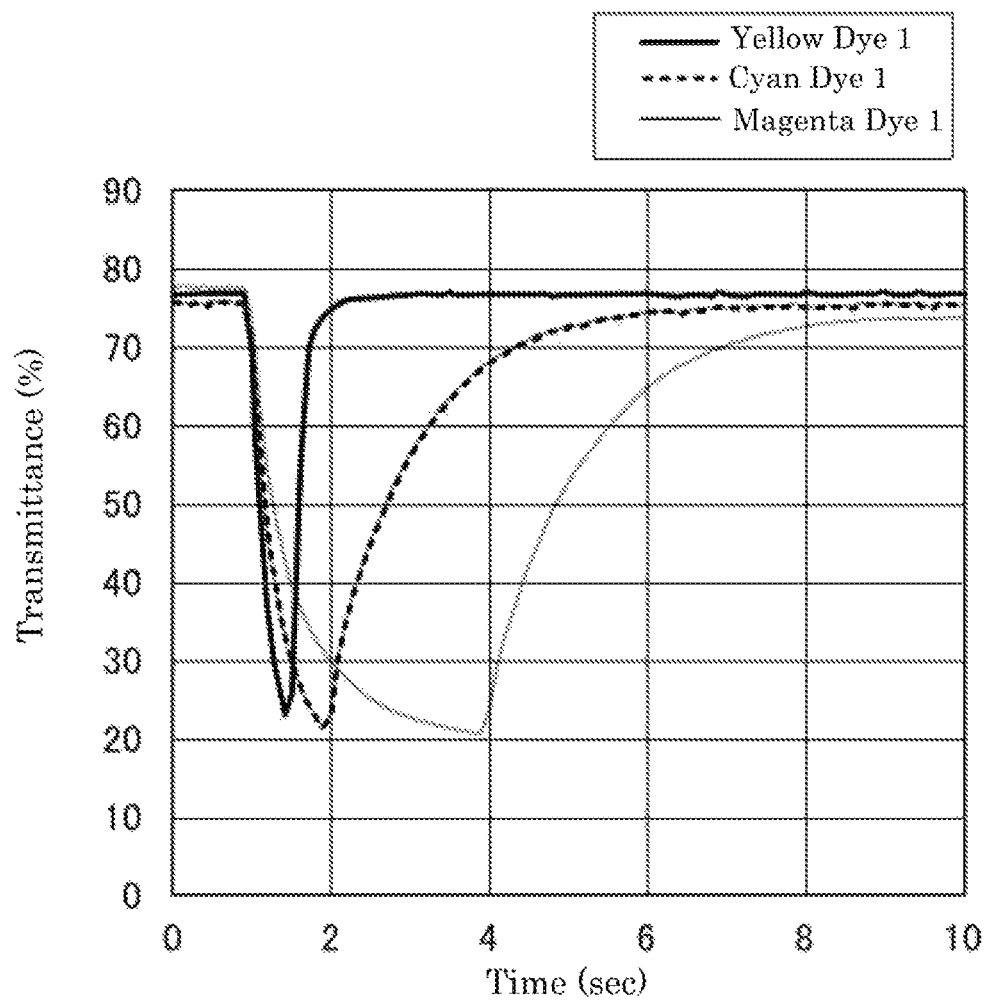

[Fig. 9]
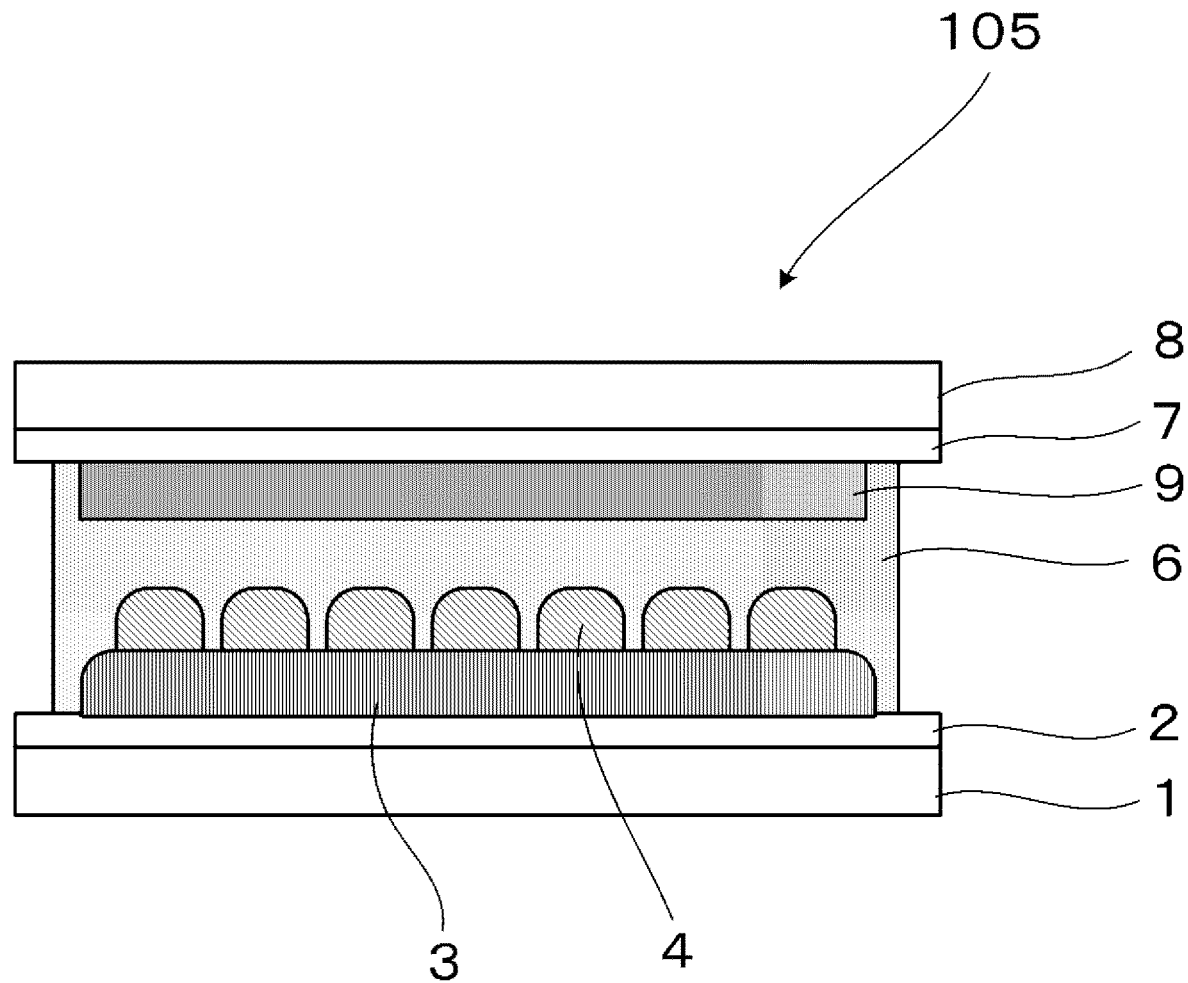
[Fig. 10]
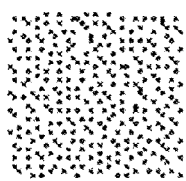 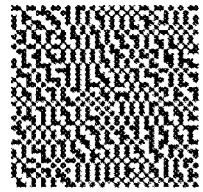 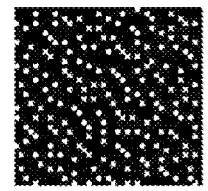 
Pattern 1　　　Pattern 2　　　Pattern 3　　　Pattern 4

[Fig. 11]
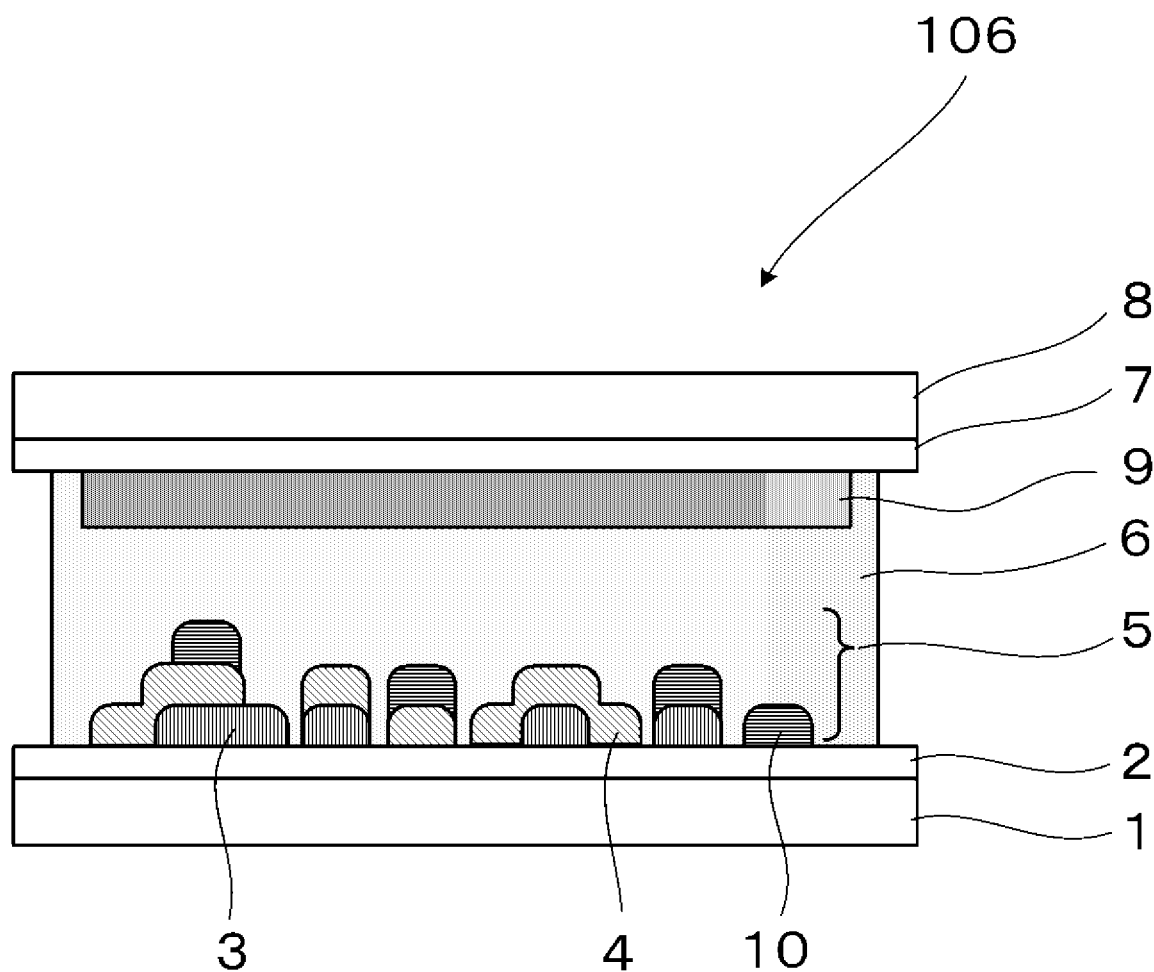

[Fig. 12A]
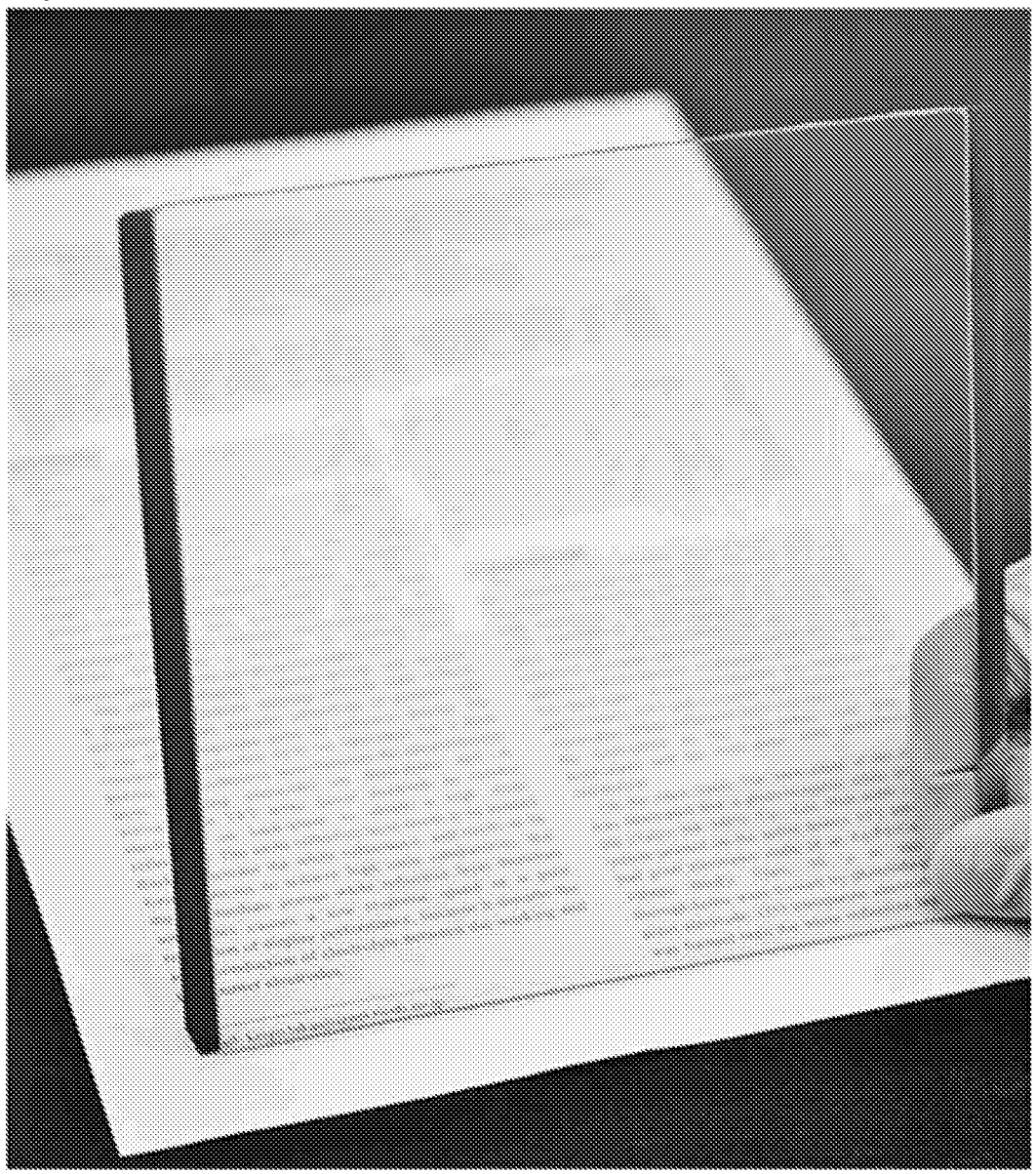

[Fig. 12B]
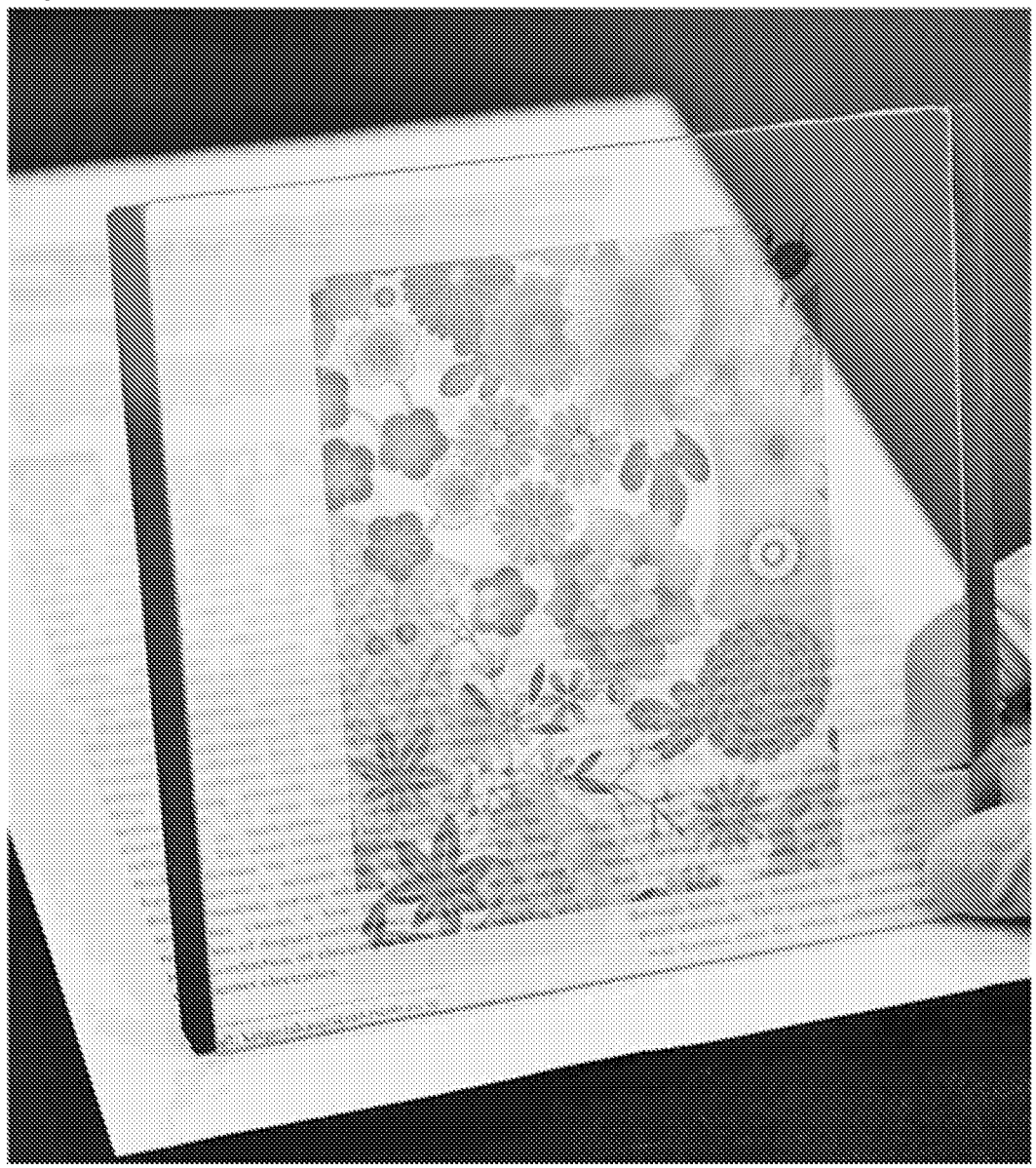

[Table 6]

| Pattern | Cyan | Magenta | Yellow | Cyan on magenta |
|---|---|---|---|---|
| Pattern 1 | Example 10-1 | Example 11-1 | Example 12-1 | Example 13-1 |
| Pattern 2 | Example 10-2 | Example 11-2 | Example 12-2 | Example 13-2 |
| Pattern 3 | Example 10-3 | Example 11-3 | Example 12-3 | Example 13-3 |
| Pattern 4 | Example 10-4 | Example 11-4 | Example 12-4 | Example 13-4 |

FIG. 13

ELECTROCHROMIC DISPLAY DEVICE AND PRODUCTION METHOD OF ELECTROCHROMIC DISPLAY DEVICE

TECHNICAL FIELD

The present disclosure relates to an electrochromic display device and a production method of the electrochromic display device.

BACKGROUND ART

Researches and developments of the electrochromic technology have been widely performed with aiming to achieve applications for dimming and full-color displays on electronic paper etc. However, commercially available dimming windows or anti-glare mirrors are only available in dark blue, and substrates of such products are limited to glass substrates. Therefore, the available color and substrate of the above-mentioned product in the art are a cause for inhibiting expansion of applicability of the electrochromic technology.

It has been know that an organic electrochromic material generally exhibits various coloring reactions depending on a design of a molecule. Moreover, an improvement in response and a pattern display can be realized by fixing an electrochromic material to a region adjacent to an electrode.

For example, the present inventors have proposed an electrochromic display device that colors with two electrodes facing each other, and coloring can be achieved with excellent charge efficiency because coloring can be obtained with both electrodes (see, for example, PTL 1).

Moreover, proposed is a method where an ink including an electrochromic dye is directly printing on a porous electrode layer through inkjet printing to form a pattern (see, for example, PTL 2). In the proposed method, the porous electrode layer functions as an ink-accepting layer to adsorb or cure the ink on the porous electrode layer.

Moreover, there is a recent report that an electrochromic layer is directly patterned on an electrode through inkjet printing (see, for example, NPL 1).

CITATION LIST

Patent Literature

[PTL 1] Japanese Unexamined Patent Application Publication No. 2016-038572
[PTL 2] Japanese Patent No. 4128139

Non-Patent Literature

[NPL 1] B.-H. Chen et. al., "Inkjet Printed Multi-color Thin Films for High-Contrast Electrochromic Devices" International Display Workshop 2015 Proceedings EP 2-1

SUMMARY OF INVENTION

Technical Problem

The present disclosure has an object to provide an electrochromic display device that can realize a vivid full-color display.

Solution to Problem

According to one aspect of the present disclosure, an electrochromic display device of the present disclosure includes a pair of supporting substrates facing each other, a pair of electrodes each disposed on the supporting substrate and facing each other, an electrochromic display layer disposed in contact with at least one of the pair of the electrodes; and an electrolyte layer disposed between the pair of the electrode. The electrochromic display layer includes a plurality of electrochromic layers exhibiting mutually different coloring colors. The plurality of the electrochromic layers are laminated on the electrode at least in a partial area of the electrode.

Advantageous Effects of Invention

The present disclosure can provide an electrochromic display device that can realize a vivid full-color display.

BRIEF DESCRIPTION OF DRAWINGS

FIG. 1 is a schematic view illustrating one example of an electrochromic display device of the present disclosure.
FIG. 2 is a schematic view illustrating another example of the electrochromic display device of the present disclosure.
FIG. 3 is a schematic view illustrating another example of the electrochromic display device of the present disclosure.
FIG. 4A is a graph depicting the result of the driving test of the electrochromic display device of Example 1.
FIG. 4B is a graph depicting the result of the driving test of the electrochromic display device of Example 2.
FIG. 4C is a graph depicting the result of the driving test of the electrochromic display device of Example 3.
FIG. 4D is a graph depicting the result of the driving test of the electrochromic display device of Reference Example 1.
FIG. 4E is a graph depicting the result of the driving test of the electrochromic display device of Reference Example 2.
FIG. 4F is a graph depicting the result of the driving test of the electrochromic display device of Reference Example 3.
FIG. 5A is a graph depicting the result of the driving test of the electrochromic display device of Example 4.
FIG. 5B is a graph depicting the result of the driving test of the electrochromic display device of Example 5.
FIG. 5C is a graph depicting the result of the driving test of the electrochromic display device of Example 6.
FIG. 6A is a graph depicting the result of the repetitive driving test of the electrochromic display device of Example 4.
FIG. 6B is a graph depicting the result of the repetitive driving test of the electrochromic display device of Example 5.
FIG. 6C is a graph depicting the result of the repetitive driving test of the electrochromic display device of Example 6.
FIG. 6D is a graph depicting the result of the repetitive driving test of the electrochromic display device of Reference Example 4.
FIG. 6E is a graph depicting the result of the repetitive driving test of the electrochromic display device of Reference Example 5.
FIG. 6F is a graph depicting the result of the repetitive driving test of the electrochromic display device of Reference Example 6.
FIG. 7 is a schematic view illustrating the electrochromic display device for measuring response speed, used in Examples 7 to 9.

FIG. 8 is a graph depicting the change in transmittance of the electrochromic display device of Examples 7 to 9.

FIG. 9 is a schematic view illustrating the electrochromic display device used in Examples 13-1 to 13-4.

FIG. 10 is a pattern chart for gradation expression according to the error diffusion method.

FIG. 11 is a schematic view illustrating the electrochromic display device used in Examples 10-1 to 10-4, 11-1 to 11-4, 12-1 to 12-4, and 14.

FIG. 12A is a photograph depicting a decolored state of the electrochromic display device of Example 14.

FIG. 12B is a photograph depicting a colored state of the electrochromic display device of Example 14.

FIG. 13 shows a photograph of Table 6.

DESCRIPTION OF EMBODIMENTS (Electrochromic Display Device)

A first embodiment of an electrochromic display device of the present disclosure includes a pair of supporting substrates facing each other, a pair of electrodes each disposed on the supporting substrate and facing each other, an electrochromic display layer disposed in contact with at least one of the pair of the electrodes, and an electrolyte layer disposed between the pair of the electrode. The electrochromic display layer includes a plurality of electrochromic layers exhibiting mutually different coloring colors. The plurality of the electrochromic layers are laminated on the electrode at least in a partial area of the electrode. The electrochromic display device may further include other parts according to the necessity.

A second embodiment of the electrochromic display device of the present disclosure includes a pair of supporting substrates facing each other, a pair of electrodes each disposed on the supporting substrate and facing each other, an electrochromic display layer disposed in contact with at least one of the pair of the electrodes, and an electrolyte layer disposed between the pair of the electrode. The electrochromic display layer includes three or more electrochromic layers exhibiting mutually different coloring colors. At least one of the three or more electrochromic layers colors in cyan, at least one of the three or more electrochromic layers colors in magenta, and at least one of the three or more electrochromic layers colors in yellow. Among the three or more electrochromic layers, the two or more electrochromic layers are laminated on the electrode at least in a partial area of the electrode. The electrochromic display device may further include other parts according to the necessity.

The first and second embodiments of the electrochromic display device of the present disclosure are based on the following insight. A known method for directly printing an electrochromic dye on a porous electrode layer through inkjet printing to form a pattern has a drawback that high resolution cannot be achieved due to bleeding of the ink. Moreover, a multi-color display electrochromic display device, in which two-color electrochromic inks have been printed, is disclosed. However, there are problems that the inks may be overflown in the multi-color display due to the larger number of colors for use, and bleeding may be accelerated.

Moreover, the electrochromic display device of the present disclosure is based on the following insight. In the art, an electrochromic layer is formed by applying two types of electrochromic inks into a lattice pattern through inkjet printing, and it is known that a multi-color can be expressed with mixed colors of two colors. However, the above-mentioned multi-color is realized by aligning two-color inks two-dimensionally in a space and cannot realize a full-color with three primary-color inks. Moreover, there are variations in response depending on the color.

In order to realize a vivid full-color display with one electrochromic display layer, it is important for the second embodiment of the electrochromic display device of the present disclosure that the one electrochromic display layer includes three primary color elements of cyan, magenta, and yellow. It is also important that the electrochromic display layer including three- or more electrochromic layers is laminated on one of the electrodes.

In the present specification, the term "laminated" means that the electrochromic layers are laminated with the adjacent electrochromic layer at least in a partial area, and may be a state where the electrochromic layers are laminated to be in contact with one another, or a state where the electrochromic layers are laminated via a transparent intermediate layer between the electrochromic layers.

It is preferable that the each of the electrochromic layers include an electrochromic material where the electrochromic materials exhibit mutually different coloring colors, each of the electrochromic materials reversibly perform a coloring reaction or decoloring reaction due to an electrochemical redox reaction, and a difference in a redox potential of the coloring reaction or decoloring reaction between the electrochromic materials be 0.1 V or less. As a result of the above-described configuration, it is possible that at least two colors can be colored simultaneously. Moreover, an electrochromic display device in which energy levels can be matched and a color balance is not lost after coloring with applying voltage between the electrodes and discharging the electrodes can be provided.

It is preferable that the electrochromic layers be disposed from a side closest to the electrode in the order of the lower absolute value of a redox potential of the electrochromic material included in the electrochromic layer relative to a reaction of the electrode to face. As a result of the above-described configuration, it is possible to decolor the electrochromic layer that is remote from the electrode, and an electrochromic display device capable of simultaneously decolor at least two colors can be provided.

It is preferable that the electrochromic layers be disposed from a side closest to the electrode in the order of the fastest reaction speed of the coloring reaction or the decoloring reaction at voltage applied between the electrodes. As a result of the above-described configuration, it is possible to decolor the electrochromic layer that is remote from the electrode, and an electrochromic display device capable of simultaneously decolor at least two colors can be provided.

Each of the electrochromic layers preferably displays pseudo gradation formed with shades according to an error diffusion processing method. As a result, gradation can be realized, and an electrochromic display device capable of expressing the predetermined tint with a balance of each color can be provided.

It is preferable that a counter electrode layer be formed on the electrode facing the electrode on which the electrochromic display layer is disposed, the counter electrode layer do not change a color in a visible light region with applied voltage which causes a coloring reaction or a decoloring reaction of the electrochromic display layer facing the counter electrode layer, and an area of the counter electrode layer be larger than an area of the electrochromic display layer. As a result of the above-described configuration, coloring or decoloring voltage can be reduced owing to the introduction of the counter electrode layer and therefore an electrochromic display device whose response speed has been improved can be provided. Moreover, freedom of a position for overlapping is increased and an electrochromic display device that can be produced by a simple method can be provided.

Particularly in a case where a plurality of electrochromic layers each having a pattern are formed, it is ideal that the counter electrode layer is formed in a region including all of the electrochromic layers. Expected effects obtainable by the above-described counter electrode layer include that accuracy in bonding positioning between the display substrate and the counter substrate is not demanded, and a low production cost is realized.

<Pair of Supporting Substrates>

The pair of the supporting substrates includes a display substrate and a counter substrate. Among the pair of the supporting substrates, the supporting substrate disposed at a side where an electrochromic display layer is formed is referred to as a display substrate, and the supporting substrate facing to the display substrate is referred to as a counter substrate. Note that, both supporting substrates may be display substrates because the electrochromic display layer is not necessarily formed on one of the supporting substrates.

Any transparent or translucent material can be used as the pair of supporting substrates.

Examples of transparent supporting substrates include glass substrates, resin film substrates (e.g., various plastic films), and composite substrates of glass and a resin film.

Examples of translucent supporting substrates include silicon substrates, metal substrates (e.g., stainless steel), and laminates of the above-listed substrates.

The electrochromic display device of the present disclosure can be used as a reflective display device or a transparent display device.

In case of the transparent display device, both the display substrate and the counter substrate are preferably transparent substrates.

In case of the reflective display device, one substrate among a pair of substrates may be an opaque substrate, such as a white substrate.

The white substrate is not particularly limited, and examples of the white substrate known in the art include various white plastic substrates, and substrates in each of which a white reflective layer is further disposed on the display substrate or the counter substrate.

<Pair of Electrodes>

The pair of electrodes include a display electrode and a counter electrode.

The pair of electrodes are not particularly limited as long as the electrodes are formed of a material having conductivity, and may be appropriately selected depending on the intended purpose. Examples of the pair of electrodes include electrodes having transparency and electrodes not having transparency. Among the above-listed examples, electrodes having transparency are preferably used.

Examples of a material of the electrode having transparency include metal oxides, such as indium oxide, zinc oxide, tin oxide, indium tin oxide (ITO), and indium zinc oxide. Moreover, transparent network electrodes of silver nanowires, gold nanowires, carbon nanotubes, or metal oxide, or composite layers of the above-listed electrodes can be also selected as the electrodes.

Examples of the electrode not having transparency include metals, such as aluminium, titanium, zinc, silver, gold, and platinum, alloys including the above-listed metals, and carbon.

Formation methods of the pair of electrodes are not particularly limited and may be appropriately selected depending on the intended purpose. Examples of the formation methods include vacuum vapor deposition, sputtering, and ion plating.

As long as a material of the pair of electrodes can be applied, various printing methods can be also used. Examples of the printing methods include spin coating, casting, micro gravure coating, gravure coating, bar coating, roll coating, wire bar coating, dip coating, slit coating, capillary coating, spray coating, nozzle coating, gravure printing, screen printing, flexo printing, offset printing, reverse printing, and inkjet printing.

Light transmittance of the electrode having transparency is not particularly limited and may be appropriately selected depending on the intended purpose. The light transmittance is preferably 60% or greater but less than 100%, more preferably 90% or greater but less than 100%. When the light transmittance is 60% or greater, a displayed image is bright, and display properties, such as brightness and vividness of color, are excellent.

A thickness of the electrode having transparency is not particularly limited and may be appropriately selected depending on the intended purpose. In case of an ITO electrode, a thickness of the electrode is preferably 10 nm or greater but 300 nm or less.

<Electrochromic Display Layer>

The electrochromic display layer is disposed in a manner that the electrochromic display layer is in contact with at least one of a pair of the electrodes, and is at least in contact with a display electrode.

The electrochromic display layer includes a plurality of electrochromic layers exhibiting mutually different coloring colors.

The electrochromic display layer includes three or more electrochromic layers exhibiting mutually different coloring colors, and the electrochromic layers color in cyan, magenta, and yellow, respectively.

In a case where an electrochromic display layer including a first electrochromic layer and a second electrochromic layer both exhibiting mutually different coloring colors is disposed, for example, the first electrochromic layer is disclosed to be in contact with the side of the display electrode rather than the second electrochromic layer. Therefore, the second electrochromic layer is not necessarily disposed below the first electrochromic layer. Accordingly, the second electrochromic layer is in contact with the display electrode in the region where the first electrochromic layer is not disposed. Moreover, it is important that the first electrochromic layer and the second electrochromic layer are laminated at least in a partial area.

The first electrochromic layer and the second electrochromic layer are laminated, but the first and second electrochromic layers are not necessarily completely separated at an interface, and may be mixed at some degrees at the interface. Specifically, the interface between the first electrochromic layer and the second electrochromic layer may have a structure where part of the second electrochromic layer infiltrates into a surface layer of the first electrochromic layer. The above-described structure has been known in general printing methods as a method by which wetting is stabilized and adhesion is improved due to partial infiltration of the ink when the ink for forming an upper layer is repelled by a bottom layer. Specifically, it is a method where a surface treatment is performed onto the bottom layer to increase roughness, or a surfactant is added to the ink for forming the upper layer.

When the electrochromic display layer disposed on the display electrode includes at least three electrochromic layers having mutually different coloring colors, i.e., a first electrochromic layer, a second electrochromic layer disposed on the first electrochromic layer, and a third electrochromic layer disposed on the second electrochromic layer, moreover, two of the electrochromic layers may be laminated at least in a partial area.

Since the first electrochromic layer is disposed to be closer to the side of the display electrode than the second electrochromic layer, the second and the third electrochromic layers are not disposed below the first electrochromic layer and the third electrochromic layer is not disposed below the second electrochromic layer. Accordingly, in the region where the first electrochromic layer is not disposed, the second electrochromic layer is in contact with the display electrode. In the region where the first and second electrochromic layers are not disposed, the third electrochromic layer is in contact with the display electrode. Moreover, it is important that the first electrochromic layer and the second electrochromic layer, or the second electrochromic layer and the third electrochromic layer, or the first electrochromic layer and the third electrochromic layer are laminated at least in a partial area. Moreover, the number of layers to be laminated may be increased, such as fourth and fifth electrochromic layers, in the same manner as above.

It is important that a plurality of electrochromic layers for forming the electrochromic display layer exhibit mutually different coloring colors. The electrochromic phenomenon is a phenomenon that an absorption of an electrochromic dye material changes through an electrical redox reaction. Specifically, a full-color display is realized by subtractive color mixing of three primary colors of cyan, magenta, and yellow, similar to a color copy, not by self-emitting light. In a case where a first electrochromic layer, a second electrochromic layer, and a third electrochromic layer are disposed, therefore, the electrochromic layers are preferably electrochromic layers coloring in cyan, magenta, and yellow, respectively. Moreover, a full-color display with four colors can be also realized with a configuration including electrochromic display layers of four colors, cyan, magenta, yellow, and black, by introducing a fourth electrochromic layer.

The subtractive color mixing is a system where multiple colors are created with a combination of three primary colors. For example, a region where cyan and magenta are overlapped appears in the color of blue, a region where magenta and yellow are overlapped appears in the color of red, and a region where yellow and cyan are overlapped appears in the color of green. Moreover, a region where cyan, magenta, and yellow are overlapped appears in black.

The electrochromic display layers change color through electrical redox reactions. Electrochromic materials are classified into reduction-coloring electrochromic materials that color from being transparent as a result of electrical reduction, and oxidization-coloring electrochromic materials that color from being transparent as a result of electrical oxidization.

Types of the electrochromic layers (e.g., a first electrochromic layer, a second electrochromic layer, a third electrochromic layer, and a fourth electrochromic layer) for use are preferably identical, e.g., reduction-coloring and oxidization-coloring. When all of the electrochromic layers are identically reduction-coloring or oxidization-coloring, the electrochromic layers (e.g., a first electrochromic layer, a second electrochromic layer, a third electrochromic layer, and a fourth electrochromic layer) can be colored simultaneously by applying voltage.

<<Electrochromic Material>>

The electrochromic display layer includes an electrochromic material.

The electrochromic material may include an inorganic electrochromic compound or an organic electrochromic compound. Moreover, conductive polymers that are known to exhibit electrochromism can be also used.

Examples of the inorganic electrochromic compound include tungsten oxide, molybdenum oxide, iridium oxide, and titanium oxide.

Examples of the organic electrochromic compound include viologen, rare-earth phthalocyanine, and styryl.

Examples of the conductive polymer include polypyrrole, polythiophene, polyaniline, and derivatives of the above-listed conductive polymers.

Specific examples of polymer-based electrochromic compounds and dye-based electrochromic compounds include: low-molecular weight organic electrochromic compounds, such as azobenzene-based compounds, anthraquinone-based compounds, diaryl ethene-based compounds, dihydroprene-based compounds, dipyridine-based compounds, styryl-based compounds, styryl spiropyran-based compounds, spiro oxazine-based compounds, spirothiopyran-based compounds, thioindigo-based compounds, tetrathiafulvalene-based compounds, terephthalic acid-based compounds, triphenylmethane-based compounds, triaryl amine-based compounds, naphthopyranbased compounds, viologen-based compounds, pyrazoline-based compounds, phenazine-based compounds, phenylenediamine-based compounds, phenoxazine-based compounds, phenothiazine-based compounds, phthalocyanine-based compounds, fluoran-based compounds, fulgide-based compounds, benzopyran-based compounds, and metallocene-based compounds; and conductive polymers, such as polyaniline, and polythiophene.

Among the above-listed examples, a triaryl amine-based low-molecular-weight organic electrochromic compound represented by General Formula (1) below is preferably used. When a radical-polymerizable functional group is introduced to part of functional groups of the triaryl amine-based compound, moreover, polymerization or insolubility can be easily achieved and therefore a plurality of electrochromic layers can be overlapped.

$$A_n\text{-}B_m \quad \text{(General Formula (1))}$$

In General Formula (1), m is 0 when n=2 is satisfied, m is 0 or 1 when n=1 is satisfied; at least one of A and B has a radical-polymerizable functional group, where A is a structure represented by General Formula (2) below and is bonded to B at a position that is any of $R_1$ through $R_{15}$, and B is a structure represented by General Formula (3) below and is bonded to A at a position that is any of $R_{16}$ through $R_{21}$.

(General Formula (2))

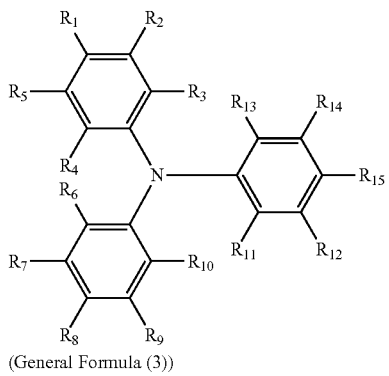

(General Formula (3))

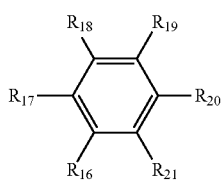

In General Formulae (2) and (3), $R_1$ through $R_{21}$ are all monovalent organic groups that may be identical or different, and at least one of the monovalent organic groups is a radical-polymerizable functional group.

The plurality of electrochromic layers preferably include a triaryl amine derivative having a radical-polymerizable functional group represented by General Formula (1). Formation of the plurality of electrochromic layers through polymerization of the triaryl amine is advantageous because light fastness is excellent as well as achieving desirable repetitive driving (reversibility of a redox reaction) properties. Moreover, a decolored state of the electrochromic layers is transparent, and a coloring ability of a color of a high concentration can be obtained by an oxidization reaction.

Moreover, the electrochromic layers preferable include a cross-linked product obtained by crosslinking an electrochromic material (composition) including the triaryl amine derivative and another radical-polymerizable compound different from the triaryl amine derivative, because dissolution resistance and durability of the polymerized product are further improved.

—Monovalent Organic Groups—

The monovalent organic groups in General Formula (2) and General Formula (3) are each independently, a hydrogen atom, a halogen atom, a hydroxyl group, a nitro group, a cyano group, a carboxyl group, an alkoxycarbonyl group that may have a substituent, an aryloxycarbonyl group that may have a substituent, an alkylcarbonyl group that may have a substituent, an arylcarbonyl group that may have a substituent, an amide group, a monoalkylaminocarbonyl group that may have a substituent, a dialkylaminocarbonyl group that may have a substituent, a monoarylaminocarbonyl group that may have a substituent, a diarylaminocarbonyl group that may have a substituent, a sulfonic acid group, an alkoxysulfonyl group that may have a substituent, an aryloxysulfonyl group that may have a substituent, an alkylsulfonyl group that may have a substituent, an arylsulfonyl group that may have a substituent, a sulfone amide group, a monoalkylaminosulfonyl group that may have a substituent, a dialkylaminosulfonyl group that may have a substituent, a monoarylaminosulfonyl group that may have a substituent, a diarylaminosulfonyl group that may have a substituent, an amino group, a monoalkyl amino group that may have a substituent, a dialkyl amino group that may have a substituent, an alkyl group that may have a substituent, an alkenyl group that may have a substituent, an alkynyl group that may have a substituent, an aryl group that may have a substituent, an alkoxy group that may have a substituent, an aryloxy group that may have a substituent, an alkylthio group that may have a substituent, and arylthio group that may have a substituent, or a heterocyclic group that may have a substituent. Among the above-listed monovalent organic groups, an alkyl group, an alkoxy group, a hydrogen atom, an aryl group, an aryloxy group, a halogen group, an alkenyl group, and an alkynyl group are particularly preferable in view of stable operation and light fastness.

Examples of the halogen atom include a fluorine atom, a chlorine atom, a bromine atom, and an iodine atom. Examples of the alkyl group include a methyl group, an ethyl group, a propyl group, and a butyl group. Examples of the aryl group include a phenyl group and a naphthyl group. Examples of the aralkyl group include a benzyl group, a phenethyl group, and a naphthyl methyl group. Examples of the alkoxy group include a methoxy group, an ethoxy group, and a propoxy group. Examples of the aryloxy group include a phenoxy group, a 1-naphthyloxy group, a 2-naphthyloxy group, a 4-methoxyphenoxy group, and a 4-methylphenoxy group. Examples of the heterocycle group include carbazole, dibenzofuran, dibenzothiophene, oxadiazole, and thiadiazole.

Examples of a substituent further substituted with the substituent include a halogen atom, a nitro group, a cyano group, an alkyl group (e.g., a methyl group and an ethyl group), an alkoxy group (e.g., a methoxy group and an ethoxy group), an aryloxy group (e.g., a phenoxy group), an aryl group (e.g., a phenyl group and a naphthyl group), and an aralkyl group (e.g., a benzyl group and a phenethyl group).

—Radical-Polymerizable Functional Group—

The radical-polymerizable functional group is not particularly limited as long as the radical-polymerizable functional group is a group that has a carbon-carbon double bond and is capable of radical polymerization. Examples of the radical-polymerizable functional group include a 1-substituted ethylene functional group represented by General Formula (i) below and a 1,1-substituted ethylene functional group represented by General Formula (ii) below. Among the above-listed examples, an acryloyloxy group and a methacryloyloxy group are particularly preferable.

(1) 1-Substituted Ethylene Functional Group

[Chem.3]

     General Formula (i)

In General Formula (i) above, X1 is an arylene group that may have a substituent, an alkenylene group that may have a substituent, —CO— group, —COO— group, —CON(R$_{100}$)— group (R$_{100}$ is hydrogen, an alkyl group, an aralkyl group, or an aryl group), or —S— group.

Examples of the arylene group in General Formula (i) include a phenylene group that may have a substituent, and a naphthylene group. Examples of the alkenylene group include an ethenylene group, a propenylene group, and a butenylene group. Examples of the alkyl group include a methyl group and an ethyl group. Examples of the aralkyl group include a benzyl group, a naphthyl methyl group, and a phenethyl group. Examples of the aryl group include a phenyl group and a naphthyl group.

Specific examples of the 1-substituted ethylene functional group represented by General Formula (i) include a vinyl group, a styryl group, a 2-methyl-1,3-butadienyl group, a vinyl carbonyl group, an acryloyl group, an acryloyloxy group, an acryloylamide group, and a vinyl thio ether group.

(2) 1,1-Substituted Ethylene Functional Group

[Chem.4]

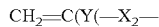

CH$_2$=C(Y(—X$_2$—           General Formula (ii)

In the formula above, Y is an alkyl group that may have a substituent, an aralkyl group that may have a substituent, an aryl group that may have a substituent, a halogen group, a cyano group, a nitro group, an alkoxy group, —COOR$_{101}$ group (R$_{101}$ is a hydrogen atom, an alkyl group that may have a substituent, an aralkyl group that may have a substituent, an aryl group that may have a substituent, or CONR$_{102}$R$_{103}$ (R$_{102}$ and R$_{103}$ may be identical or different and are each a hydrogen atom, an alkyl group that may have a substituent, an aralkyl group that may have a substituent, or an aryl group that may have a substituent)). Moreover, X2 is a substituent, single bond, or alkylene group identical to X1 of General Formula (i), except that at least one of Y and X2 is an oxycarbonyl group, a cyano group, an alkenylene group, or an aromatic ring.

Examples of the aryl group in General Formula (ii) include a phenyl group and a naphthyl group. Examples of the alkyl group include a methyl group and an ethyl group. Examples of the alkoxy group include a methoxy group and an ethoxy group. Examples of the aralkyl group include a benzyl group, a naphthyl methyl group, and a phenethyl group.

Specific examples of the 1,1-substituted ethylene functional group represented by General Formula (ii) include alpha-acryloyloxy chloride group, a methacryloyl group, a methacryloyloxy group, an alpha-cyanoethylene group, an alpha-cyanoacryloyloxy group, an alpha-cyanophenylene group, and a methacryloyl amino group.

Examples of substituents further substituting the substituents of X$_1$, X$_2$, and Y include a halogen atom, a nitro group, a cyano group, an alkyl group (e.g., a methyl group and an ethyl group), an alkoxy group (e.g., a methoxy group and an ethoxy group), an aryloxy group (e.g., a phenoxy group), an aryl group (e.g., a phenyl group and a naphthyl group), and an aralkyl group (e.g., a benzyl group and a phenethyl group).

As the triaryl amine derivative having the radical-polymerizable functional group, compounds represented by General Formulae (1-1) to (1-3) are preferable.

(General Formula 1-1)

[Chem.5]

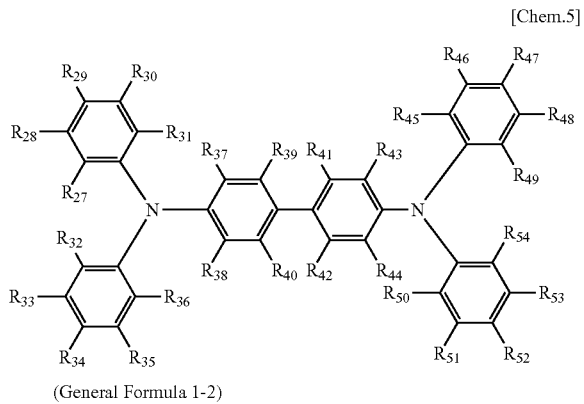

(General Formula 1-2)

[Chem.6]

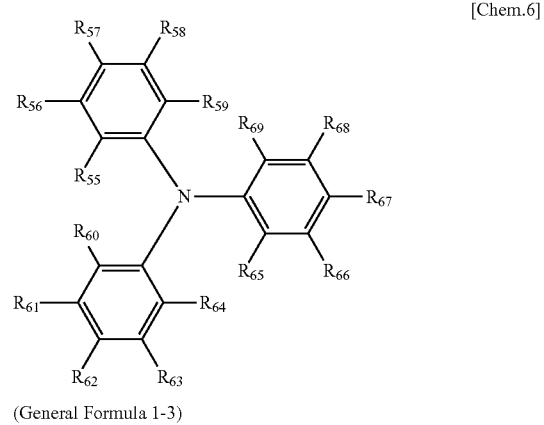

(General Formula 1-3)

[Chem.7]

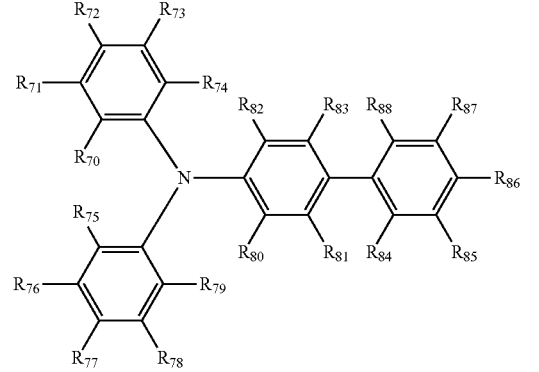

In General Formulae (1-1) to (1-3), R$_{27}$ through R$_{88}$ are identical or different, are all monovalent organic groups, and at least one of R$_{27}$ through R$_{88}$ is a radical-polymerizable functional group. Moreover, R$_{39}$ and R$_{41}$ may form together a ring structure and R$_{40}$ and R$_{42}$ may form together a ring structure. Examples of the monovalent organic groups and the radical-polymerizable functional group includes the same examples listed for General Formula (2) or (3).

Specific examples of compounds represented by General Formula (1) and compounds represented by General Formulae (1-1) to (1-3) include the following compounds, but are not limited to the following compounds.

(Exemplary Compound 1)
[Chem.8]
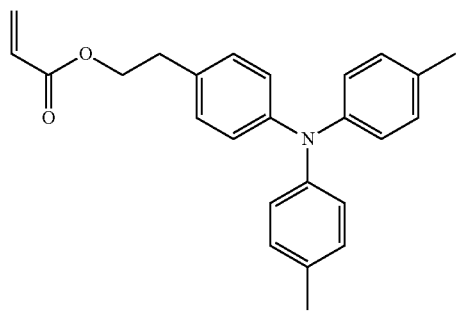
(Exemplary Compound 2)
[Chem.9]
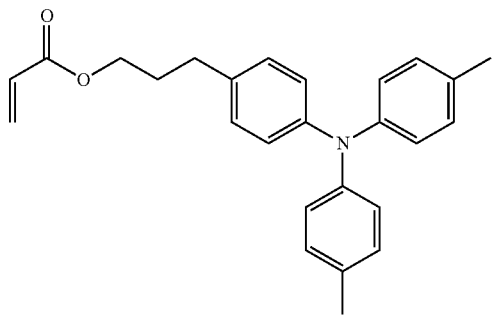 [SMILES: C=CC(=O)OCCCc1ccc(N(c2ccc(C)cc2)c2ccc(C)cc2)cc1]
(Exemplary Compound 3)
[Chem.10]
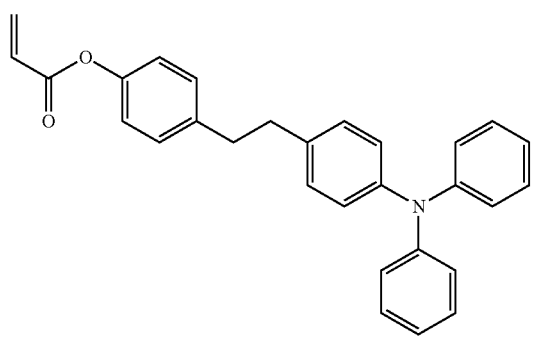
(Exemplary Compound 4)
[Chem.11]
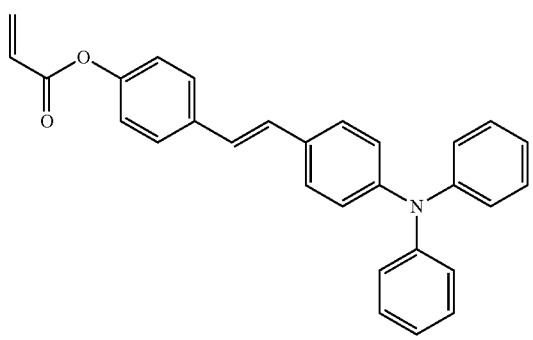
(Exemplary Compound 5)
[Chem.12]
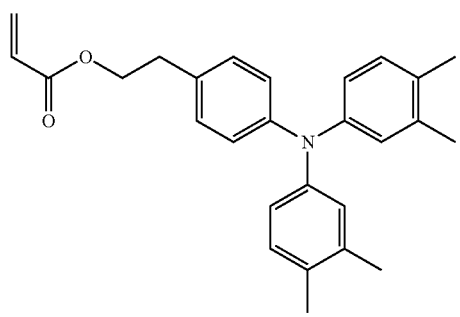
(Exemplary Compound 6)
[Chem.13]
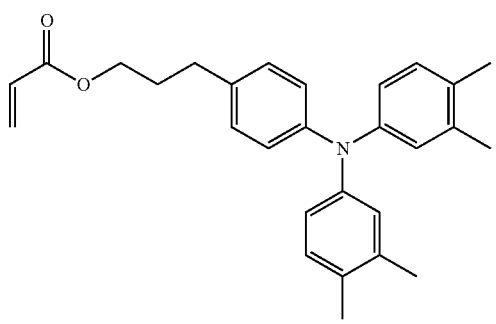
(Exemplary Compound 7)
[Chem.14]
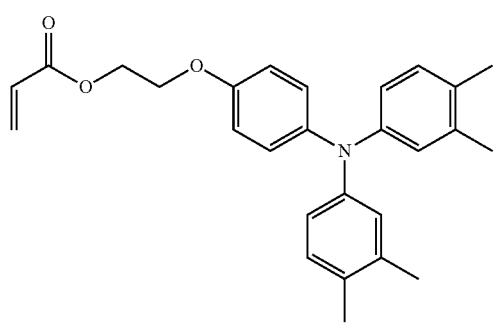
(Exemplary Compound 8)
[Chem.15]
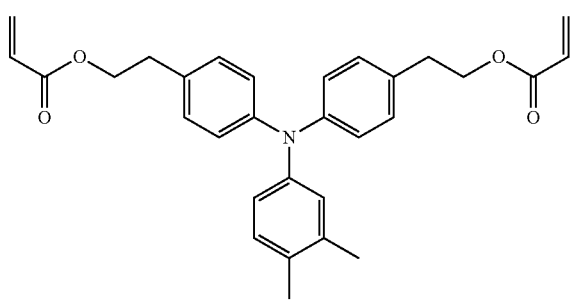

-continued
(Exemplary Compound 9)
[Chem.16]
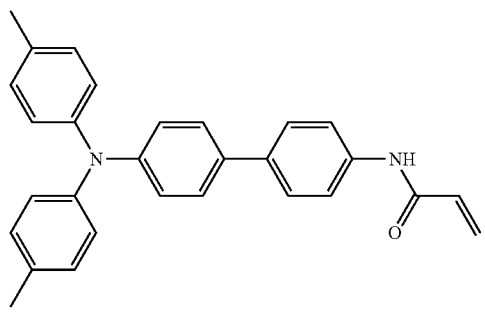
(Exemplary Compound 11)
(Exemplary Compound 10)
[Chem.17]
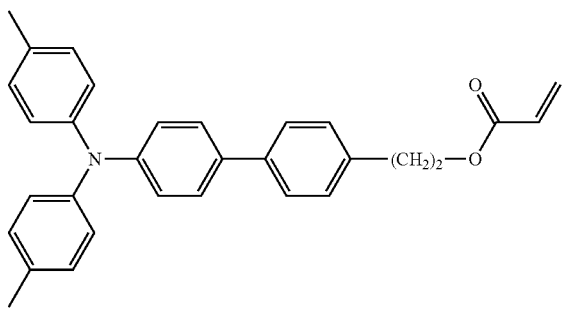
(Exemplary Compound 12)
[Chem.18]
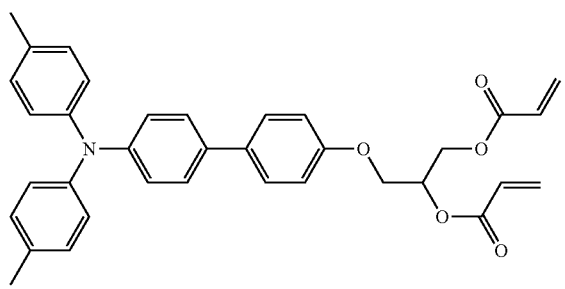
(Exemplary Compound 13)
[Chem.19]
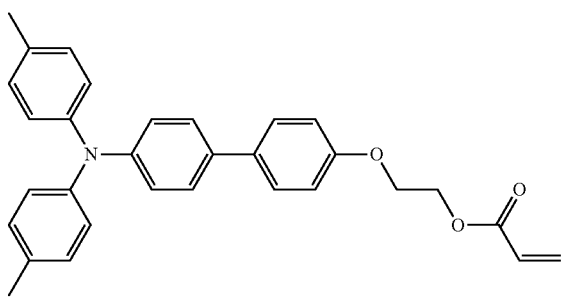
(Exemplary Compound 14)
[Chem.20]
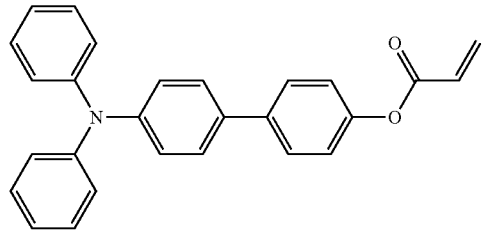
(Exemplary Compound 15)
[Chem.21]
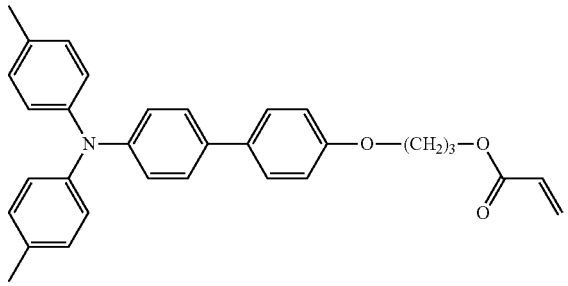
(Exemplary Compound 16)
[Chem.22]
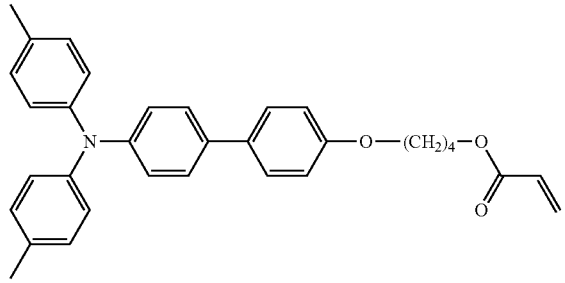
[Chem.23]
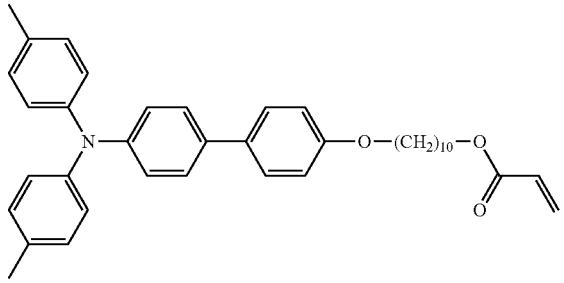

-continued
(Exemplary Compound 17)
[Chem.24]
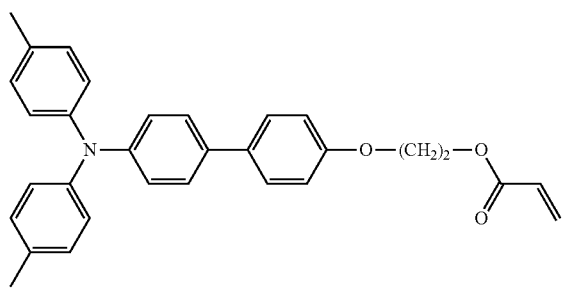
(Exemplary Compound 19)
[Chem.26]
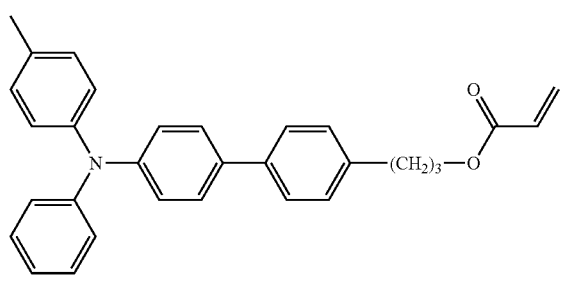
(Exemplary Compound 21)
[Chem.28]
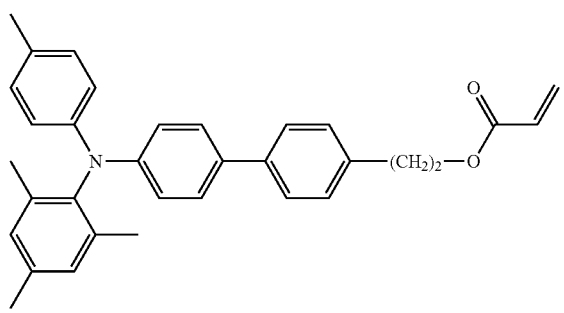
(Exemplary Compound 23)
[Chem.30]
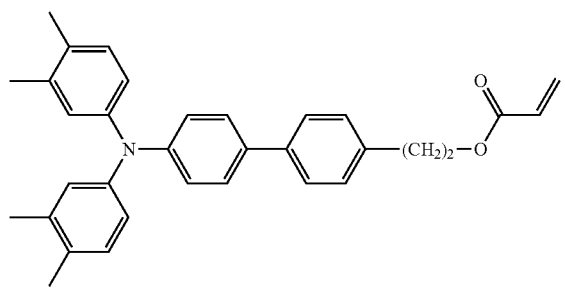
(Exemplary Compound 18)
[Chem.25]
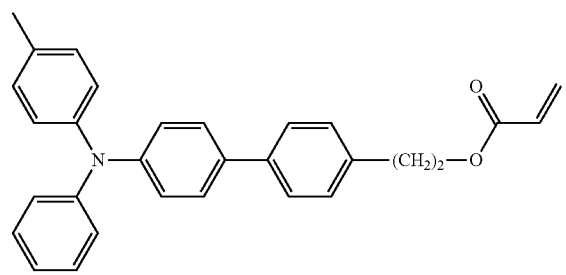
(Exemplary Compound 20)
[Chem.27]
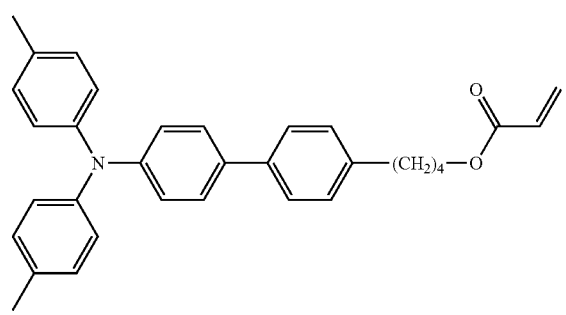
(Exemplary Compound 22)
[Chem.29]
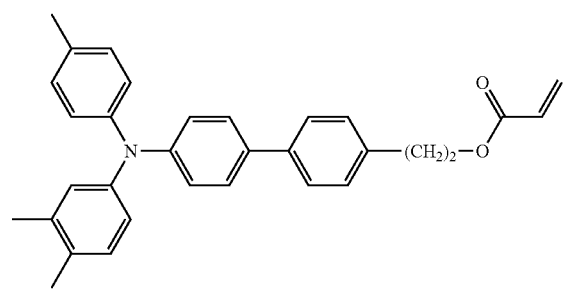
(Exemplary Compound 24)
[Chem.31]
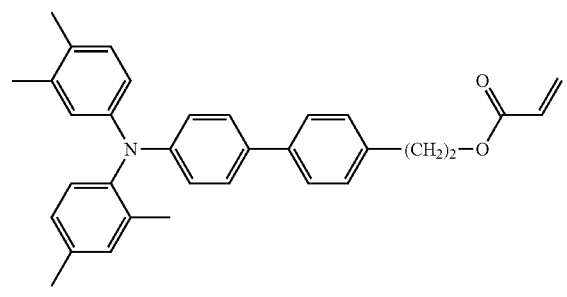

-continued
(Exemplary Compound 25) [Chem.32]
(Exemplary Compound 26) [Chem.33]
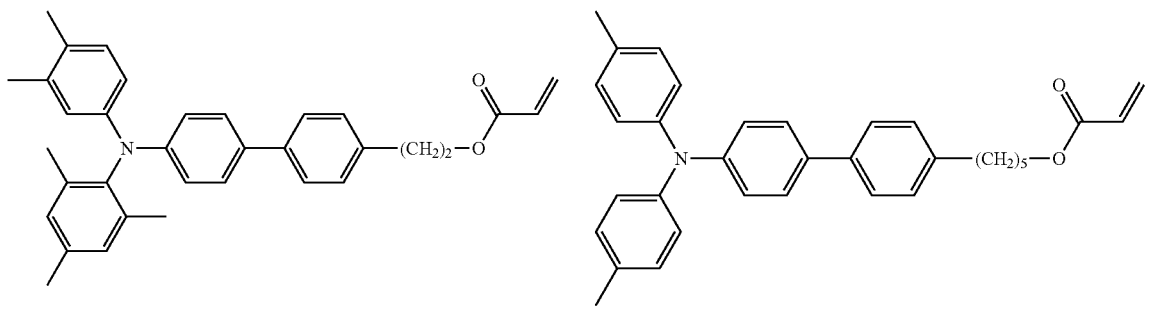
(Exemplary Compound 27) [Chem.34]
(Exemplary Compound 28) [Chem.35]
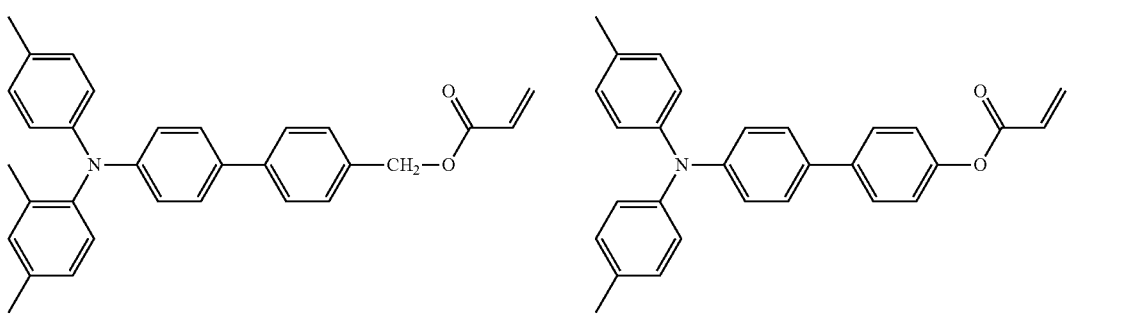
(Exemplary Compound 29) [Chem.36]
(Exemplary Compound 30) [Chem.37]
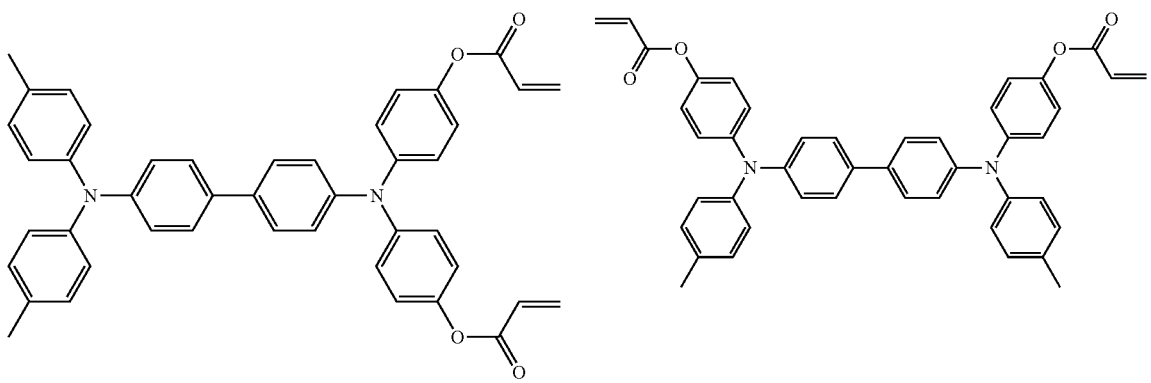
(Exemplary Compound 31) [Chem.38]
(Exemplary Compound 32) [Chem.39]
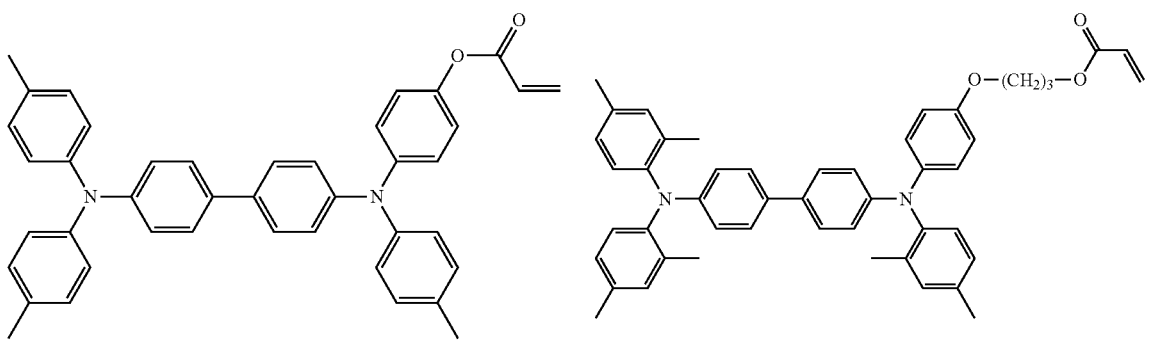

(Exemplary Compound 33) [Chem.40]
(Exemplary Compound 34) [Chem.41]
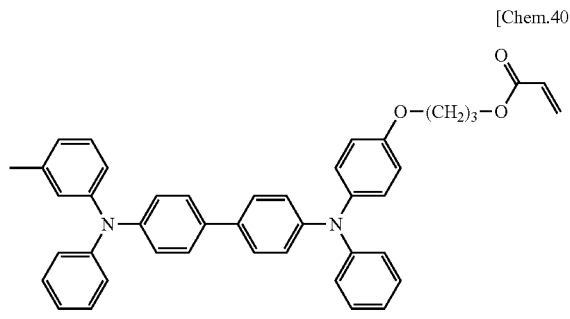
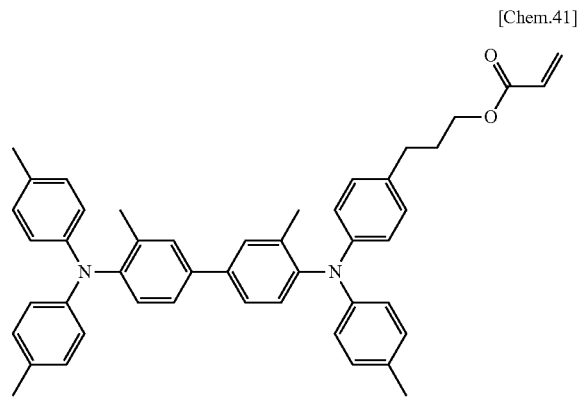
(Exemplary Compound 35)
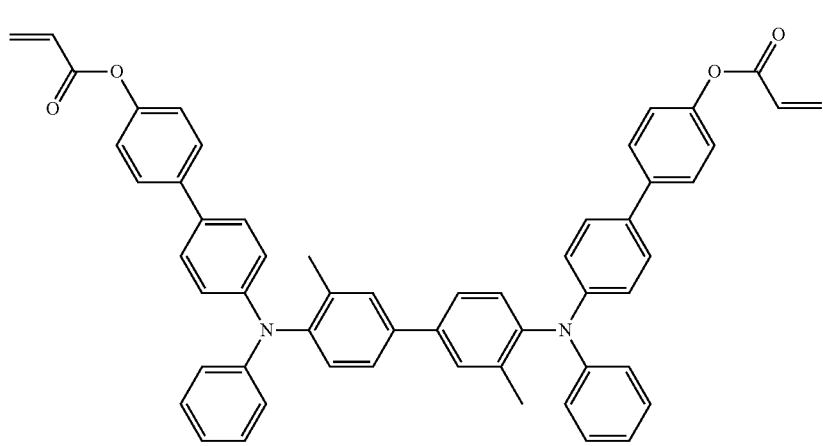
(Exemplary Compound 36) (Exemplary Compound 37)
[Chem.43] [Chem.44]
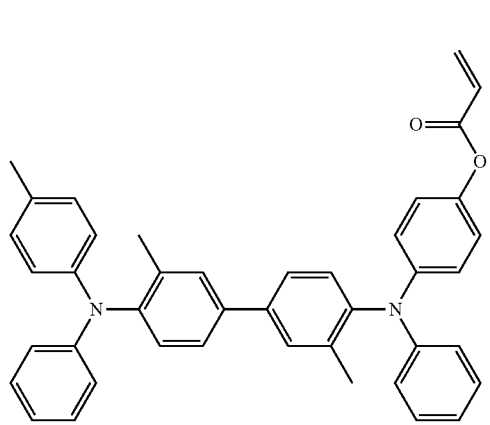
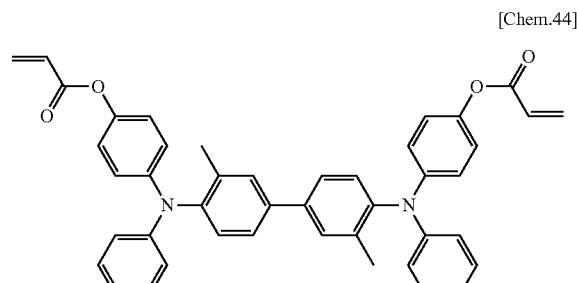

(Exemplary Compound 38)
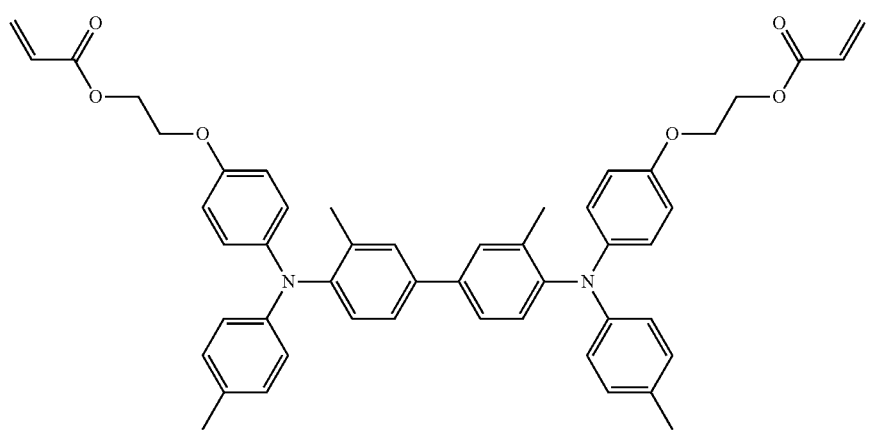 [SMILES: C=CC(=O)OCCCc1ccc(N(c2ccc(C)cc2)c2ccc(-c3ccc(N(c4ccc(C)cc4)c4ccc(CCCOC(=O)C=C)cc4)cc3)cc2)cc1]
(Exemplary Compound 39)
(Exemplary Compound 40)
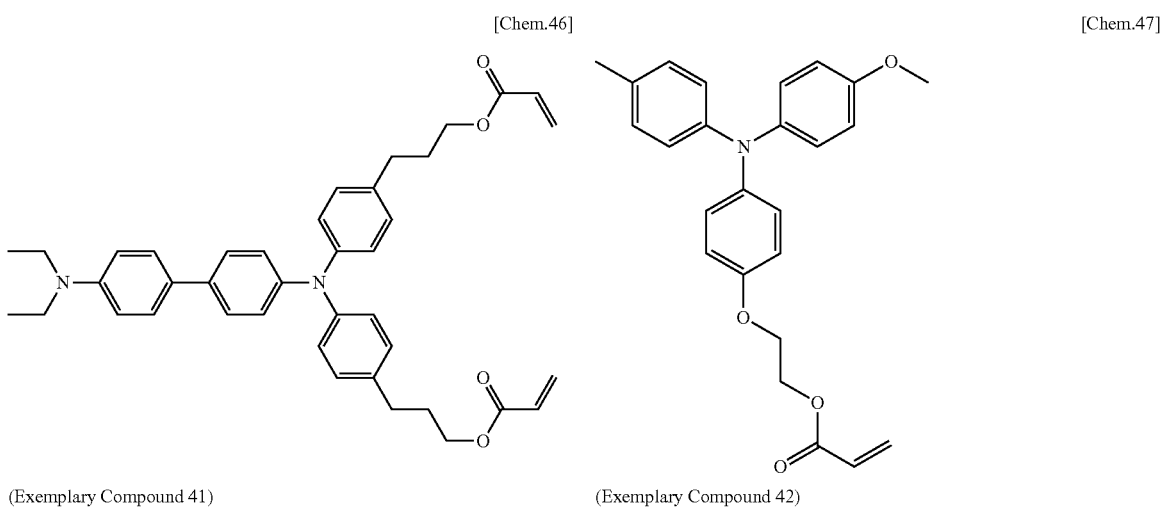
(Exemplary Compound 41)
(Exemplary Compound 42)
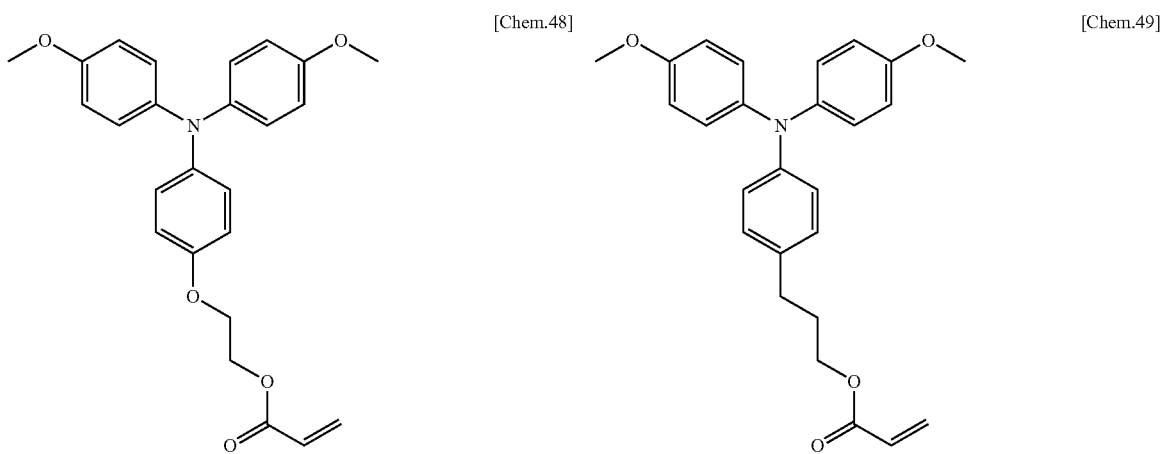

(Exemplary Compound 43)

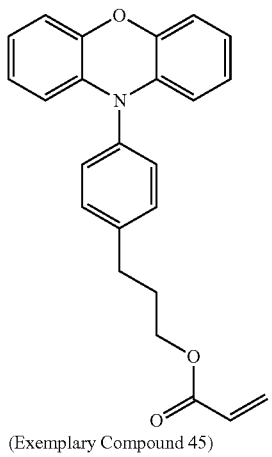

(Exemplary Compound 44)

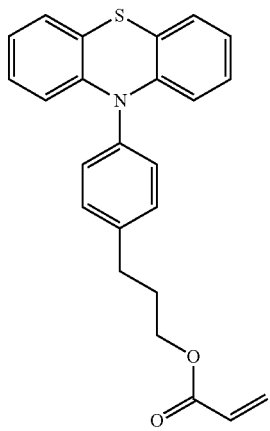 [SMILES: C=CC(=O)OCCCc1ccc(N2c3ccccc3Oc3ccccc32)cc1]

(Exemplary Compound 45)

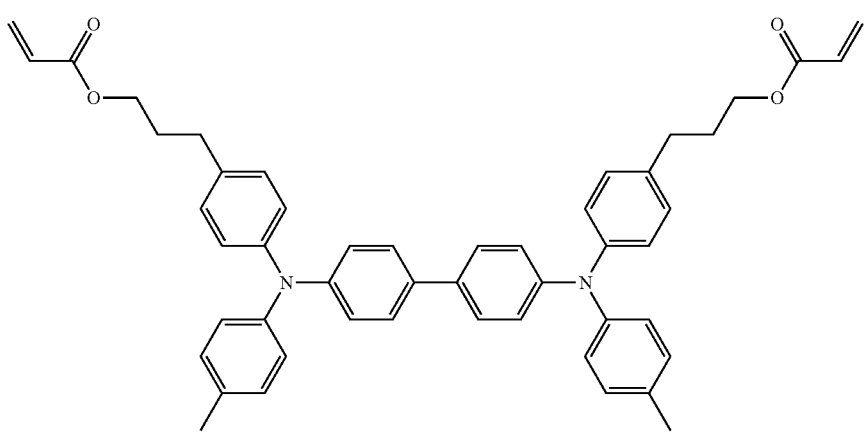

<Another Radical-Polymerizable Compound>

Another radical-polymerizable compound is a compound that is different from the triaryl amide derivative having a radical-polymerizable functional group and has at least one radical-polymerizable functional group.

Examples of another radical-polymerizable compound include monofunctional, difunctional, or trifunctional or higher radical-polymerizable compounds, functional monomers, and radical-polymerizable oligomers. Among the above-listed examples, a divalent or higher radical-polymerizable compound is particularly preferable.

A radical-polymerizable functional group in the above-mentioned another radical-polymerizable compound is similar to a radical-polymerizable functional group in the triaryl amide derivative having a radical-polymerizable functional group, but an acryloyloxy group and a methacryloyloxy group are particularly preferable as the radical-polymerizable functional group.

Examples of the monofunctional radical-polymerizable compound include 2-(2-ethoxyethoxy)ethylacrylate, methoxy polyethylene glycol monoacrylate, methoxy polyethylene glycol monomethacrylate, phenoxy polyethylene glycol acrylate, 2-acryloyloxyethylsuccinate, 2-ethylhexylacrylate, 2-hydroxyethylacrylate, 2-hydroxypropylacrylate, tetrahydrofurfuryl acrylate, 2-ethylhexylcarbitolacrylate, 3-methoxybutylacrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomers. The above-listed examples may be used alone or in combination.

Examples of the difunctional radical-polymerizable compound include 1,3-butanedioldiacrylate, 1,4-butanedioldiacrylate, 1,4-butanedioldimethacrylate, 1,6-hexanedioldiacrylate, 1,6-hexanedioldimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate. The above-listed examples may be used alone or in combination.

Examples of the trifunctional or higher radical-polymerizable compound include trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl)isocyanurate, dipentaerythritol hexaacrylate (DPHA), caprolactone-modified di pentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxy tetraacrylate, EO-modified phosphoric acid triacrylate, and 2,2,5,5-tetrahydroxymethylcyclopentanon tetraacrylate. The above-listed examples may be used alone or in combination.

Note that, in the list of examples above, EO-modified denotes ethyleneoxy-modified, PO-modified denotes propyleneoxy-modified, and ECH-modified denotes epichlorohydrin-modified.

Examples of the functional monomer include: monomers substituted with fluorine atoms, such as octafluoropentyl acrylate, 2-perfluorooctylethyl acrylate, 2-perfluorooctylethylmethacrylate, and 2-perfluoroisonyl ethylacrylate; and vinyl monomers each having a polysiloxane group where the number of repeating unit of siloxane is 20 to 70 disclosed in Japanese Examined Patent Publication Nos. 05-60503 and 06-45770, such as acryloyl polydimethylsiloxane ethyl, methacryloyl polydimethylsiloxane ethyl, acryloyl polydimethylsiloxane propyl, acryloyl polydimethylsiloxane butyl, and diacryloyl polydimethylsiloxane diethyl; acrylates; and methacrylates. The above-listed examples may be used alone or in combination.

Examples of the radical-polymerizable oligomer include epoxy acrylate-based oligomers, urethane acrylate-based oligomers, and poly ester acrylate-based oligomers.

In view of formation of a cross-linked product, at least one of the triaryl amide derivative having a radical-polymerizable functional group and the above-mentioned another radical-polymerizable compound preferably has two or more radical-polymerizable functional groups.

An amount of the triaryl amide derivative having a radical-polymerizable functional group relative to a total amount of the electrochromic composition is preferably 10% by mass or greater but 100% by mass or less. In view of a balance of both coloring sensitivity and durability against repetitive use, the amount is more preferably 30% by mass or greater but 90% by mass or less. When the amount is 10% by mass or greater, an electrochromic function of the electrochromic layer is sufficiently exhibited, durability against repetitive use with excessive voltage is excellent, and coloring sensitivity is excellent. Moreover, an electrochromic function is also exhibited when the amount is 100% by mass and in this case coloring sensitivity relative to the thickness is the highest. However, there is a case where compatibility to an ionic liquid required for exchanges of charge may be low, and electric properties may be deteriorated, such as low durability in repetitive use with excessive voltage.

<Polymerization Initiator>

The electrochromic composition preferably includes a polymerization initiator, if necessary, in order to efficiently proceed a cross-linking reaction between the triaryl amine derivative having a radical-polymerizable functional group and the above-mentioned another radical-polymerizable compound. Examples of the polymerization initiator include thermal polymerization initiators and photopolymerization initiators. Among the above-listed examples, photopolymerization initiators are preferable in view of polymerization efficiency.

The thermal polymerization initiator is not particularly limited and may be appropriately selected depending on the intended purpose. Examples of the thermal polymerization initiator include: peroxide-based initiators, such as 2,5-dimethylhexane-2,5-dihydroperoxide, dicumyl peroxide, benzoyl peroxide, t-butylcumyl peroxide, 2,5-dimethyl-2,5-di(peroxybenzoyl)hexyne-3, di-t-butylperoxide, t-butylhydroperoxide, cumene hydroperoxide, and lauroyl peroxide; and azo-initiators, such as azobisisobutyl nitrile, azobiscyclohexane carbonitrile, methyl azobisisobutyrate, azobisisobutylamidine hydrochloride, and 4,4'-azobis-4-cyanovaleric acid. The above-listed examples may be used alone or in combination.

The photopolymerization initiator is not particularly limited and may be appropriately selected depending on the intended purpose. Examples of the photopolymerization initiator include: acetophenone-based or ketal-based photopolymerization initiators, such as di ethoxyacetophenone, 2,2-dimethoxy-1,2-diphenylethan-1-one, 1-hydroxy-cyclohexyl-phenyl-ketone, 4-(2-hydroxyethoxy)phenyl-(2-hydroxy-2-propyl)ketone, 2-benzyl-2-dimethylamino-1-(4-morpholinophenyl)butanone-1, 2-hydroxy-2-methyl-1-phenylpropan-1-one, 2-methyl-2-morpholino(4-methylthiophenyl)propan-1-one, and 1-phenyl-1,2-propanedione-2-(o-ethoxycarbonyl)oxime; benzoin ether-based photopolymerization initiators, such as benzoin, benzoin methyl ether, benzoin ethyl ether, benzoin isobutyl ether, and benzoin isopropyl ether; benzophenone-based photopolymerization initiators, such as benzophenone, 4-hydroxybenzophenone, methyl o-benzoylbenzoate, 2-benzoylnaphthalene, 4-benzoylbiphenyl, 4-benzoylphenyl ether, acrylated benzophenone, and 1,4-benzoylbenzene; and thioxanthone-based photopolymerization initiators, such as 2-isopropylthioxanthone, 2-chlorothioxanthone, 2,4-dimethylthioxanthone, 2,4-diethylthioxanthone, and 2,4-dichlorothioxanthone. The above-listed examples may be used alone or in combination.

Examples of other photopolymerizaitoin initiators include ethyl anthraquinone, 2,4,6-trimethylbenzoyldiphenylphosphine oxide, 2,4,6-trimethylbenzoylphenylethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxylic ester, 9,10-phenanthrene, acridine-based compounds, triazine-based compounds, and imidazole-based compounds. The above-listed examples may be used alone or in combination.

Note that, a compound having a photopolymerization acceleration effect may be used alone or in combination with the photopolymerization initiator. Examples of such a compound include triethanol amine, methyldiethanol amine, ethyl 4-dimethylaminobenzoate, isoamyl 4-dimethylaminobenzoate, ethyl(2-dimethylamino)benzoate, and 4,4'-dimethylaminobenzophenone.

Each of the electrochromic layers are preferably formed by dissolving the composition in a solvent, applying the solution to form a film, and allowing the film to polymerize by light or heat to form an electrochromic layer. Examples of the method for applying include spin coating, casting, micro gravure coating, gravure coating, bar coating, roll coating, wire bar coating, dip coating, slit coating, capillary coating, spray coating, nozzle coating, and various printing methods, such as gravure printing, screen printing, flexo printing, offset printing, reverse printing, and inkjet printing.

In the electrochromic display device of the present disclosure, each of the electrochromic layers includes an electrochromic material where the electrochromic materials exhibit mutually different coloring colors, each of the electrochromic materials reversibly performs a coloring reaction or decoloring reaction due to an electrochemical redox reaction, and a difference in a redox potential of the coloring reaction or decoloring reaction between the electrochromic materials included in the electrochromic layers is preferably 0.1 V or less, more preferably 0.05 V or less.

A redox potential of the electrochromic material indicates an energy level determined by an equilibrium state between an oxidant and a reductant of the electrochromic material dissolved in a solution. Typically, the electrochromic material is in an equilibrium state as represented by Formula (1) below.

$$M^{z+} + ne^- \Leftrightarrow M^{(z-n)+}$$ Formula (1)

The difference in the redox potential is measured as a potential difference with an electrode (working electrode) causing an electrode reaction using a standard electrode (e.g., a standard hydrogen electrode) as a reference electrode in the solution. When an electrochromic material for use is an oxidization-coloring electrochromic material and a monovalent oxidant (the colored electrochromic material, the colored body) and a zero-valent decolored body coexist, for example, Formula (2) below is satisfied.

$$E = EO - (RT/F)\ln(a_M/a_M^+)$$ Formula (2)

In Formula (2), EO is a potential of the standard electrode, R is a gas constant, T is a temperature (K), F is the Faraday constant, and a is the activity at the reduction side or the oxidation side.

Moreover, known is a method where a potential between a working electrode and a reference electrode is measured when a peak current observed between the working electrode and a counter electrode is observed by a cyclic voltammetry (CV) measurement measured with three electrodes of the working electrode, the counter electrode, and the reference electrode. According to the above-mentioned measuring method, moreover, a redox potential of an electrochromic material included in a film fixed on an electrode can be also estimated.

In the electrochromic display device of the present disclosure, a difference in a redox potential of a coloring or decoloring reaction between the electrochromic materials included is preferably 0.1 V or less. The above-mentioned value of the difference is important to induce a coloring or decoloring reaction simultaneously by a redox reaction. When a difference in the redox potential is large, therefore, a redox-potentially predominant reaction is generally predominantly performed, although it may depend on voltage applied between the electrodes. The above-mentioned predominance of the reaction becomes a cause of a problem that unevenness of coloring or decoloring reactions becomes significant depending on tints of colors.

Moreover, the difference in the redox potential significantly affects memory of an image when application of voltage is terminated and voltage between the electrodes is discharged. The electrochromic display layer is formed on one electrode, and an electrochromic material for forming each electrochromic layer is in one potential state. When there is a significant difference in a redox potential between the electrochromic layers, coloring of the redox-potentially more predominant material becomes stronger, and on the other hand, coloring of the redox-potentially less predominant material is lost. The above-mentioned problem is observed as color fading of an image. Although it depends on ionic conductivity of the electrolyte layer, a color change is not observed even in the laminated electrochromic layers and an image can be stably displayed, when the difference in the redox potential is 0.1 V or less.

A redox potential of each electrochromic material can be determined by dissolving the electrochromic material in a solvent and performing a cyclic voltammetry measurement with three electrodes.

An example of the above-described measuring method is as follows. In a case where a measurement is performed in a non-aqueous solvent system, for example, as a supporting electrolyte, tetrabutylammonium perchlorate (TBAP) is dissolved at a concentration of 0.1 M and an electrochromic material is further dissolved in the resultant solution. Into the solution, a metal mesh electrode of gold or platinum serving as a working electrode, an Ag/AgCl electrode serving as a reference electrode, and a platinum wire serving as a counter electrode are inserted. By performing a CV measurement, a coloring or decoloring reaction of the electrochromic material due to a redox reaction can be confirmed adjacent to the working electrode. In such a diffusion system where a redox reaction is reversibly performed, typically, a diffusion coefficient of the oxidant and a diffusion coefficient of the reductant are assumed the same. Therefore, an average value of a peak potential of the oxidation reaction and a peak potential of the reduction reaction, specifically, a half-wave potential, is determined as a redox potential.

In the electrochromic display device of the present disclosure, the electrochromic layers are preferably disposed from a side closest to the electrode in the order of the lowest absolute value of a redox potential of the electrochromic material included in the electrochromic layer relative to a reaction of the electrode to face.

In the electrochromic display device of the present disclosure, the electrochromic layers are preferably disposed from a side closest to the electrode in the order of the fastest reaction speed of the coloring reaction or the decoloring reaction at voltage applied between the electrodes.

The above-described configurations are elements important for performing coloring or decoloring reactions of the electrochromic layers in the electrochromic display device as simultaneously as possible. Specifically, in the electrochromic display layer, an electrochromic layer favorable for a coloring or decoloring reaction is preferably formed at the side close to the electrode. In other words, an electrochromic layer including an electrochromic material having the smaller absolute value of a redox potential against a counter electrode reaction is disposed to the side closer to the electrode. Moreover, an electrochromic layer having a faster reaction speed of a coloring or decoloring reaction with voltage applied between the electrodes is disposed to the side closer to the electrode.

The above-described configurations are important elements for performing especially a decoloring reaction smoothly. In a case where an electrochromic layer at a side close to the electrode is redox-potentially disadvantageous or has slow reaction speed, a phenomenon that it is difficult to decolor the electrochromic layer remote from the electrode occurs.

In case of an electrochromic display device in which two electrochromic materials coexist as an electrochromic display layer on one electrode, the electrochromic material that is redox-potentially advantageous tends to color more quickly and decolor more slowly when certain voltage is applied, compared to the electrochromic material that is redox-potentially disadvantageous. More redox-potentially advantageous the electrochromic material is, more stable the coloring state is.

The redox-potentially advantageous electrochromic material means that an absolute value of the redox potential for coloring or decoloring is small and stable. Specifically, the redox-potentially advantageous electrochromic material means a material that can color at a low potential compared to the coexisting electrochromic material.

The above-described configuration can be easily confirmed by performing the CV measurement and a transmittance light (or reflected light) measurement simultaneously. Specifically, it is preferable that a coloring reaction is preferably performed from the electrochromic layer disposed closer to the electrode, on the other hand, a decoloring reaction is preferably performed from the side more remote from the electrode. When the electrochromic layer closer to the electrode is decolored first, particularly, the conduction of the electrochromic layer closer to the electrode becomes poor, and it is difficult to decolor the electrochromic layer laminated on the electrochromic layer closer to the electrode.

In case of oxidization-coloring electrochromic materials, a difference in the redox potential between the electrochromic materials can be determined by subtracting the redox potential of the second electrochromic material included in the second electrochromic layer from the redox potential of the first electrochromic material included in the first electrochromic layer. Specifically, the calculation can be expressed as follows.

$$\Delta Eox = |Eox(\text{first electrochromic material}) - Eox(\text{second electrochromic material})|$$

—Pseudo Gradation Expression According to Error Diffusion Method—

In the electrochromic display device of the present disclosure, each of the electrochromic layers preferably displays pseudo gradation formed with shades according to an error diffusion processing method.

The electrochromic layers are formed with patterns in a certain region above the display electrode. As a method for forming the patterns, various printing methods capable for forming patterns can be used. Examples of the printing methods include gravure printing, screen printing, flexo printing, offset printing, reverse printing, and inkjet printing.

Moreover, patterns can be also formed by forming a uniform film through any of various printing methods (e.g., spin coating, casting, micro gravure coating, gravure coating, bar coating, roll coating, wire bar coating, dip coating, slit coating, capillary coating, spray coating, and nozzle coating) or any of various vacuum film-forming methods (e.g., vacuum vapor deposition, sputtering, and ion plating) via a shadow mask or a resist, followed by removing the shadow mask or the resist.

In a case where an electrochromic material having a radical-polymerizable functional group as in the present disclosure, patterns can be also formed by locally applying various types of radiation. In a case where an electrochromic material is heat polymerizable, for example, a method where heat is locally applied by a thermal head is also considered. In a case where a photopolymerizable electrochromic material is included, moreover, a method where light is applied through a photomask, or a method where laser light is locally applied without a mask and scanned to cause a polymerization reaction locally can be considered. Thereafter, regions that are not polymerized are removed by washing with any of various solvents and as a result patterns can be formed.

In the present disclosure, as a method for gradation expression of each of the electrochromic layers, the electrochromic layer preferably displays with two-tone gradation expression according to an error diffusion method.

In case of an electrochromic display device, a coloring density is typically controlled with a thickness of an electrochromic layer or a concentration of an electrochromic material added. Specifically, various densities can be expressed with amounts of the electrochromic material in a certain area. As a method for spatially randomly disposing two tones microscopically to express tones macroscopically unlimitedly, an error diffusing method (dithering method) has been known. The error diffusing method is a gradation expression method suitable for various printing method, such inkjet printing. Specifically, the error diffusion method is a method where it is not necessary to prepare various concentrations of inks and shades can be expressed macroscopically whether an ink is placed or not in certain fine regions.

The above-mentioned method can be controlled by whether each of the electrochromic layers is disposed or not in fine regions. The region where the electrochromic layer is not disposed cannot obtain coloring color exhibited by the electrochromic layer, and the region where the electrochromic layer is disposed can obtain coloring color. Since a shade is expressed in each electrochromic layer within the electrochromic layers according to the error diffusion method, multi-color expression is macroscopically obtained as a result, owing to color mixing.

(Method for Producing Electrochromic Display Device)

A method for producing an electrochromic display device according to the present disclosure is a method including forming a first electrochromic layer, making the first electrochromic layer fixed or insoluble, forming a second electrochromic layer on the first electrochromic layer in a manner that at least part of the second electrochromic layer overlaps with the first electrochromic layer, and making the second electrochromic layer fixed or insoluble. The electrochromic display device includes a pair of supporting substrates facing each other, a pair of electrodes each disposed on the supporting substrate and facing each other; and an electrochromic display layer disposed in contact with at least one of the pair of the electrodes, wherein the electrochromic display layer includes the first electrochromic layer and the second electrochromic layer which exhibit mutually different coloring colors, the second electrochromic layer is laminated on the first electrochromic layer at least in a partial area of the electrode, and the first electrochromic layer and the second electrochromic layer are polymerizable or curable. The method of the present disclosure may further include other steps if necessary.

The electrochromic layers preferably have polymerizability or curability induced by heat or light. The polymerizability or curability of the electrochromic layers can be realized by using an electrochromic material having a radical-polymerizable functional group. Moreover, each of the first electrochromic layer and the second electrochromic layer is formed with a pattern. For example, the patterning of the electrochromic layer can be easily realized by various printing methods, such as inkjet printing.

In a case where a plurality of electrochromic layers are formed any of various inkjet methods, a first electrochromic layer is formed with a pattern, followed by forming a second electrochromic layer. At the time of formation of the second electrochromic layer, the first electrochromic layer may be dissolved again by the solvent included in the ink of the second electrochromic layer and the pattern of the first electrochromic layer may be destroyed. As a result, a problem that a resultant image of the electrochromic display layer may be blurred may occur. Therefore, it is preferable that the first electrochromic layer be made insoluble after forming the first electrochromic layer, to thereby prevent the first electrochromic layer from being dissolved again by the ink of the second electrochromic layer.

<Electrolyte Layer>

As an electrolyte component included in the electrolyte layer, a solution in which a solid electrolyte is dissolved in a solvent or a liquid electrolyte such as ionic liquid is used.

As a material of the electrolyte, for example, inorganic ionic salts (e.g., alkali metal salts and alkaline earth metal salts), quaternary ammonium salts, and supporting electrolytes, such as acids and bases can be used. Specific examples include $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$.

Examples of a solvent to which the solid electrolyte is dissolved include propylene carbonate, acetonitrile, γ-butyrolactone, ethylene carbonate, sulfolane, dioxolane, tetrahydrofuran, 2-methyltetrahydrofuran, dimethylsulfoxide, 1,2-dimethoxyethane, 1,2-ethoxymethoxyethane, polyethylene glycol, alcohols, and mixed solvents of the above-listed solvents.

Moreover, various ionic liquids each including a cationic component and an anionic component can be used.

The ionic liquid is not particularly limited and may be appropriately selected depending on the intended purpose.

There are some organic ionic liquids that stay in a liquid state at a wide temperature range including room temperature, and such organic ionic liquids are formed of a cationic component and an anionic component.

Examples of the cationic component include: imidazole derivatives, such as N,N-dimethylimidazole salt, N,N-methylethylimidazole salt, and N,N-methylpropylimidazole salt; aromatic salts (e.g., salts of pyridinium derivatives), such as N,N-dimethylpyridinium salt and N,N-methylpropylpyridinium salt; and aliphatic quaternary ammonium-based compounds (e.g., tetraalkyl ammonium), such as trimethylpropyl ammonium salt, trimethylhexyl ammonium salt, and triethylhexyl ammonium salt.

The anionic component is preferably a compound including fluorine in view of stability in the atmosphere. Examples of the anionic component include $BF_4^-$, $CF_3SO_3^-$, $PF_4^-$, $(CF_3SO_2)_2N^-$, and $B(CN_4)^-$.

The electrolyte layer is preferably a solid electrolyte. In case of a solid electrolyte, the electrolyte layer is formed as a film where an electrolyte is held in a photo- or heat-curable resin. It is preferable that a solution in which the curable resin and the electrolyte are mixed be held between a pair of the supporting substrates, followed by applying light or heat to cure the curable resin.

Examples of the curable resin include typical materials, such as photocurable resins and heat-curable resins (e.g., acrylic resins, urethane resins, epoxy resins, vinyl chloride resins, ethylene resins, melamine resins, and phenol resins). Among the above-listed materials, materials having high compatibility to an electrolyte are preferable. Examples of such materials include derivatives of ethylene glycol, such as polyethylene glycol and polypropylene glycol. Moreover, a resin curable with light is preferably used as the curable resin. Use of the photocurable resin is preferable because an element can be produced at a low temperature and within a short period compared to thermal polymerization.

<Counter Electrode Layer>

In the present disclosure, an electrochemically-active layer that does not cause a significantly large color change is referred to as a counter electrode layer.

Expected effects of the counter electrode layer are to stabilize electrochemical reactions of the first and second electrochromic layers through reverse reactions and to reduce a potential difference required for an electrochromic reaction. In the case where the first and second electrochromic layer color through oxidation, for example, the counter electrode layer preferably includes a material that causes a reduction reaction.

Similarly to the electrochromic layer, as a material used in the counter electrode layer, an inorganic compound or an organic compound may be used.

The counter electrode layer is captured as an electrochromic material whose has a small change in a light-absorption band (hardly any color change) in a visible light region as a result of a redox reaction. Therefore, a material similar to the electrochromic layer can be selected as a material of the counter electrode layer. Examples of the inorganic compound include antimony tin oxide, fluorine-doped tin oxide, nickel oxide, titanium oxide, zinc oxide, and tin oxide. The above-listed examples may be used alone or in combination. The above-listed materials have a small absorption change or hardly any change in a visible light region caused by an electrochemical redox reaction and therefore can be used as a material of the counter electrode layer.

Examples of the organic compound include bipyridine derivatives represented by General Formula (4) below.

A molecule of the bipyridine derivative can be designed no to express an absorption band in a visible light region by adjusting the conjugation length of A in General Formula (4) above.

[Chem. 53]

(General Formula (4))

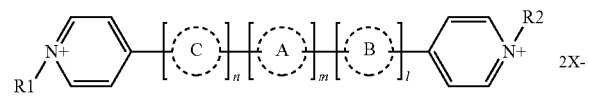

In General Formula (4), R1 and R2 are each independently an alkyl group having 1 through 8 carbon atoms that may have a substituent or an aryl group that may have a substituent, and at least one of R1 and R2 has a substituent selected from COOH, $PO(OH)_2$, and $Si(OC_kH_{2k+1})_3$; X is a monovalent anion; n, m, and l are each 0, 1, or 2; and A, B, and C are each independently an alkyl group having 1 through 20 carbon atoms that may have a substituent, an aryl group that may have a substituent, or a heterocyclic group that may have a substituent.

The bipyridine derivative may be formed as an organic film onto a counter electrode on the counter substrate. A structure where the bipyridine derivative is born on conductive particles, or semiconductor particles, or both may be also used.

The conductive particles and the semiconductor particles are not particularly limited and may be appropriately selected depending on the intended purpose, but metal oxide is preferable.

Examples of the metal oxide include metal oxide including as a main component titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicic acid, calcium phosphate, and aluminosilicate. The above-listed examples may be used alone or in combination. Among the above-listed examples, at least one or a mixture selected from the group consisting of titanium oxide, zinc oxide, tin oxide, zirconium oxide, magnesium oxide, indium oxide, tungsten oxide, and iron oxide is preferable because a color display having excellent a response speed of coloring and decoloring can be realized. Titanium oxide is particularly preferable because a color display having an excellent response speed of coloring and decoloring can be secured.

Shapes of the conductive particles or the semiconductor particles are not particularly limited and may be appropriately selected depending on the intended purpose. In order to efficiently bear the bipyridine derivative, the conductive particles or the semiconductor particles preferably have shapes having a large surface area per unit volume (may be referred to as a "specific surface area"). When the conductive particles or the semiconductor particles are aggregates of nanoparticles, for example, the conductive particles of the semiconductor particles have a large specific surface area and therefore the bipyridine derivative is more efficiently born on the conductive particles or the semiconductor particles.

Examples of a formation method of the counter electrode layer include vacuum vapor deposition, sputtering, and ion plating. When a material of the counter electrode layer is suitable for coating, moreover, spin coating, casting, micro gravure coating, gravure coating, bar coating, roll coating, wire bar coating, dip coating, slit coating, capillary coating, spray coating, or nozzle coating, or various printing methods, such as gravure printing, screen printing, flexo printing, offset printing, reverse printing, or inkjet printing can be also used.

A structure where the bipyridine derivative is born on the particles as a material of the counter electrode layer can be easily obtained by a method where the conductive particles or the semiconductor particles are applied to form a layer, followed by allowing the layer to be in contact with a solution in which the bipyridine derivative is dissolved through coating or dipping to make the bipyridine derivative adsorbed on the particles.

During the above-described formation of the structure, COOH, $PO(OH)_2$, or $Si(OC_kH_{2k+1})_3$ provided at least one of R1 and R2 in General Formula (4) can contribute to the adsorption reaction.

An average thickness of the counter electrode layer is not particularly limited and may be appropriately selected depending on the intended purpose. The average thickness is preferably 0.2 micrometers or greater but 5.0 micrometers or less. When the average thickness of the counter electrode layer is within the preferable range, a production cost can be suppressed as well as attaining a desirable coloring density of the first and second electrochromic layers that cause a reverse reaction, and therefore it is preferable.

The electrochromic display device of the present disclosure will be specifically described with reference to schematic views of FIGS. 1 to 3.

An electrochromic display device 100 of FIG. 1 includes a display substrate 1 onto which a display electrode 2 has been formed, and a counter substrate 8 onto which a counter electrode 7 has been formed, where the counter substrate 8 faces the display substrate 1. An electrochromic display layer 5 including a first electrochromic layer 3 and a second electrochromic layer 4 which exhibit mutually different coloring colors is disposed to be in contact with the display electrode 2. An electrolyte layer 6 is disposed between the display electrode 2 and the counter electrode 7.

As illustrated in FIG. 1, the second electrochromic layer 4 is in contact with the display electrode 2 in the region where the first electrochromic layer 3 is not disposed. Moreover, at least in a partial area of the display electrode 2, the first electrochromic layer 3 and the second electrochromic layer 4 are laminated on the display electrode 2.

Moreover, an electrochromic display device 101 of FIG. 2 has the same structure to the electrochromic display device 100 of FIG. 1, except that a counter electrode layer 9 is disposed on the counter electrode 7. Therefore, the identical structure to the already-described embodiment is given the identical reference numerals and the descriptions of the identical structure are omitted.

It is preferable that the counter electrode layer 9 does not change a color in a visible light region with applied voltage which causes a coloring reaction or a decoloring reaction of the electrochromic display layer 5 that faces the counter electrode layer 9, and an area of the counter electrode layer 9 be larger than an area of the electrochromic display layer 5.

Moreover, an electrochromic display device 102 of FIG. 3 has the same structure to the electrochromic display device 100 of FIG. 1, except that the electrochromic display layer 5 disposed on the display electrode 2 includes 3 electrochromic layers exhibiting mutually different coloring colors, i.e., a first electrochromic layer 3, a second electrochromic layer 4 disposed on the first electrochromic layer 3, and a third electrochromic layer 10 disposed on the second electrochromic layer 4. Therefore, the identical structure to the already-described embodiment is given the identical reference numerals and the descriptions of the identical structure are omitted.

As illustrated in FIG. 3, the third electrochromic layer 10 is in contact with the display electrode 2 in the region where the second electrochromic layer 4 and the first electrochromic layer 3 are not disposed. The second electrochromic layer 4 is in contact with the display electrode 2 in the region where the first electrochromic layer 3 is not disposed.

Among the three or more electrochromic layers, at least two or more electrochromic layers are laminated on the display electrode 2 at least in a partial area of the display electrode 2.

EXAMPLES

The present disclosure will be described in more detail by way of the following Examples and Comparative Examples. However, the present disclosure should not be construed as being limited to these Examples.

Example 1

An electrochromic display device 101 illustrated in FIG. 2 was produced in the following manner.

—Production of Display Electrode and Display Substrate, or Counter Electrode and Counter Substrate—

An indium tin oxide (ITO) film in the thickness of 220 nm was formed on a surface of a glass substrate (40 mm×40 mm×0.7 mm) serving as a supporting substrate by sputtering and annealing was performed on the ITO film to thereby obtain a transparent electrode having about 10 ohms per square. The resultant transparent electrode and supporting substrate were used as a display electrode 2 and a display substrate 1, or a counter electrode 7 and a counter substrate 8.

—Formation of Electrochromic Display Layer—

(a) An electrochromic material exhibiting cyan (Cyan Dye 1, Exemplary Compound 40), (b) polyethylene glycol diacrylate (KAYARAD PEG400DA, available from Nippon Kayaku Co., Ltd.), (c) a photopolymerization initiator (IRGACURE 184, available from BASF SE), and (d) cyclohexanone were mixed to achieve a mass ratio a:b:c:d of 2:0.95:0.05:18 to thereby prepare a first electrochromic ink.

[Chem. 54]

(Exemplary Compound 40)

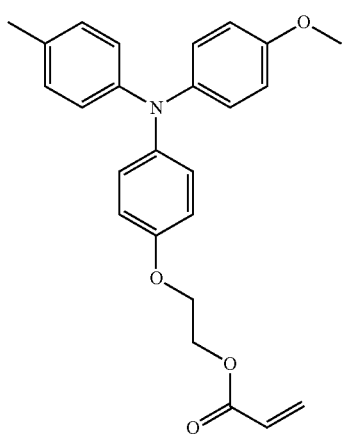

Moreover, a second electrochromic ink was prepared in the same manner as above, except that the electrochromic material exhibiting cyan (Cyan Dye 1) was replaced with an electrochromic material exhibiting yellow (Yellow Dye 1, Exemplary Compound 39).

[Chem. 55]

(Exemplary Compound 39)

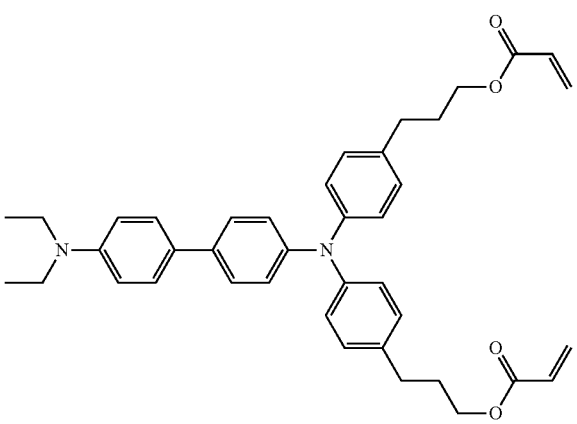

Each of the first and second electrochromic inks was loaded in an ink tank of an inkjet printer equipped with Gen4 head (available from Ricoh Industry Company, Ltd.).

As illustrated in FIG. 2, a first electrochromic layer 3 was formed on the display electrode 2 and a second electrochromic layer 4 was formed thereon to overlap with the first electrochromic layer 3.

A difference in a redox potential between Cyan Dye 1 that was the first electrochromic material and Yellow Dye 1 that was the second electrochromic material was measured by dissolving each of the electrochromic materials in an acetonitrile solution using tetrabutylammonium perchlorate as a supporting electrolyte and performing cyclic voltammetry (CV) using a Ag/Ag$^+$ electrode as a reference electrode. As a result, the difference in the redox potential (ΔEox) was +0.038 V.

—Formation of Counter Electrode Layer—

A titanium oxide dispersion liquid (SP-210, available from Showa Denko Ceramics Co., Ltd.) was applied by spin coating onto the counter substrate 8 on which the counter electrode 7 had been formed, followed by performing a heat treatment at 120 degrees Celsius for 10 minutes to thereby obtain a titanium oxide porous layer having a thickness of about 1 micrometer. The titanium oxide porous layer was used as a counter electrode layer 9.

—Formation and Bonding of Electrolyte Layer—

(a) 1-Ethyl-3-methylimidazolium bis(fluorosulfonyl)imide, (b) polyethylene glycol diacrylate (KAYARAD PEG400DA, available from Nippon Kayaku Co., Ltd.), and (c) a photopolymerization initiator (IRGACURE184, available from BASF SE) were mixed to achieve a mass ratio a:b:c of 4:0.95:0.05, to thereby obtain an electrolyte solution.

Next, an appropriate amount of the electrolyte solution was dripped onto the display substrate 1 to which the electrochromic display layer 5 had been formed, and moreover the electrolyte solution was nipped with the counter substrate 8 to which the counter electrode layer 9 had been formed to fill the entire gap with the electrolyte solution. During the above-described process, the display substrate and the counter substrate were bonded with shifting by 4 mm in order to expose part of each of the electrodes.

Next, ultraviolet light was applied to the resultant in the air atmosphere and annealing was further performed in an oven of 60 degrees Celsius for 10 minutes to thereby produce an electrochromic display device 101.

<Driving Test>

Voltage of +1.5 V was applied between the display substrate 1 and the counter substrate 8 of the electrochromic display device 101 using a DC power supply in a manner that the side of the display substrate 1 was to be a positive electrode and the side of the counter substrate 8 was to be a negative electrode, to thereby inject electric charge of 14 mC. The region where the first electrochromic layer 3 was formed colored in cyan, the region where the second electrochromic layer 4 was formed colored in yellow, and the region where the first electrochromic layer 3 and the second electrochromic layer 4 were laminated colored in green.

Next, the electrochromic display device 101 was released from the DC power supply and was left in the open state to perform a retention test of each electrochromic layer.

Transmission spectroscopy was performed on the region where the first electrochromic layer 3 and the second electrochromic layer 4 were laminated by means of an LCD evaluation device (LCD-5200, available from Otsuka Electronics Co., Ltd.) and a change in transmittance with a wavelength component of 450 nm and a wavelength component of 650 nm was measured for 10 minutes. The result is presented n FIG. 4A. It was found from the result of FIG. 4A that the color of green was retained after about 10 minutes.

Examples 2 to 3 and Reference Examples 1 to 3

Electrochromic display devices of Examples 2 to 3 and Reference Examples 1 to 3 were each produced in the same manner as in Example 1, except that the first electrochromic material or the second electrochromic material was changed as presented in Table 1. Note that, a difference in redox potentials (ΔEox) determined from the first and second electrochromic materials and CV measurement is presented in Table 1. The sign "−" (minus) denotes that the redox potential of the first electrochromic material is smaller than the redox potential of the second electrochromic material.

TABLE 1

|  | First electrochromic material | Second electrochromic material | ΔEox [V] | Driving test result |
|---|---|---|---|---|
| Ex. 1 | Cyan Dye 1 | Yellow Dye 1 | 0.038 | FIG. 4A |
| Ex. 2 | Cyan Dye 1 | Yellow Dye 2 | −0.035 | FIG. 4B |
| Ex. 3 | Cyan Dye 1 | Yellow Dye 3 | −0.038 | FIG. 4C |
| Ref. Ex. 1 | Cyan Dye 2 | Yellow Dye 1 | 0.263 | FIG. 4D |
| Ref. Ex. 2 | Cyan Dye 2 | Yellow Dye 2 | 0.190 | FIG. 4E |
| Ref. Ex. 3 | Cyan Dye 2 | Yellow Dye 3 | 0.188 | FIG. 4F |

*Cyan Dye 1 is Exemplary Compound 40 represented by the structural formula above.
*Yellow Dye 1 is Exemplary Compound 39 represented by the structural formula above.
*Cyan Dye 2: Exemplary Compound 2
(Exemplary Compound 2)
[Chem. 56]

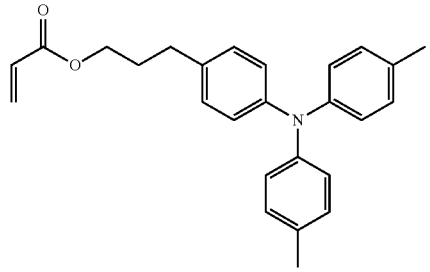

*Yellow Dye 2: Exemplary Compound 32
(Exemplary Compound 32)
[Chem. 57]

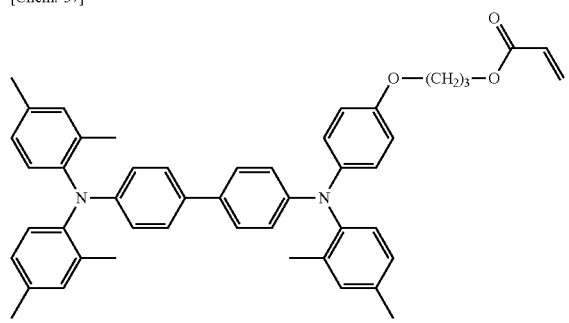

*Yellow Dye 3: Exemplary Compound 45
(Exemplary Compound 45)
[Chem. 58]

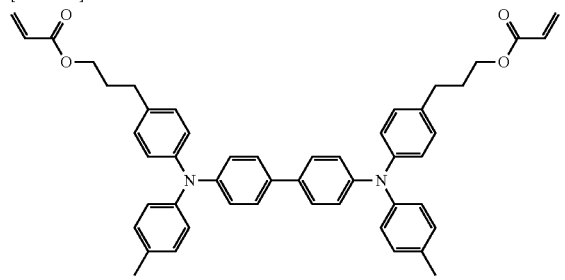

<Driving Test>

In the same manner as in Example 1, voltage of +1.5 V was applied between the electrodes of each of the electrochromic display devices of Examples 2 to 3 and Reference Examples 1 to 3 to inject electric charge of 14 mC, followed by discharging to thereby perform a retention test of a color tone. The results are presented in FIGS. 4B to 4F.

In Example 2 and Example 3, the intensity of the transmitted light of 450 nm and 650 nm was hardly changed and the tint of the color was not largely changed.

In Reference Examples 1 to 3, on the other hand, a phenomenon that cyan was decolored and yellow was strongly colored was confirmed. It was assumed that this is because the redox potential of the electrochromic material exhibiting cyan (Cyan Dye 2) was high and decolored (being redox potentially disadvantage), and the charge was transferred to the electrochromic material exhibiting yellow to thereby enhance coloring of yellow. In the case where a plurality of electrochromic layers are laminated and formed, therefore, a color-tone change can be suppressed as long as a difference in redox potentials between electrochromic materials contained in the electrochromic layers is about 0.04 V. When the difference is 0.19 V or greater, on the other hand, coloring of the electrochromic material having a low redox potential is intensified to change a tint of the color. Accordingly, a difference in redox potential between the electrochromic materials for use are preferably smaller.

Examples 4 to 6 and Reference Examples 4 to 6

Electrochromic display devices were each produced in the same manner as in Example 1, except that the first electrochromic material or the second electrochromic material was changed the first electrochromic material or the second electrochromic material exhibiting cyan, magenta, or yellow as presented in Table 2.

Note that, a difference in redox potentials (ΔEox) determined from the first and second electrochromic materials and CV measurement is presented in Table 2. The sign "−" (minus) denotes that the redox potential of the first electrochromic material is smaller than the redox potential of the second electrochromic material.

TABLE 2

|  | First electrochromic material | Second electrochromic material | ΔEox [V] | Driving test result |
|---|---|---|---|---|
| Ex. 4 | Yellow Dye 1 | Cyan Dye 1 | −0.038 | FIG. 5A |
| Ex. 5 | Cyan Dye 1 | Magenta Dye 1 | −0.057 | FIG. 5B |
| Ex. 6 | Yellow Dye 1 | Magenta Dye 1 | −0.095 | FIG. 5C |
| Ref. Ex. 4 | Cyan Dye 1 | Yellow Dye 1 | 0.038 | — |
| Ref. Ex. 5 | Magenta Dye 1 | Cyan Dye 1 | 0.057 | — |
| Ref. Ex. 6 | Magenta Dye 1 | Yellow Dye 1 | 0.095 | — |

*Cyan Dye 1 is Exemplary Compound 40 represented by the structural formula above.
*Yellow Dye 1 is Exemplary Compound 39 represented by the structural formula above.
*Magenta Dye 1: Exemplary Compound 43
(Exemplary Compound 43)
[Chem. 59]

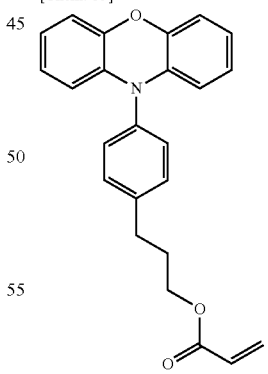

<Driving Test>

In the same manner as in Example 1, voltage of +1.5 V was applied between the electrodes of each of the electrochromic display devices of Examples 4 to 6, followed by discharging to thereby perform a retention test of a color tone. The results are presented in FIGS. 5A to 5C.

The coloring of Cyan Dye 1 was observed at the wavelength of 650 nm, the coloring of Magenta Dye 1 was observed at the wavelength of 550 nm, and the coloring of Yellow Dye 1 was observed at the wavelength of 450 nm.

As presented in Table 2, the difference in the redox potential between the electrochromic materials contained in the electrochromic layers was within 0.095 V. It was also found from the results presented in Table 2 that a color-tone change could be suppressed when the difference in the redox potential between the electrochromic materials contained in the electrochromic layers was within 0.1 V.

<Repetitive Driving Test>

A repetitive driving test was performed on each of the electrochromic display devices of Examples 4 to 6 and Reference Examples 4 to 6 by coupling a positive electrode to the side of the display substrate, coupling a negative electrode to the side of the counter substrate, applying voltage of +1.5 V for coloring, and applying a rectangular wave of −1.0 V for decoloring. The duration for applying the voltage was precisely adjusted depending on a combination of electrochromic materials for use.

As the coloring or decoloring behavior of each electrochromic layer upon drying, coloring of Cyan Dye 1 was observed at a wavelength of 650 nm, coloring of Magenta Dye 1 was observed at a wavelength of 550 nm, and coloring of Yellow Dye 1 was observed at a wavelength of 450 nm. The results are presented in FIGS. 6A to 6F.

It was found that both the first electrochromic layer and the second electrochromic layer colored or decolored smoothly in the electrochromic display devices of Examples 4 to 6, whereas the operation of the second electrochromic layer was poor in the electrochromic display devices of Reference Examples 4 to 6, particularly decoloring of the second electrochromic layer was extremely slow.

In Reference Example 4, moreover, it was confirmed that Yellow Dye 1 for forming the second electrochromic layer turned slightly colored just after being decolored once. The above-mentioned coloring after decoloring indicated that the charge transfer from Cyan Dye 1 for forming the first electrochromic layer to Yellow Dye 1 for forming the second electrochromic layer occurred and therefore it became difficult to decolor Yellow Dye 1.

In Reference Example 5 and Reference Example 6, Cyan Dye 1 or Yellow Dye 1 for forming the second electrochromic layer could not be decolored and the density of the coloring of the second electrochromic layer tended to increase as the repetitive driving test progressed.

The above-described tendency indicated that as presented in Table 2, decoloring of the second electrochromic layer was performed smoothly when the redox potential of the first electrochromic material for forming the first electrochromic layer was lower than the redox potential of the second electrochromic material for forming the second electrochromic layer. Specifically, it indicated that the electrochromic layers laminated could be driven more repetitively when the redox-potentially advantageous electrochromic material (easily colored at low potential) was disposed adjacent to the electrode.

Examples 7 to 9

An electrochromic display device 103 illustrated in FIG. 7 was produced for measuring response speed of each of Cyan Dye 1, Magenta Dye 1, and Yellow Dye 1. Specifically, with the electrochromic display device 101 of Example 1 illustrated in FIG. 2, the second electrochromic layer 4 was not formed, and an electrochromic display layer 11 was formed in the following manner.

—Formation of Electrochromic Display Layer—

In Example 7, as an electrochromic material for forming the electrochromic display layer 11, (a) an electrochromic material exhibiting yellow (Yellow Dye 1, Exemplary Compound 39), (b) polyethylene glycol diacrylate (KAYARAD PEG400DA, available from Nippon Kayaku Co., Ltd.), (c) a photopolymerization initiator (IRGACURE 184, available from BASF SE), and (d) cyclohexanone were mixed to achieve a mass ratio a:b:c:d of 2:0.95:0.05:18, to thereby prepare a yellow electrochromic ink.

In Example 8, a cyan electrochromic ink was prepared in the same manner as in Example 7, except that Yellow Dye 1 was replaced with an electrochromic material exhibiting cyan (Cyan Dye 1, Exemplary Compound 40).

In Example 9, a magenta electrochromic ink was prepared in the same manner as in Example 7, except that Yellow Dye 1 was replaced with an electrochromic material exhibiting magenta (Magenta Dye 1, Exemplary Compound 43).

Each of the inks was loaded in an ink tank of an inkjet printer equipped with Gen4 head (available from Ricoh Industry Company, Ltd.).

As presented in Table 3, the redox potential of Yellow Dye 1 was 0.225 V, the redox potential of Cyan Dye 1 was 0.293 V, and the redox potential of Magenta Dye 1 was 0.350 V with a reference electrode of $Ag/Ag^+$.

In Table 3, the redox potential of each of the electrochromic materials was measured using an $Ag/Ag^+$ electrode as a reference electrode in a 0.1 M acetonitrile solution of TBAP salt.

The electrochromic ink was applied by inkjet printing onto the display substrate to which the display electrode had been formed, to obtain electrochromic layer having a dry-film thickness of about 1 micrometer in the region of 2 $cm^2$. Thereafter, ultraviolet light was applied from a surface to which the electrochromic layer was formed in the atmosphere purged with nitrogen to completely cure the electrochromic layer. Moreover, the resultant was heated in an oven of 80 degrees Celsius for 5 minutes to remove the solvent included in the inkjet ink.

TABLE 3

| | Electrochromic material | Eox [V] |
| --- | --- | --- |
| Ex. 7 | Yellow Dye 1 | 0.255 |
| Ex. 8 | Cyan Dye 1 | 0.293 |
| Ex. 9 | Magenta Dye 1 | 0.35 |

*Cyan Dye 1 is Exemplary Compound 40 represented by the structural formula above.
*Yellow Dye 1 is Exemplary Compound 39 represented by the structural formula above.
*Magenta Dye 1 is Exemplary Compound 43 represented by the structural formula above.

<Response Speed Test>

A response speed test was performed on each of the electrochromic display devices of Examples 7 to 9 by coupling a positive electrode to the side of the display substrate, coupling a negative electrode to the side of the counter substrate, applying voltage of +1.5 V for coloring, and applying a rectangular wave of −1.0 V for decoloring. The response speed of coloring of Cyan Dye 1 was measured at a wavelength of 650 nm, the response speed of coloring of Magenta Dye 1 was measured at a wavelength of 550 nm, and the response speed of coloring of Yellow Dye 1 was measured at 450 nm. The target coloring density was set that the transmittance was to be 20% at each of the wavelengths.

The changes in transmittance of the electrochromic display devices of Examples 7 to 9 are presented in FIG. 8. Moreover, the coloring response time that was the time required for the transmittance to change from 60% to 30% and the decoloring response time that was the time required for the transmittance to change from 30% to 60% in contrast are summarized in Table 4.

Note that, light transmittance was measured by an LCD evaluating device available from Otsuka Electronics Co., Ltd.

TABLE 4

|  | Response time (sec) | |
|---|---|---|
|  | Coloring | Decoloring |
| Ex. 7 | 0.4 | 0.4 |
| Ex. 8 | 0.8 | 0.9 |
| Ex. 9 | 1.0 | 1.0 |

It was found from the results of Table 4 that, in case of the oxidization-coloring electrochromic display device, the lower redox-potential gave the faster response speed as long as the amount of the polyethylene glycol diacrylate added was identical. Moreover, it was found by comparing with the repetitive drying test results of the electrochromic display devices of Examples 4 to 6 that the electrochromic display devices could be driven excellently when the electrochromic layers were laminated in the order that the electrochromic layer having the faster response speed came the closest to the electrode, as in Examples 7 to 9.

Examples 10-1 to 10-4, 11-1 to 11-4, and 12-1 to 12-4

An electrochromic display device 106 illustrated in FIG. 11 was produced using each of the electrochromic materials of Examples 7 to 9.

Electrochromic display devices of Examples 10-1 to 10-4, 11-1 to 11-4, and 12-1 to 12-4 were produced in the same manner as the electrochromic display devices of Examples 7 to 9, except that the pattern conditions for inkjet printing each of the electrochromic layers were changed as presented in Table 5.

The patterns used for the inkjet printing are presented in FIG. 10. The region of the pattern filled in black is a region where dots are formed by inkjet printing. The resolution of the inkjet printer was 600 dpi (dots per inch, the number of dots per inch). One dot in Pattern 1 corresponds to 1 dot of the inkjet printer, and the pattern is printed by inkjet printing at 600 dpi.

On the other hand, Pattern 4 presents that solid printing is performed. In case of Pattern 4, an electrochromic layer is uniformly printed by inkjet printing similar to the electrochromic display devices of Examples 4 to 6.

TABLE 5

| Pattern | Cyan | Magenta | Yellow | Cyan on Magenta |
|---|---|---|---|---|
| Pattern 1 | Example 10-1 | Example 11-1 | Example 12-1 | Example 13-1 |
| Pattern 2 | Example 10-2 | Example 11-2 | Example 12-2 | Example 13-2 |
| Pattern 3 | Example 10-3 | Example 11-3 | Example 12-3 | Example 13-3 |
| Pattern 4 | Example 10-4 | Example 11-4 | Example 12-4 | Example 13-4 |

—Formation of Electrochromic Display Layer—

In each of Examples 10-1 to 10-4, as an electrochromic material for forming an electrochromic layer, (a) an electrochromic material exhibiting cyan (Cyan Dye, Exemplary Compound 40), (b) polyethylene glycol diacrylate (KAYARAD PEG400DA, available from Nippon Kayaku Co., Ltd.), (c) a photopolymerization initiator (IRGACURE 184, available from BASF SE), and (d) cyclohexanone were mixed to achieve a mass ratio a:b:c:d of 2:0.95:0.05:18 to thereby prepare an electrochromic ink.

In each of Examples 11-1 to 11-4, electrochromic inks were each prepared in the same manner as in Examples 10-1 to 10-4, except that an electrochromic material exhibiting magenta (Magenta Dye 1, Exemplary Compound 43) was used as (a). In each of Examples 12-1 to 12-4, electrochromic inks were each prepared in the same manner as in Examples 10-1 to 10-4, except that an electrochromic material exhibiting yellow (Yellow Dye 1, Exemplary Compound 39) was used as (a).

Each of the inks was loaded in an ink tank of an inkjet printer equipped with Gen4 head (available from Ricoh Industry Company, Ltd.).

The electrochromic ink was applied by inkjet printing onto the display substrate to which the display electrode had been formed. In Examples 10-1, 11-1, and 12-1, the inkjet printing was performed with the conditions of Pattern 1, to thereby obtain an electrochromic layer having a dry-film thickness of about 1 micrometer. A size of one dot was about 50 micrometers through about 60 micrometers.

Electrochromic layers of cyan, magenta, and yellow were each formed in the conditions of Pattern 2 in Examples 10-2, 11-2, and 12-2, in the conditions of Pattern 3 in Examples 10-3, 11-3, and 12-3, and in the conditions of Pattern 4 in Examples 10-4, 11-4, and 12-4.

Thereafter, ultraviolet light was applied from a surface to which the electrochromic layers had been formed in the atmosphere purged with nitrogen to completely cure the electrochromic layers. Moreover, the resultant was heated in an oven of 80 degrees Celsius for 5 minutes to remove the solvent included in the inkjet inks.

<Coloring Test>

Voltage of +1.5 V was applied between the electrodes of each of the electrochromic display devices of Examples 10-1 to 10-4, 11-1 to 11-4, and 12-1 to 12-4 to perform a coloring test in the same manner as in Example 1. The duration for applying voltage was different depending on the electrochromic display device. After driving each of the electrochromic display devices to color, the pattern was observed under metallurgical microscope (magnification: 200 times). The results are summarized in Table 6, as shown in FIG. 13.

A size of each dot in Pattern 1 of Examples 10-1, 11-1, and 12-1 was from 50 micrometers through 60 micrometers. In Pattern 3 of Examples 10-3, 11-3, and 12-3, there were significant variations in the size of blank areas where the dots were not formed.

In the electrochromic display device of Example 10-3 in the color of cyan, a phenomenon that the blank dots were widened, indicating that the ink applied through inkjet printing was subsided.

Moreover, it was found that the number of the blank dots was small in the electrochromic device of Example 11-3 in the color of magenta. The small number of the blank dots indicated that the ink applied by inkjet printing was overlapped to fill the blank dots. However, the density of each color changed according to the patterns and gradation expression was obtained macroscopically.

Examples 13-1 to 13-4

An electrochromic display device 105 illustrated in FIG. 9 was produced in the same manner as in Example 1.

Electrochromic display devices of Examples 13-1 to 13-4 were produced in the same manner as in Example 1, except that a pattern with which the first and second electrochromic layers were printed by inkjet printing was changed. The pattern conditions used in Example 13-1 to 13-4 are presented in Table 5. The patterns used are presented in FIG. 10.

(Formation of Electrochromic Display Layer)

As a first electrochromic layer, (a) an electrochromic material exhibiting magenta (Magenta Dye 1, Exemplary Compound 43), (b) polyethylene glycol diacrylate (KAYARAD PEG400DA, available from Nippon Kayaku Co., Ltd.), (c) a photopolymerization initiator (IRGACURE 184, available from BASF SE), and (d) cyclohexanone were mixed to achieve a mass ratio a:b:c:d of 2:0.95:0.05:18 to thereby prepare a first electrochromic ink.

Moreover, a second electrochromic ink was prepared in the same manner, except that the electrochromic material exhibiting magenta (Magenta Dye 1) was replaced with an electrochromic material exhibiting cyan (Cyan Dye 1, Exemplary Compound 40).

Each of the inks was loaded in an ink tank of an inkjet printer equipped with Gen4 head (available from Ricoh Industry Company, Ltd.).

Next, the first electrochromic ink was applied by inkjet printing onto the display substrate to which the display electrode had been disposed and a solid film of a first electrochromic layer was obtained based on printing data of Pattern 4. Thereafter, ultraviolet light was applied from a surface to which the first electrochromic layer had been formed in the atmosphere purged with nitrogen to completely cure the first electrochromic layer.

Next, the second electrochromic ink was applied by inkjet printing to the region identical to the first electrochromic layer based on the printing data of Pattern 1 in Example 13-1, Pattern 2 in Example 13-2, Pattern 3 in Example 13-3, and Pattern 4 in Example 13-4, to thereby form a second electrochromic layer having a dry-film thickness of about 1 micrometer. Moreover, ultraviolet light was applied from a surface to which the second electrochromic layer had been formed in the atmosphere purged with nitrogen to completely cure the second electrochromic layer. Moreover, the resultant was heated in an oven of 80 degrees Celsius for 5 minutes to remove the solvent included in the inkjet ink.

<Coloring Test>

Voltage of +1.5 V was applied between the electrodes of each of the electrochromic display devices of Examples 13-1 to 13-4 to perform a coloring test in the same manner as in Example 1. The duration for applying voltage was different depending on the electrochromic display device. After driving each of the electrochromic display devices to color, the pattern was observed under metallurgical microscope (magnification: 200 times). The results are summarized in Table 6.

[Table 6] Shown in FIG. 13.

The region where the first electrochromic layer was exposed appeared in magenta, and the region where the second electrochromic layer was formed on the first electrochromic layer appeared in blue that was a mixed color of magenta and cyan. Moreover, a shade of the color changed macroscopically according to the patterns of the second electrochromic layer and gradation expression according to the density of cyan could be obtained in the electrochromic display devices of Examples 13-1 to 13-4.

Example 14

An electrochromic display device 106 illustrated in FIG. 11 was produced in the following manner.

—Production of Display Electrode and Display Substrate, or Counter Electrode and Counter Substrate—

An indium tin oxide (ITO) film in the thickness of 110 nm was formed on a surface of a glass substrate (156 mm×156 mm×0.7 mm) serving as a supporting substrate by sputtering and annealing was performed on the ITO film to thereby obtain a transparent electrode having about 20 ohms per square.

Next, a composite film of molybdenum and aluminium alloy was formed with a width of 4 mm by sputtering at only one edge of the substrate to thereby obtain an auxiliary electrode for contact. The transparent electrode and the auxiliary electrode, and the supporting substrate were used as a display electrode and a display substrate, or a counter electrode and a counter substrate.

—Formation of Electrochromic Display Layer—

As a first electrochromic layer, (a) an electrochromic material exhibiting yellow (Yellow Dye 1, Exemplary Compound 39), (b) polyethylene glycol diacrylate (KAYARAD PEG400DA, available from Nippon Kayaku Co., Ltd.), (c) a photopolymerization initiator (IRGACURE 184, available from BASF SE), and (d) cyclohexanone were mixed to achieve a mass ratio a:b:c:d of 2:0.95:0.05:18 to thereby prepare a first electrochromic ink.

Moreover, a second electrochromic ink was prepared in the same manner as above, except that the electrochromic material exhibiting yellow (Yellow Dye 1) was replaced with an electrochromic material exhibiting cyan (Cyan Dye 1, Exemplary Compound 40).

Furthermore, a third electrochromic ink was prepared in the same manner as above, except that the electrochromic material exhibiting yellow (Yellow Dye 1) was replaced with an electrochromic material exhibiting magenta (Magenta Dye 1, Exemplary Compound 43).

Each of the inks was loaded in an ink tank of an inkjet printer equipped with Gen4 head (available from Ricoh Industry Company, Ltd.).

<Inkjet Print Image>

By means of Photoshop CS2 (available from Adobe) that was software, full-color image information of an image to be displayed was color-divided into three primary colors of cyan, magenta, and yellow to obtain an image of cyan, an image of yellow, and an image of magenta. Thereafter, the three images were each converted into monochromic two tones. When the image was converted into monochromic two tones, a dithering pattern in the size of 600 dpi per dot was selected according to the error diffusion method and the gradation information was converted into a dot pattern. The image data of the yellow image was used for the first electrochromic layer, the image data of the cyan image was used for the second electrochromic layer, and the image data of the magenta image was used for the third electrochromic layer.

—Formation of Electrochromic Display Layer—

Onto the display substrate to which the display electrode had been disposed, the first electrochromic ink was applied through inkjet printing based on the image data of the yellow image. The minimum dot diameter was about 50 micrometers with the film thickness of the first electrochromic layer after drying being about 1 micrometer. Thereafter, ultraviolet light was applied from a surface to which the first electrochromic layer had been formed in the atmosphere purged with nitrogen to completely cure the first electrochromic layer.

Next, the second electrochromic ink was applied through inkjet printing based on the image data of the cyan image. The minimum dot diameter was about 60 micrometers with the film thickness of the second electrochromic layer after drying being about 1 micrometer. Thereafter, ultraviolet light was applied from a surface to which the second electrochromic layer had been formed in the atmosphere purged with nitrogen to completely cure the second electrochromic layer.

Next, the third electrochromic ink was applied through inkjet printing based on the image data of the magenta data. The minimum dot diameter was about 60 micrometers with the film thickness of the third electrochromic layer after drying being about 1 micrometer. Thereafter, ultraviolet light was applied from a surface to which the third electrochromic layer had been formed in the atmosphere purged with nitrogen to completely cure the third electrochromic layer.

Next, the resultant was heated in an oven of 80 degrees Celsius for 5 minutes to remove the solvent included in the inkjet ink.

—Formation of Counter Electrode Layer—

A titanium oxide dispersion liquid (SP-210, available from Showa Denko Ceramics Co., Ltd.) was applied by spin coating onto the counter substrate on which the counter electrode had been formed, followed by performing a heat treatment at 120 degrees Celsius for 10 minutes to thereby obtain a titanium oxide porous layer having a thickness of about 1 micrometer. The titanium oxide porous layer was used as a counter electrode layer.

—Formation and Bonding of Electrolyte Layer—

(a) 1-Ethyl-3-methylimidazolium bis(fluorosulfonyl)imide, (b) polyethylene glycol diacrylate (KAYARAD PEG400DA, available from Nippon Kayaku Co., Ltd.), and (c) a photopolymerization initiator (IRGACURE 184, available from BASF SE) were mixed to achieve a mass ratio a:b:c of 4:0.95:0.05, to thereby obtain an electrolyte solution.

Next, an appropriate amount of the electrolyte solution was dripped onto the substrate to which the electrochromic display layer had been formed, and moreover the electrolyte solution was nipped with the counter substrate to which the counter electrode layer had been formed to fill the entire gap with the electrolyte solution. During the above-described process, in order to extract an electrode, the substrate and the counter substrate were bonded with shifting by 5 mm to expose the region where a metal electrode was formed as an auxiliary electrode.

Next, ultraviolet light was applied to the resultant in the air atmosphere and annealing was further performed in an oven of 60 degrees Celsius for 10 minutes to thereby produce an electrochromic display device.

<Driving Test>

Voltage of +1.5 V was applied between the display substrate and the counter substrate for about 10 seconds using a DC power supply in a manner that the side of the display substrate was to be a positive electrode and the side of the counter substrate was to be a negative electrode. The region where the first electrochromic layer was formed colored in yellow, the region where the second electrochromic layer was formed colored in cyan, the region where the third electrochromic layer was formed in magenta, and the region where the electrochromic layers were overlapped colored in full color owing to subtractive color mixing of the first, second, and third electrochromic layers.

An image of the decolored state of the electrochromic display device is presented in FIG. 12A and an image of the colored state of the electrochromic display device is presented in FIG. 12B. As depicted in FIG. 12A, a pattern of the electrochromic display layer was hardly recognized in the decolored state, and the transmittance of the electrochromic display device in the decolored state was about 75% and the electrochromic display device in the decolored state was transparent. As depicted in FIG. 12B, the electrochromic display device in the colored state could display a full-color image capable of gradation expression.

For example, embodiments of the present disclosures are as follows.

<1> An electrochromic display device including:
a pair of supporting substrates facing each other;
a pair of electrodes each disposed on the supporting substrate and facing each other;
an electrochromic display layer disposed in contact with at least one of the pair of the electrodes; and
an electrolyte layer disposed between the pair of the electrodes,
wherein the electrochromic display layer includes a plurality of electrochromic layers exhibiting mutually different coloring colors, and
the plurality of the electrochromic layers are laminated on the electrode at least in a partial area of the electrode.

<2> An electrochromic display device including:
a pair of supporting substrates facing each other;
a pair of electrodes each disposed on the supporting substrate and facing each other; an electrochromic display layer disposed in contact with at least one of the pair of the electrodes; and
an electrolyte layer disposed between the pair of the electrodes,
wherein the electrochromic display layer includes three or more electrochromic layers exhibiting mutually different coloring colors,
at least one of the three or more electrochromic layers colors in cyan, at least one of the three or more electrochromic layers colors in magenta, and at least one of the three or more electrochromic layers colors in yellow, and
among the three or more electrochromic layers, the two or more electrochromic layers are laminated on the electrode at least in a partial area of the electrode.

<3> The electrochromic display device according to <1> or <2>,
wherein each of the electrochromic layers includes an electrochromic material where the electrochromic materials included in the electrochromic layers exhibit mutually different coloring colors,
each of the electrochromic materials reversibly performs a coloring reaction or decoloring reaction due to an electrochemical redox reaction, and
a difference in a redox potential of the coloring reaction or decoloring reaction between the electrochromic materials is 0.1 V or less.

<4> The electrochromic display device according to <3>,
wherein the electrochromic layers are disposed from a side closest to the electrode in the order of the lowest absolute value of a redox potential of the electrochromic material included in the electrochromic layer relative to a reaction of the electrode to face.

<5> The electrochromic display according to <3>,
wherein the electrochromic layers are disposed from a side closest to the electrode in the order of the fastest reaction speed of the coloring reaction or the decoloring reaction at voltage applied between the electrodes.

<6> The electrochromic display device according to any one of <1> to <5>,
wherein each of the electrochromic layers displays pseudo gradation formed with shades according to an error diffusion processing method.

<7> The electrochromic display device according to any one of <1> to <6>,
wherein a counter electrode layer is formed on the electrode facing the electrode on which the electrochromic display layer is disposed,
the counter electrode layer does not change a color in a visible light region with applied voltage which causes a coloring reaction or a decoloring reaction of the electrochromic display layer facing the counter electrode layer, and
an area of the counter electrode layer is larger than an area of the electrochromic display layer.

<8> The electrochromic display device according to any one of <3> to <7>,
wherein each of the electrochromic materials is a compound having a triaryl amine skeleton represented by General Formula (1) below:

$$A_n\text{-}B_m \quad \text{(General Formula (1))}$$

where m is 0 when n=2 is satisfied, m is 0 or 1 when n=1 is satisfied; at least one of A and B has a radical-polymerizable functional group, where A is a structure represented by General Formula (2) below and is bonded to B at a position that is any of $R_1$ through $R_{15}$, and B is a structure represented by General Formula (3) below and is bonded to A at a position that is any of $R_{16}$ through $R_{21}$,

[Chem. 60]

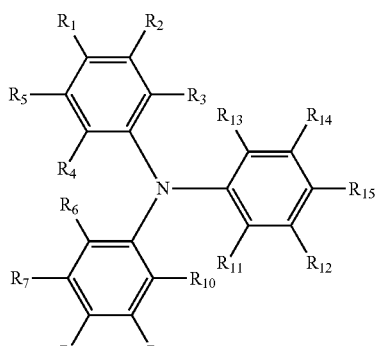

(General Formula (2))

[Chem. 61]

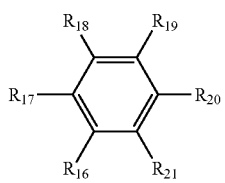

(General Formula (3))

where, in General Formulae (2) and (3), $R_1$ through $R_{21}$ are all monovalent organic groups that may be identical or different, and at least one of the monovalent organic groups is a radical-polymerizable functional group.

<9> The electrochromic display device according to <8>,
wherein the compound having a triaryl amine skeleton represented by General Formula (1) is at least any one of compounds represented by General Formulae (1-1) to (1-3) below:

[Chem. 62]

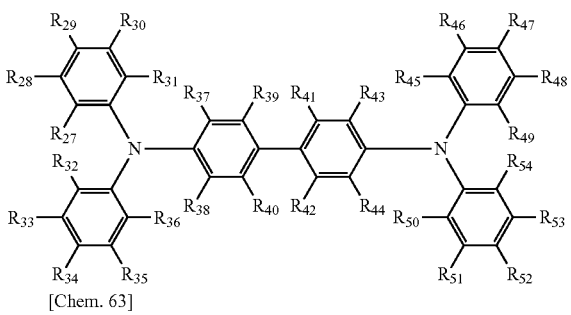

(General Formula 1-1)

[Chem. 63]

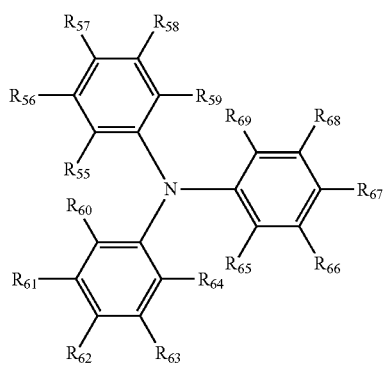

(General Formula 1-2)

[Chem. 64]

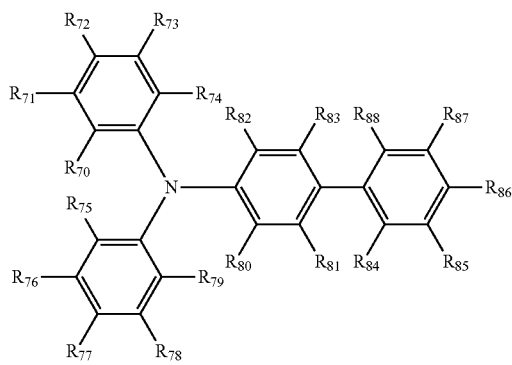

(General Formula 1-3)

<10> The electrochromic display device according to <8> or <9>,
wherein the polymerizable functional group is an acryloyl group or a methacryloyl group.

<11> The electrochromic display device according to any one of <8> to <10>,
wherein the electrochromic layer includes an electrochromic composition including a polymerizable compound that is different from the radical-polymerizable compound having the triaryl amine skeleton.

<12> The electrochromic display device according to <11>,
wherein the polymerizable compound that is different from the electrochromic compound is a compound having at least one polymerizable functional group.

<13> The electrochromic display device according to any one of <8> to <12>,
wherein the electrochromic composition includes a polymerization initiator.

<14> A method for producing an electrochromic display device, the method including: forming a first electrochromic layer;
making the first electrochromic layer fixed or insoluble;
forming a second electrochromic layer on the first electrochromic layer in a manner that at least part of the second electrochromic layer overlaps with the first electrochromic layer; and
making the second electrochromic layer fixed or insoluble,
wherein the electrochromic display device includes:
a pair of supporting substrates facing each other;
a pair of electrodes each disposed on the supporting substrate and facing each other; and
an electrochromic display layer disposed in contact with at least one of the pair of the electrodes,
wherein the electrochromic display layer includes the first electrochromic layer and the second electrochromic layer which exhibit mutually different coloring colors, the second electrochromic layer is laminated on the first electrochromic layer at least in a partial area of the electrode, and
the first electrochromic layer and the second electrochromic layer are polymerizable or curable.

The electrochromic display device according to any one of <1> to <13> and the method for producing an electrochromic display device according to <14> can solve the above-described various problems existing in the art and can achieve the object of the present disclosure.

REFERENCE SIGNS LIST

1: display substrate
2: display electrode
3: first electrochromic layer
4: second electrochromic layer
5: electrochromic display layer
6: electrolyte layer
7: counter electrode
8: counter substrate
9: counter electrode layer
10: third electrochromic layer
11: electrochromic display layer
100: electrochromic display device
101: electrochromic display device
102: electrochromic display device
103: electrochromic display device
105: electrochromic display device
106: electrochromic display device

The invention claimed is:
1. An electrochromic display device, comprising:
a pair of supporting substrates facing each other;
a pair of electrodes each disposed on the supporting substrate and facing each other;
an electrochromic display layer disposed in contact with at least one particular electrode of the pair of the electrodes; and
an electrolyte layer disposed between the pair of the electrodes,
wherein the electrochromic display layer includes a plurality of electrochromic layers exhibiting mutually different coloring colors and the plurality of electrochromic layers comprises at least a first electrochromic layer and a second electrochromic layer, and
the plurality of the electrochromic layers are laminated on the particular electrode, at least in a first partial area of the particular electrode, and the second of electrochromic layer is in contact with the particular electrode in a second partial area of the particular electrode in which the first electrochromic layer is not provided.

2. The electrochromic display device according to claim 1,
wherein each of the electrochromic layers includes an electrochromic material where the electrochromic materials included in the electrochromic layers exhibit mutually different coloring colors,
each of the electrochromic materials reversibly performs a coloring reaction or decoloring reaction due to an electrochemical redox reaction, and
a difference in a redox potential of the coloring reaction or decoloring reaction between the electrochromic materials is 0.1 V or less.

3. The electrochromic display device according to claim 2,
wherein the electrochromic layers are disposed from a side closest to the particular electrode in an order of a lowest absolute value of the redox potential of the electrochromic material included in the electrochromic layer relative to a reaction of the particular electrode to face.

4. The electrochromic display device according to claim 2,
wherein the electrochromic layers are disposed from a side closest to the particular electrode in an order of a fastest reaction speed of the coloring reaction or the decoloring reaction at voltage applied between the pair of electrodes.

5. The electrochromic display device according to claim 2,
wherein each of the electrochromic materials is a compound having a triaryl amine skeleton represented by General Formula (1) below:

$$A n\text{-}B m \qquad \text{(General Formula (1))}$$

where m is 0 when n=2 is satisfied, m is 0 or 1 when n=1 is satisfied; at least one of A and B has a radical-polymerizable functional group, where A is a structure represented by General Formula (2) below and is bonded to B at a position that is any of $R_1$ through $R_{15}$, and B is a structure represented by General Formula (3) below and is bonded to A at a position that is any of $R_{16}$ through $R_{21}$,

[Chem. 1]

(General Formula (2))

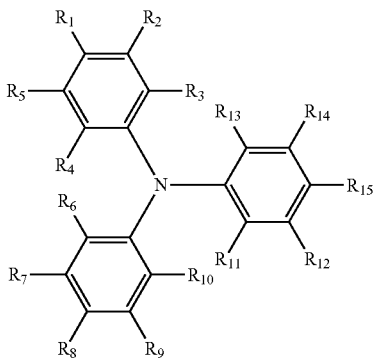

[Chem. 2]

(General Formula (3))

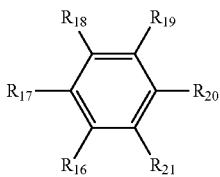

where, in General Formulae (2) and (3), $R_1$ through $R_{21}$ are all monovalent organic groups that may be identical or different and at least one of the monovalent organic groups is a radical-polymerizable functional group.

6. The electrochromic display device according to claim 1,
wherein each of the electrochromic layers displays pseudo gradation formed with shades according to an error diffusion processing method.

7. The electrochromic display device according to claim 1,
wherein a counter electrode layer is formed on the electrode facing the particular electrode on which the electrochromic display layer is disposed,
the counter electrode layer does not change a color in a visible light region with applied voltage, which causes a coloring reaction or a decoloring reaction of the electrochromic display layer facing the counter electrode layer, and
an area of the counter electrode layer is larger than an area of the electrochromic display layer.

8. The electrochromic display of claim 1, wherein a portion of each layer of the plurality of electrochromic layers is in direct contact with the surface of the particular electrode.

9. An electrochromic display device, comprising:
a pair of supporting substrates facing each other;
a pair of electrodes each disposed on the supporting substrate and facing each other;
an electrochromic display layer disposed in contact with at least one particular electrode of the pair of the electrodes; and
an electrolyte layer disposed between the pair of the electrodes,
wherein the electrochromic display layer includes three or more electrochromic layers exhibiting mutually different coloring colors and the three or more electrochromic layers comprise at least a first electrochromic layer and a second electrochromic layer,
at least one of the three or more electrochromic layers colors in cyan, at least one of the three or more electrochromic layers colors in magenta, and at least one of the three or more electrochromic layers colors in yellow, and
among the three or more electrochromic layers, two or more electrochromic layers are laminated on the particular electrode, at least in a first partial area of the particular electrode and the second electrochromic layer is in contact with the particular electrode in a second partial area of the particular electrode in which the first electrochromic layer is not provided.

10. The electrochromic display device according to claim 9,
wherein each of the electrochromic layers includes an electrochromic material where the electrochromic materials included in the electrochromic layers exhibit mutually different coloring colors,
each of the electrochromic materials reversibly performs a coloring reaction or decoloring reaction due to an electrochemical redox reaction, and
a difference in a redox potential of the coloring reaction or decoloring reaction between the electrochromic materials is 0.1 V or less.

11. The electrochromic display device according to claim 10,
wherein the electrochromic layers are disposed from a side closest to the particular electrode in an order of a lowest absolute value of the redox potential of the electrochromic material included in the electrochromic layer relative to a reaction of the particular electrode to face.

12. The electrochromic display device according to claim 10,
wherein the electrochromic layers are disposed from a side closest to the particular electrode in an order of a fastest reaction speed of the coloring reaction or the decoloring reaction at voltage applied between the pair of electrodes.

13. The electrochromic display device according to claim 10,
wherein each of the electrochromic materials is a compound having a triaryl amine skeleton represented by General Formula (1) below:

A$n$-B$m$                        (General Formula (1))

where m is 0 when n=2 is satisfied, m is 0 or 1 when n=1 is satisfied; at least one of A and B has a radical-polymerizable functional group, where A is a structure represented by General Formula (2) below and is bonded to B at a position that is any of $R_1$ through $R_{15}$ and B is a structure represented by General Formula (3) below and is bonded to A at a position that is any of $R_{16}$ through $R_{21}$,

[Chem. 3]

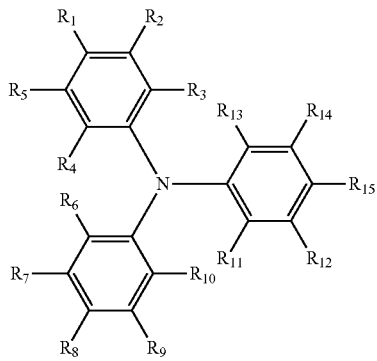

(General Formula (2))

[Chem. 4]

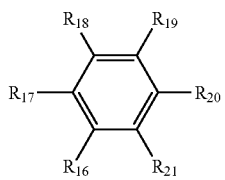

(General Formula (3))

where, in General Formulae (2) and (3), $R_1$ through $R_{21}$ are all monovalent organic groups that may be identical or different and at least one of the monovalent organic groups is a radical-polymerizable functional group.

14. The electrochromic display device according to claim 9,
wherein each of the electrochromic layers displays pseudo gradation formed with shades according to an error diffusion processing method.

15. The electrochromic display device according to claim 9,
wherein a counter electrode layer is formed on the particular electrode facing the electrode on which the electrochromic display layer is disposed,
the counter electrode layer does not change a color in a visible light region with applied voltage which causes a coloring reaction or a decoloring reaction of the electrochromic display layer facing the counter electrode layer, and
an area of the counter electrode layer is larger than an area of the electrochromic display layer.

16. A method for producing an electrochromic display device, the method comprising:
forming a first electrochromic layer;
making the first electrochromic layer fixed or insoluble;
forming a second electrochromic layer on the first electrochromic layer in a manner that at least part of the second electrochromic layer overlaps with the first electrochromic layer; and
making the second electrochromic layer fixed or insoluble,
wherein the electrochromic display device includes:
a pair of supporting substrates facing each other;
a pair of electrodes each disposed on the supporting substrate and facing each other; and
an electrochromic display layer disposed in contact with at least one particular electrode of the pair of the electrodes,
wherein the electrochromic display layer includes the first electrochromic layer and the second electrochromic layer which exhibit mutually different coloring colors,
the second electrochromic layer is laminated on the first electrochromic layer at least in a first partial area of the particular electrode, and the second electrochromic layer is in contact with the particular electrode in a second partial area of the particular electrode in which the first electrochromic layer is not provided, and
the first electrochromic layer and the second electrochromic layer are polymerizable or curable.

* * * * *